(12) United States Patent
Shimomura et al.

(10) Patent No.: US 7,370,741 B2
(45) Date of Patent: May 13, 2008

(54) ENGINE START ROLLER CLUTCH-HOUSED TYPE ROTATION TRANSMISSION DEVICE

(75) Inventors: Yuji Shimomura, Fujisawa (JP); Daisuke Fujimori, Fujisawa (JP)

(73) Assignee: NSK Ltd., Tokyo (JP)

( * ) Notice: Subject to any disclaimer, the term of this patent is extended or adjusted under 35 U.S.C. 154(b) by 7 days.

(21) Appl. No.: 10/496,957

(22) PCT Filed: Jan. 17, 2003

(86) PCT No.: PCT/JP03/00377

§ 371 (c)(1),
(2), (4) Date: Dec. 22, 2004

(87) PCT Pub. No.: WO03/067128

PCT Pub. Date: Aug. 14, 2003

(65) Prior Publication Data

US 2005/0087417 A1    Apr. 28, 2005

(30) Foreign Application Priority Data

| Jan. 21, 2002 | (JP) | ............................. 2002-011020 |
| Feb. 12, 2002 | (JP) | ............................. 2002-033835 |
| May 16, 2002 | (JP) | ............................. 2002-141471 |
| May 16, 2002 | (JP) | ............................. 2002-141472 |
| Jul. 29, 2002 | (JP) | ............................. 2002-219467 |
| Oct. 4, 2002 | (JP) | ............................. 2002-292096 |
| Oct. 25, 2002 | (JP) | ............................. 2002-311557 |

(51) Int. Cl.
*F16H 55/36* (2006.01)
*F16D 41/06* (2006.01)

(52) U.S. Cl. ..................... 192/42; 192/45; 192/110 B

(58) Field of Classification Search ................... 192/42
See application file for complete search history.

(56) References Cited

U.S. PATENT DOCUMENTS 3,339,687 A * 9/1967 Cowles ........................ 192/45

(Continued)

FOREIGN PATENT DOCUMENTS

CN    2172366 Y    7/1994

(Continued)

OTHER PUBLICATIONS

English Translation of Chinese Office Action dated Mar. 2, 2007.

*Primary Examiner*—Richard M Lorence
(74) *Attorney, Agent, or Firm*—Crowell & Moring LLP

(57) ABSTRACT

A pair of ball bearings 19, 19 and a roller clutch 20 are provided between the outer peripheral surface of the sleeve 18 fitted and fixed onto the rotating drive shaft of a starter motor and the inner peripheral surface of the pulley element 17 around which an endless belt for starting an engine extends. The roller clutch 20 has a concave section 32 on the inner peripheral surface of the clutch outer ring 30 to define a cam surface 31. After the engine is started, the rollers 33, 33 move toward the bottom of the concave section 32 against the resilient force of the springs 40. And, the rolling contact surface of the rollers 33, 33 is separated from the outer peripheral surface of the clutch inner ring 29. Consequently, the friction heat which would be produced after the engine start is suppressed, and a structure having an excellent durability as a unit for starting the engine of the idling-stop vehicle is realized.

1 Claim, 43 Drawing Sheets

U.S. PATENT DOCUMENTS

| | | | | |
|---|---|---|---|---|
| 3,500,977 | A | * | 3/1970 | Gehrke .................. 192/45 |
| 4,178,805 | A | * | 12/1979 | Mazzorana .................. 74/6 |
| 4,878,570 | A | * | 11/1989 | Zlotek .................. 192/45 |
| 5,265,706 | A | * | 11/1993 | Iga .................. 192/42 |
| 5,617,937 | A | * | 4/1997 | Zettner et al. .................. 192/45 |
| 5,695,031 | A | * | 12/1997 | Kurita et al. .................. 192/45 |
| 6,343,682 | B1 | * | 2/2002 | Terada et al. .................. 192/45 |

FOREIGN PATENT DOCUMENTS

| | | | | |
|---|---|---|---|---|
| DE | 10057516 | A | | 11/2001 |
| EP | 1030074 | A | | 8/2000 |
| EP | 1067303 | A2 | * | 1/2001 |
| GB | 2320744 | A | | 7/1998 |
| JP | 48-5141 | | | 1/1973 |
| JP | 6-90571 | A | | 3/1994 |
| JP | 7-72585 | A | | 8/1995 |
| JP | 8-100827 | A | | 4/1996 |
| JP | 8-303489 | A | | 11/1996 |
| JP | 9-196090 | A | | 7/1997 |
| JP | 9-317609 | A | | 12/1997 |
| JP | 11-63026 | A | | 3/1999 |
| JP | 11-63170 | A | | 3/1999 |
| JP | 11-82688 | A | | 3/1999 |
| JP | 2000-120730 | A | | 4/2000 |
| JP | 2000-130563 | A | | 5/2000 |
| JP | 2000-234638 | A | | 8/2000 |
| JP | 2001-27308 | | | 1/2001 |
| JP | 2001-108069 | A | | 4/2001 |
| JP | 2001153010 | A | * | 6/2001 |
| JP | 2001-349413 | A | | 12/2001 |
| JP | 2001-355654 | A | | 12/2001 |
| JP | 2002-174270 | A | | 6/2002 |
| JP | 2002-221130 | A | | 8/2002 |
| JP | 2002349282 | A | * | 12/2002 |
| JP | 2001-90751 | | | 4/2004 |

* cited by examiner

PRIOR ART

PRIOR ART

PRIOR ART

PRIOR ART

PRIOR ART

PRIOR ART

PRIOR ART

PRIOR ART

PRIOR ART

ENGINE START ROLLER CLUTCH-HOUSED TYPE ROTATION TRANSMISSION DEVICE

FIELD OF THE INVENTION

The rotation-transmission apparatus with built-in roller clutch for starting an engine of this invention is mounted on the end section of the drive shaft of a starter motor for starting the engine of a so-called idling stop vehicle that stops the engine automatically without idling when the automobile stops moving. Also, when starting the engine, it functions so as to transmit power from this drive shaft to the crankshaft of the engine, and after the engine starts, it functions so that the drive shaft is not rotated and driven by this engine.

BACKGROUND OF THE INVENTION

In recent years, with the purpose of saving energy and suppressing the emission of carbon dioxide, performing an idling stop by automatically stopping the engine without idling when the automobile has stopped, has been considered, and some idling-stop vehicles having this kind of idling-stop function are actually being used. In the case of this kind of idling-stop vehicle, when the automobile stops, the vehicle-speed sensor detects a zero-speed signal, and the engine is automatically stopped (without operating the ignition switch) based on the zero-speed signal. On the other hand, when starting the automobile moving again, based on a signal from a clutch sensor (in the case of a manual-transmission automobile) that detects movement of the clutch pedal, or an accelerator sensor or brake sensor (in the case of an automatic-transmission automobile) that detects when the accelerator pedal or brake pedal moves, the automobile engine is automatically started again (without operating the ignition switch). With this kind of idling-stop automobile, it is possible to save energy and to suppress emission of carbon dioxide during this idling stop of the engine.

In the case of this kind of idling-stop automobile, it is necessary to be able to start the engine more quickly than in the case of a normal automobile. Therefore, it is difficult to employ the typically used construction in which a pinion that is fastened to the drive shaft of the start motor meshes, only during starting, with a large gear that is fastened to a flywheel. Taking this into consideration, as shown in FIG. 55, construction has been proposed in which an endless belt 7 runs around a follower pulley 3 that is fastened to the end of the crankshaft 2 of the engine 1, and to the drive-pulley apparatus that is fastened to the end of the rotation-drive shaft 5 of the starter motor 4. When employing this kind of construction in the starting apparatus of an engine, a drive-pulley apparatus 6 having a built-in one-way clutch is used, so that power is transmitted from the rotation-drive shaft 5 to the endless belt 7, however, that power is not transmitted from this endless belt 7 to the rotation-drive shaft 5. In an actual engine, there are various auxiliary drive apparatuses installed such as an alternator and water pump, however, since this invention is not directly related to these drive apparatuses, they are omitted in the drawings.

With the starting apparatus for an engine having the construction described above, when starting engine, electric power flows to the starter motor 4 to rotate and drive the drive-pulley apparatus 6, which then rotates and drives the crankshaft 2 by way of the endless belt 7 and follower pulley 3. At this time, the one-way clutch that is built into the drive-pulley apparatus 6 is engaged (becomes locked), and transmits power from the rotation-drive shaft 5 to the endless belt 7. As a result, after the engine has started, the connection with the one-way clutch is disconnected (becomes the overrun state), and the rotation-drive shaft 5 of the starter motor 4 does not rotate, even though the endless belt 7 is running due to the rotation of the crankshaft 2. Therefore, this starter motor 4 is not a resistance against the operation of the engine 1, and the durability of this starter motor 4 is not damaged.

As disclosed in patent document 1 and patent document 2, using a roller clutch as the one-way clutch in a pulley apparatus with built-in one-way clutch that is installed in the drive-pulley apparatus 6 of this kind of engine starting apparatus has been proposed. With construction using a roller clutch, it is possible to reduce vibration, noise and friction that occur when not connected better than when using a ratchet mechanism. Also, it is possible to reduce the internal friction that occurs when not connected better than when using a sprag-type cam clutch. The following patent documents are given as the prior art of the present application.

Patent Document 1
   Japanese Patent Publication No. Tokukai Hei 11-63170

Patent Document 2
   Japanese Patent Publication No. Tokuko Hei 7-72585

Patent Document 3
   Japanese Patent Publication No. Tokukai 2002-174270

Patent Document 4
   Japanese Patent Publication No. Tokukai Hei 9-196090

Of the patent documents listed above, the pulley apparatus with built-in one-way clutch disclosed in patent documents 1 and 2 is intended to be located on the end of the rotating shaft of the alternator which is an engine auxiliary apparatus, and thus the state of use differs greatly from that of the starting apparatus of an engine. Therefore, even when this pulley apparatus with built-in one-way clutch is mounted as is on the end of the rotation-drive shaft of a starter motor, it is not possible to obtain sufficient durability. In other words, one reason for using a pulley apparatus with built-in one-way clutch for the rotating shaft of an alternator is to make the direction of the friction acting between the inner peripheral surface of the belt and the outer peripheral surface of the pulley constant, even though there are small changes in the rpm of the engine, in order to maintain the durability of the belt. Moreover, another reason is to increase the generating efficiency by keeping the rotor of the alternator rotating due to its inertia when the rpm of the engine drops.

Therefore, a pulley apparatus with built-in one-way clutch for an alternator basically operates in the locked state, and the amount of time that it operates in the overrun state is very short when compared with the overall time of operation. Also, the amount of continuous time in the overrun state is extremely short. Taking this into consideration, in order for a roller clutch installed in a pulley apparatus with built-in one-way clutch for an alternator to securely achieve the locked condition when the engine is operating, well-known construction as shown in FIG. 56 and as disclosed in patent documents 1 and 2 is used.

In a first example of a roller clutch 8 using the conventional construction shown in FIG. 56, an inner race 9 and outer race 10 are placed such that they are concentric with each other, and there are a retainer 11, a plurality of rollers 12 and a plurality of springs 13, 13 between the outer peripheral surface of the inner race 9 and the inner peripheral surface of the outer race 10. The outer peripheral surface of the inner race 9 is a cam surface having a plurality of concave sections 14 called ramp sections, and the inner peripheral surface of the outer race 10 is a simple cylindrical surface. The convex sections 15 formed around the inner peripheral edge portion of the retainer 11 is fitted with the aforementioned concave sections 14 to prevent the rotation of retainer 11 relative to the inner race 9. In other words, the retainer 11 and inner race 9 are such that they rotate in synchronization. Also, the springs 13 push the rollers 12 in the same circumferential direction toward the shallow side of the concave sections 14.

In the case of this kind of roller clutch 8, when there is a tendency for the inner race 9 to rotate relative to the outer race 10 in the clockwise direction of FIG. 56, the rollers 12 bite into (fit into) the space between the outer peripheral surface of the inner race 9 and the inner peripheral surface of the outer race 10, and rotation force is transmitted between the inner race 9 and the outer race 10. On the other hand, when there is a tendency for the inner race 9 to rotate relative to the outer race 10 in the counterclockwise direction of FIG. 56, the rollers 12 are moved against the elastic force of the springs 13 to the deep sections of the concave sections 14, and there is decrease in the surface pressure at the points of contact between the rolling contact surfaces of the rollers 12 and the inner peripheral surface of the outer race 10, and the rotation force stops being transmitted between the inner race 9 and the outer race 10.

However, even when rotation force is not transmitted between the inner race 9 and outer race 10 in this way, rubbing at the points of contact between the rolling contact surfaces of the rollers 12 and the inner peripheral surface of the outer race 10 is unavoidable. Therefore, when the overrun state continues for a long time, friction heat that cannot be neglected occurs at the points of contact, causing the temperature inside the roller clutch 8 to rise, and making it easy for the grease inside this roller clutch to degrade. Furthermore, the temperature of the support bearing adjacent to this roller clutch 8 also rises, making it easy for the rubber or synthetic resin seal plate in this support bearing to degrade. In the case of a pulley apparatus with a built-in one-way clutch for an alternator, since operation is mainly in the locked state as described above, and the amount of time of operation on the overrun state is short, it is difficult for the rise in temperature due to the friction heat described above to become a problem.

On the other hand, in the case of the one-way clutch that is installed in a drive-pulley apparatus 6 for an idling-stop vehicle described above and as shown in FIG. 55, the amount of time that the clutch is in the locked state is only a short time when the engine starts, and after the engine starts, the clutch is in the overrun state as long as the engine is running. Therefore, it is difficult to maintain sufficient durability even when the roller clutch 8 as shown in FIG. 56 is installed in the engine starting apparatus for an idling-stop vehicle.

Taking this problem into consideration, the rotation-transmission apparatus with built-in roller clutch for starting an engine of this invention is made to make it possible to sufficiently secure durability.

DISCLOSURE OF THE INVENTION

The rotation-transmission apparatus with built-in roller clutch for starting an engine of this invention transmits power only in a specified direction between a rotating member that rotates together with the engine crankshaft during use and the rotating shaft of a motor for starting an engine that is inserted through the center of this rotating member and that rotates only in the specified direction during use; and comprises a pair of support bearings that are located such that they are spaced apart in the axial direction in a circular-ring shaped space between the inner peripheral surface of the rotating member and the outer peripheral surface of the rotating shaft; and a roller clutch that is located between the pair of support bearings in this circular-ring shaped space.

Also, this roller clutch becomes engaged when the rotating shaft rotates in the specified direction and transmits power from this rotating shaft to the rotating member, however, when the rotating member rotates in the specified direction faster than the rotating shaft, the roller clutch runs idle and does not transmit power from the rotating member to the rotating shaft.

Moreover, the pulley with built-in roller clutch for a starter motor described in claim 1 comprises: a first support bearing that is located on the one side in the axial direction of the pulley; a second support bearing that is located on the other side in the axial direction of the pulley, and a roller clutch portion that is located between the first support bearing and second support bearing; and this roller clutch portion becomes locked in one direction of rotation, and becomes unlocked in the other direction, and a cam surface is formed on the inner peripheral surface of the pulley or on the inner peripheral surface of the clutch outer ring that is fastened inside the pulley.

Also, in the rotation-transmission apparatus with built-in roller clutch for starting an engine described in claim 2, when the plurality of rollers of the roller clutch are located in the deepest section of concave sections that define the cam surface for allowing these rollers to move in the radial direction of the rotating member, the size of the space that exists between the rolling contact surfaces of the rollers and the outer peripheral surface of the rotating shaft or the outer peripheral surface of the clutch inner ring that is fitted onto and fixed to this rotating shaft becomes larger than the radial space of the support bearings.

Furthermore, in the rotation-transmission apparatus with built-in roller clutch for starting an engine described in claim 3, the support bearings and the roller clutch are lubricated using the same kind of grease, which has a synthetic base oil and a urea type bodying agent.

In the rotation-transmission apparatus with built-in roller clutch for starting an engine described in claim 4, the support bearings are ball bearings, and the retainer that holds the plurality of balls such that they roll freely is a crown-type retainer made of synthetic resin, and a partial cylindrical surface having a center axis that is parallel with the center axis of the retainer is formed on the inside surface of the pockets of this retainer on the parts on both sides in the circumferential direction that face the rolling contact surface of the balls.

In the rotation-transmission apparatus with built-in roller clutch for starting an engine described in claim 5, the seal rings are located on both ends of the support bearings, and of these seal rings, the seal ring located on the outside, or the side opposite to the roller clutch, is a contact type seal ring, and the seal ring on the inside, or the side of the roller clutch, is of the non-contact type.

Also, in the rotation-transmission apparatus with built-in roller clutch for starting an engine described in claim 6, the cam surface for allowing the plurality of rollers of the roller clutch move in the radial direction of the rotating member is formed on the inner peripheral surface of the rotating member or on the inner peripheral surface of the clutch outer ring that is fitted into and fastened inside this rotating member, and the outer peripheral surface of the rotating shaft or the outer peripheral surface of the clutch inner ring that is fitted onto and fixed to the rotating shaft is a cylindrical surface. Also, a chemically processed layer is formed on at least one of the outer peripheral surface of this cylindrical surface and the surface of the rollers.

Moreover, the rotation-transmission apparatus with built-in roller clutch for starting an engine described in claim 7 comprises a plurality of protruding supports that are located on the outer peripheral surface in the middle section in the axial direction of the retainer for holding the plurality of rollers of the roller clutch, in locations that face the side surface of the base sections of the plurality of springs that press these rollers, and such that they protrude in the radial direction, and eave sections that are located on the side surfaces of these protruding supports that face the side surface of the base section of the elastic members, in the section further separated toward the outer-diameter side from the side surface of the base sections, and that protrude toward the base section side of these elastic members. Also, the length by which these eave sections protrude from the side surface of the protruding supports is greater than the thickness of the portion of the base section of the springs that face this side surface.

Also, in the rotation-transmission apparatus with built-in roller clutch for starting an engine described in claim 8, the cam surface for allowing the plurality of rollers of the roller clutch to move in the radial direction of the rotating member is formed around the inner peripheral surface of the rotating member or the inner peripheral surface of the clutch outer ring that is fitted into and fastened to this rotating member, and the outer peripheral surface of the rotating shaft or the outer peripheral surface of the clutch inner ring that is fitted onto and fastened to this rotating shaft is a cylindrical surface. Also, the plurality of rollers are held between the inner peripheral surface of the cam surface and the outer peripheral surface of the cylindrical surface, and the springs come in contact with the rolling contact surfaces of the rollers at a location further on the inside in the radial direction of the retainer of the roller clutch than the location of the front end of the rolling contact surfaces of these rollers, in the direction of movement of the center axis of the respective rollers in the state where these rollers roll along the plurality of concave sections of this cam surface to the deep side of the concave sections.

In the rotation-transmission apparatus with built-in roller clutch for starting an engine described in claim 9, the roller clutch comprises: a plurality of rollers that are located between the inner peripheral surface of the rotating member and the outer peripheral surface of the rotating shaft; springs for pressing the rollers in the same circumferential direction of the rotating member and rotating shaft; and a retainer for holding these rollers. Also, these springs comprise a main section that comes in contact with part of the retainer, and a pair of pressure sections whose base ends are connected to and continuous with both ends of the main section. Also, when these pressure sections are in contact with the rolling contact surfaces of the rollers, they expand and compress independently. Moreover, the location of the center of gravity of the rollers in the axial direction is located between the areas of contact in these pressure sections with the rolling contact surfaces of the rollers, and when the pressure sections are compressed by the rollers, the space in the axial direction between the areas of contact in these pressure sections with the rolling contact surfaces of the rollers is half or more the length in the axial direction of the rollers.

In the rotation-transmission apparatus with built-in roller clutch for starting an engine described in claim 10, the roller clutch comprises a plurality of rollers that are located between the inner peripheral surface of the rotating member and the outer peripheral surface of the rotating shaft; springs for pressing these rollers in the same circumferential direction of the rotating member and rotating shaft; and a retainer that holds these rollers. Moreover, these springs comprise a main section that comes in contact with part of the retainer, and a pair of pressure sections whose base ends connect to and are continuous with both ends of the main section, and of these, in the state where the pressure sections come in contact with the rolling contact surfaces of the rollers, they extend or compress independently, and these pressure sections are curved such that the radius of curvature is gradually decreased going from the base end toward the tip end.

In the rotation-transmission apparatus with built-in roller clutch for starting an engine described in claim 11, the retainer for holding the plurality of rollers of the roller clutch comprises a pair of rim sections that are spaced apart in the axial direction of the circular-ring shaped space and located parallel with each other, and a plurality of column sections that are spaced apart in the circumferential direction of the circular-ring shaped space and located parallel with each other to connect the rim sections, and grease pockets for holding grease are formed on the inner peripheral surfaces of these column sections.

With the rotation-transmission apparatus with built-in roller clutch for starting an engine of this invention constructed as described above it is possible to improve durability.

In other words, in the case of the pulley with built-in roller clutch for starter motor described in claim 1, the rolling contact surfaces of the plurality of rollers of this roller clutch are guided by the inner peripheral surface of the pulley or by the inner peripheral surface of the clutch outer ring that is fitted into and fastened to the pulley. Therefore, it is possible to keep friction heat that is generated inside the roller clutch when rotating to a minimum, and thus it is possible to improve the durability of the roller clutch and the adjacent support bearings, and improve the durability of the pulley with built-in roller clutch for a starter motor.

Also, in the case of the rotation-transmission apparatus with built-in roller clutch for starting an engine described in claim 2, it is possible for the rolling contact surfaces of all of the rollers and the outer peripheral surface of the rotating shaft or the outer peripheral surface of the clutch inner ring that is fastened around the outside of this rotating shaft to become securely separated after the engine starts, even when the center axis of the rotating member and the center axis of the rotating shaft are eccentric due to radial clearance of the support bearings (by just the amount of this radial clearance). Therefore, it is possible to improve the durability of the rotation-transmission apparatus with built-in roller clutch for starting an engine.

Moreover, in the case of the rotation-transmission apparatus with built-in roller clutch for starting an engine described in claim 3, it is possible to secure excellent shear stability and heat resistance (high-temperature stability) of the grease filled in the roller clutch, as well as it is possible to prevent the occurrence of problems such as degradation of grease, due to mixing of the grease, that is filled in the roller clutch and in the support bearings, and thus it is possible to improve the durability of the rotation-transmission apparatus with built-in roller clutch for starting an engine.

Furthermore, in the case of the rotation-transmission apparatus with built-in roller clutch for starting an engine described in claim 4, it is possible to increase the span of the applied radial load and increase the rigidity, as well as improve the durability. Also, since the retainer is crown shaped and made of synthetic resin, it is difficult for the abrasion powder produced in the retainer to cause the grease to degrade. Moreover, since the hardness of the abrasion powder is low, this abrasion powder does not cause damage such as indentation of the outer race track or inner race track to occur, and thus the pealing life of these race tracks is not worsened. Therefore, it is possible to improve the durability of the rotation-transmission apparatus with built-in roller clutch for starting an engine.

Also, in the case of the rotation-transmission apparatus with built-in roller clutch for starting an engine described in claim 5, it is possible to prevent foreign matter such as dust or dirt in the air from getting into the space inside the support bearings and roller clutch, as well as it is possible to prevent grease that is filled inside these internal spaces from leaking out, thus it is possible to improve the durability of the rotation-transmission apparatus with built-in roller clutch for starting an engine. It is also possible to decrease the rotation resistance when the roller clutch is in the overrun state.

In the case of the rotation-transmission apparatus with built-in roller clutch for starting an engine described in claim 6, a chemical conversion layer such as manganese phosphate is formed on the surfaces of the plurality of rollers of the roller clutch or the outer peripheral surface of the cylindrical surface or both of them. The surface of this layer processed through chemical conversion is rough. Therefore, it is possible to increase the static friction coefficient at the points of contact between the surfaces of the plurality of rollers and the cylindrical surface. Therefore, in the locked state of the roller clutch, it is difficult for slipping to occur at the points of contact between the surfaces of the rollers and the cylindrical surface, and thus it is easier to achieve the locked state. On the other hand, when the roller clutch is in the overrun state, the chemical conversion layer makes it possible to prevent metallic contact between the surfaces of the plurality of rollers and the cylindrical surface. Together with this, lubricant is held between the crystal grains of this chemical conversion layer, and this held lubricant makes it is possible to improve the state of lubrication at the areas of sliding contact between the surfaces of the rollers and the cylindrical surface. Therefore, when the roller clutch is in the overrun state, it is difficult for wear and seizure to occur at these points of sliding contact, and thus it is possible to improve the durability of the rotation-transmission apparatus with built-in roller clutch for starting an engine.

Also, in the case of the rotation-transmission apparatus with built-in roller clutch for starting an engine described in claim 7, it is possible to prevent the springs from coming out of place or shifting outward with respect to the protruding supports even when large centrifugal force acts on the springs due to high-speed rotation of the retainer. Therefore, it is possible to improve the reliability and durability of the roller clutch. As a result, it is possible to prevent this outward shifting and to improve the reliability and durability of the rotation-transmission apparatus with built-in roller clutch for starting an engine regardless of there being a tendency for the spring to easily shift toward the outer-diameter side of the retainer due to the fact that the retainer continues to rotate together with the rotating member at high speed for a long time after the engine starts.

Moreover, in the case of the rotation-transmission apparatus with built-in roller clutch for starting an engine described in claim 8, when changing from the locked stat to the overrun state, it becomes easier for the rollers to roll along the concave sections of the cam surface to the deep side of the concave sections due to the action of the centrifugal force. Therefore, in the overrun state, it is possible to prevent a state of sliding contact from being kept between the rolling contact surfaces of the rollers and the outer peripheral surface of the cylindrical surface, and to suppress the occurrence of friction heat and friction loss. Therefore, it is possible to improve the durability and performance of the roller clutch. As a result, regardless of whether springs having a large elastic force are used for pressing the rollers, it is possible to improve the durability and performance of the rotation-transmission apparatus with built-in roller clutch for starting an engine.

Furthermore, in the case of the rotation-transmission apparatus with built-in roller clutch for starting an engine described in claim 9, it is possible to prevent the attitude of the rollers from shifting in a direction that the center axis would tilt from the proper position (becoming skewed) when the springs are pressed by the rollers in the overrun state. Therefore, it is possible to prevent uneven wear and abnormal heat due to this kind of skewing of the rollers, and thus it is possible to improve the durability (long life) of the rotation-transmission apparatus with built-in roller clutch for starting an engine.

In other words, in the case of the rotation-transmission apparatus with built-in roller clutch for starting an engine described in claim 9, the springs pressing the rollers to come in contact with the rollers, through a pair of pressure sections in the springs, at two points separated in the axial direction. Therefore, even when the location of the points of contact between the pressure sections and the rollers changes a little, it is possible to prevent large changes in the force and moment applied to the rollers, and thus it is possible to keep the attitude of the rollers in the proper location.

Also, since the springs come in contact with the rollers at two points by way of the pair of pressure sections, it is possible for these pressure sections to extend and compress independently. Therefore, when the rollers become skewed, a large reaction force occurs in the pressure section on the side where there is a large amount of displacement (amount of extension or compression). As a result, a moment is applied to the rollers, so that the original attitude of the rollers is restored, and therefore the attitude of the rollers are kept proper. Also, the location of the center of gravity of the rollers in the axial direction is located between the areas of contact in the pressure sections with the rolling contact surfaces of the rollers, so it is possible to prevent the location of the center of gravity of the rollers and the direction of pressure by the pressure sections from become improper. As a result, it is possible to prevent moments from being applied to the rollers, and thus to prevent skewing of the rollers.

Moreover, when the pressure sections are pressed by the rollers, the space in the axial direction between the areas of contact in the pressure sections with the rolling contact surfaces of the rollers is half or more the length in the axial direction of the rollers. Therefore, no matter how the attitude of the rollers changes, or no matter how the pressure sections are pressed by the rollers, it is possible to always keep the center of gravity of the rollers located between the areas of contact. Therefore, it is possible to sufficiently secure an attitude stabilizing action by having the rollers come in contact with the springs at two points that are separated in the axial direction, and thus it is possible to keep the attitude of rollers in a proper position.

Also, in the case of the rotation-transmission apparatus with built-in roller clutch for starting an engine described in claim 10, together with being able to sufficiently reduce the stress applied to the base ends of the pressure sections, it is possible to secure the necessary pressure for without increasing the size of the springs. In other words, the stress applied to these pressure sections becomes larger the closer to the base ends, and becomes larger the smaller the radius of curvature is (curvature becomes large). However, in the case of the rotation-transmission apparatus with built-in roller clutch for starting an engine described in claim 10, it is possible to reduce the stress applied at these base ends by making the radius of curvature at the base end of the pressure sections large (small amount of curvature). Also, together with this, it is possible to maintain pressure of the pressure sections without increasing the size of the springs by making the radius of curvature at the base ends of these pressure sections (large amount of curvature). Therefore, it is possible to prevent uneven wear and abnormal heat generation due to skewing of the rollers, and it is possible to improve the durability of the rotation-transmission apparatus with built-in roller clutch for starting an engine.

Also, in the case of the rotation-transmission apparatus with built-in roller clutch for starting an engine described in claim 11, it is possible to supply grease, from the grease reservoir, to the areas of contact between the rolling contact surfaces of the rollers and the outer peripheral surface of the rotating shaft or the outer peripheral surface of the clutch inner ring that is fitted and fastened onto this rotating shaft. Therefore, even when there is rubbing between both of these surfaces, it is possible to suppress wear between these surfaces and to improve the durability of the rotation-transmission apparatus with built-in roller clutch for starting an engine.

DESCRIPTION OF THE PREFERRED EMBODIMENTS

Figure 55:
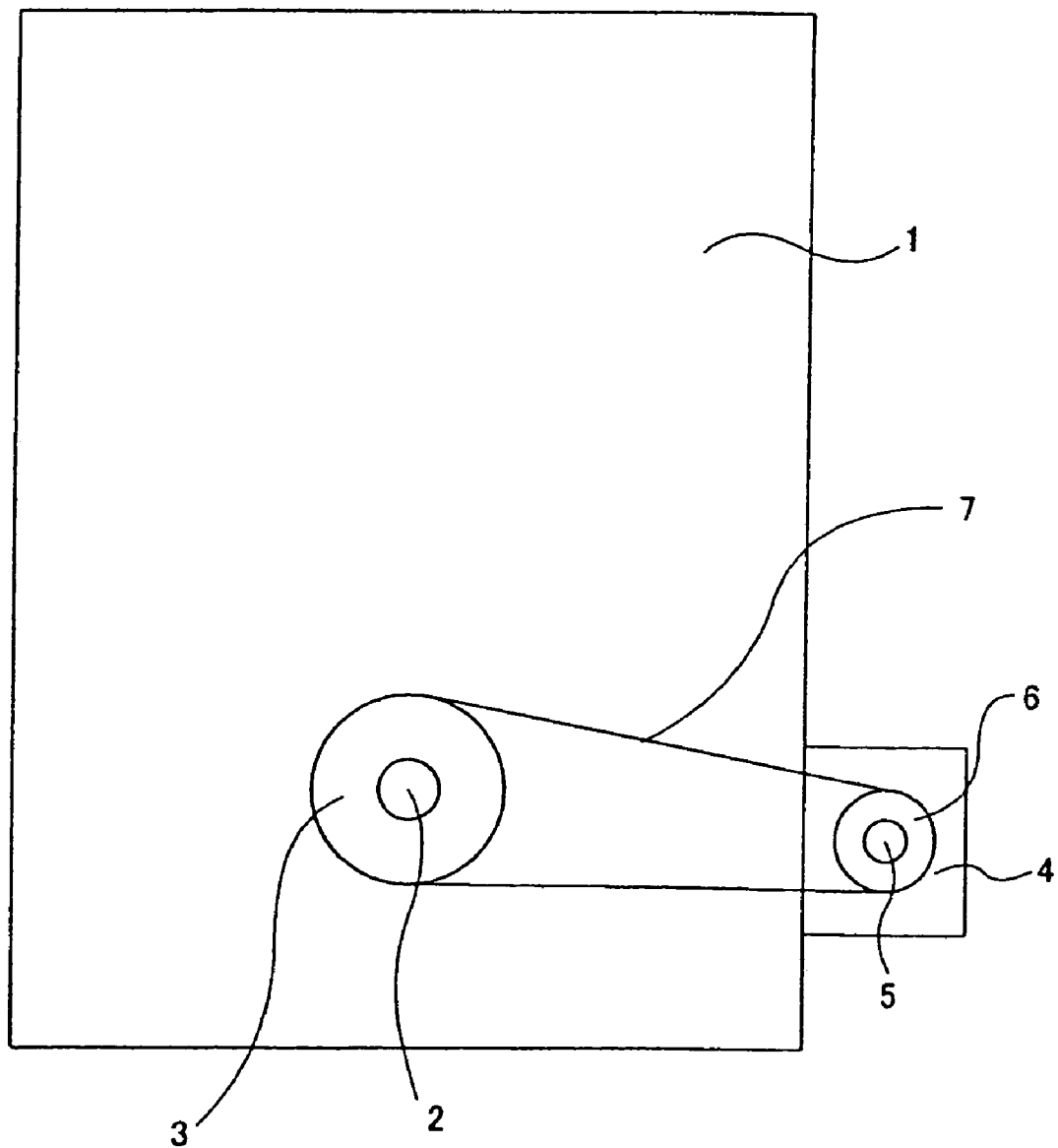
FIG. 55 is a schematic view of an apparatus for starting an engine for an idling-stop vehicle.

FIGS. 1 to 5 show a first example of embodiment of the invention. The pulley apparatus with built-in roller clutch 16, which is a rotation-transmission apparatus with built-in roller clutch for starting an engine according to the present example, is an engine-starting apparatus for an idling-stop vehicle as shown in FIG. 55 described above, and it is used as the drive-pulley apparatus 6 for transmitting the rotation of the rotation-drive shaft 5 of the starter motor 4 to the endless belt 7. Also, it is constructed such that when electric power flows to the starter motor 4, the rotation of the rotation-drive shaft 5 is transmitted to the endless belt 7, and that when this endless belt 7 is driven by the engine 1 after the start of the engine 1, power is not transmitted to the rotation-drive shaft 5 from the endless belt 7.

In this kind of pulley apparatus with built-in roller clutch 16, a pulley element 17, which is a rotating member around which the endless belt 7 is placed around its outer peripheral surface, and a sleeve 18, which is fitted and fastened onto the tip end of the rotation-drive shaft 5, are placed such that they are concentric with each other. Also, a pair of deep-groove ball bearings 19, which function as support bearings, and a roller clutch 20 are located between the outer peripheral surface of this sleeve 18 and the inner peripheral surface of the pulley element 17. In order to install these ball bearings 19 and roller clutch 20, the inner peripheral surface of the pulley element 17 is a simple cylindrical surface, and the outer peripheral surface of the sleeve 18 is a stepped cylindrical surface having a large-diameter section 21 in the middle in the axial direction and small-diameter sections 22 on both ends which are continued to the large-diameter section 21 through a stepped portion.

Moreover, the roller clutch 20 is located in the middle section in the axial direction of the ring-shaped space that exists between the outer peripheral surface of the sleeve 18 and the inner peripheral surface of the pulley element 17, and the ball bearings 19 are located near both ends in the axial direction of this ring-shaped space such that they are located on both sides in the axial direction of the roller clutch 20. Of these, the ball bearings 19 function such that the pulley element 17 and the sleeve 18 are concentric with each other, and that both of these members 17, 18 are allowed to freely rotate relative to each other. In this example, by placing these ball bearings 19 on the opposite sides of the roller clutch 20, it is possible to lengthen the span to which the radial loads are applied, thus making it possible to increase the rigidity and maintain durability. Also, by giving angle of contact to these ball bearings 19 in opposite directions from each other (preferably a back-to-back combination type), they freely support axial loads in both directions that are applied to the pulley element 17.

Each of the ball bearings 19 comprises an outer race 24 having an outer race track 23 in the deep-groove type formed around its inner peripheral surface, an inner race 26 having an inner race track 25 in the deep-groove type formed around its outer peripheral surface, and a plurality of balls 27 rollably located between the outer race trace 23 and inner race track 25. Also, the outer race 24 is fixed through interference fit to the inner peripheral surface on both ends of the pulley element 17, and the inner race 26 is fixed through interference fit to the small-diameter sections 22 formed around the outer peripheral surface on both ends of the sleeve 18. Moreover, in this state of each ball bearing 19, one of the end surfaces in the axial direction of the inner race 26 comes in contact with the stepped surface connecting the large diameter-section 21 and the small-diameter sections 22.

Also, in each ball bearing 19, the openings on both ends of the space where the balls 27 are located are blocked by seal rings 28a, 28b provided between the inner peripheral surfaces on both ends of the outer race 24 and the outer peripheral surfaces on both ends of the inner races 26. Lubricant such as grease is filled in the space to lubricate the points of rolling contact between the rolling contact surfaces of the balls 27 and the outer-race 23 and inner-race 25. The type of grease used in this case is not particularly limited, however, it is preferred that a grease having synthetic oil as the base oil, and a urethane type bodying or thickening agent, be used because of its excellent heat resistance (high-temperature stability).

Also, the construction of the seal rings 28a, 28b is not particularly limited. A general type seal ring comprising a circular-ring shaped core made of metal plate and an elastic material such as an elastomer like rubber reinforced with the metal core can be used. However, it is preferred that the seal rings 28a on the outside (side opposite from the roller clutch 20) of the ball bearings 19 be a so-called contact type seal ring whose inner peripheral edge comes in sliding contact all around the outer peripheral surface of the inner race 26. The reason for this is to prevent foreign matter, such as dirt or dust, flying from the outside from getting inside the bearing, as well as to prevent the grease inside the space from leaking out.

On the other hand, the seal rings 28b on the inside (side toward the roller clutch 20) can be a contact type, however, it is also possible to use so-called non-contact type of seal ring whose inner peripheral edge comes close to and faces the outer peripheral surface of the inner race 26 through a labyrinth space. By using a non-contact type of seal ring, it is possible to reduce the rotation resistance during overrun of the roller clutch 20 by that amount. Furthermore, as will be described later, when the roller clutch 20 and the ball bearings 19 are lubricated using the same type of grease, it is possible to even omit the seal rings 28b on the inside. In either case, it is preferred that fluororubber having excellent heat resistance be used as the elastic material of the seal rings 28a, 28b, in order to obtain excellent durability regardless of friction heat that occurs when the outer race 24 rotates at high speed while the inner race 26 is stopped.

It is also possible to form a minute hole enough for air to pass through in the outside seal ring 28a mounted in at least one of the ball bearings 19 (when the inside rings 28b are contact type, a hole can be formed in the inside seal ring 28b as well). When the ball bearings 19 are fitted between the inner peripheral surface of the pulley element 17 and the outer peripheral surface of the sleeve 18, these holes allow air in the space between the peripheral surfaces to be output, and have the function of suppressing an increase in pressure inside this space. By suppressing an increase in pressure in this space in this way, it is possible to prevent deformation such as burrs from occurring on the seal rings 28a, 28b installed in the ball bearings 19, and thus to prevent the seal formed by these seal rings 28a, 28b from becoming bad. Moreover, it is possible to prevent deformation even when the pressure inside the aforementioned space changes due to temperature change that occurs during operation and when stopped, and thus it is possible to prevent the seal from becoming bad.

Figure 1:
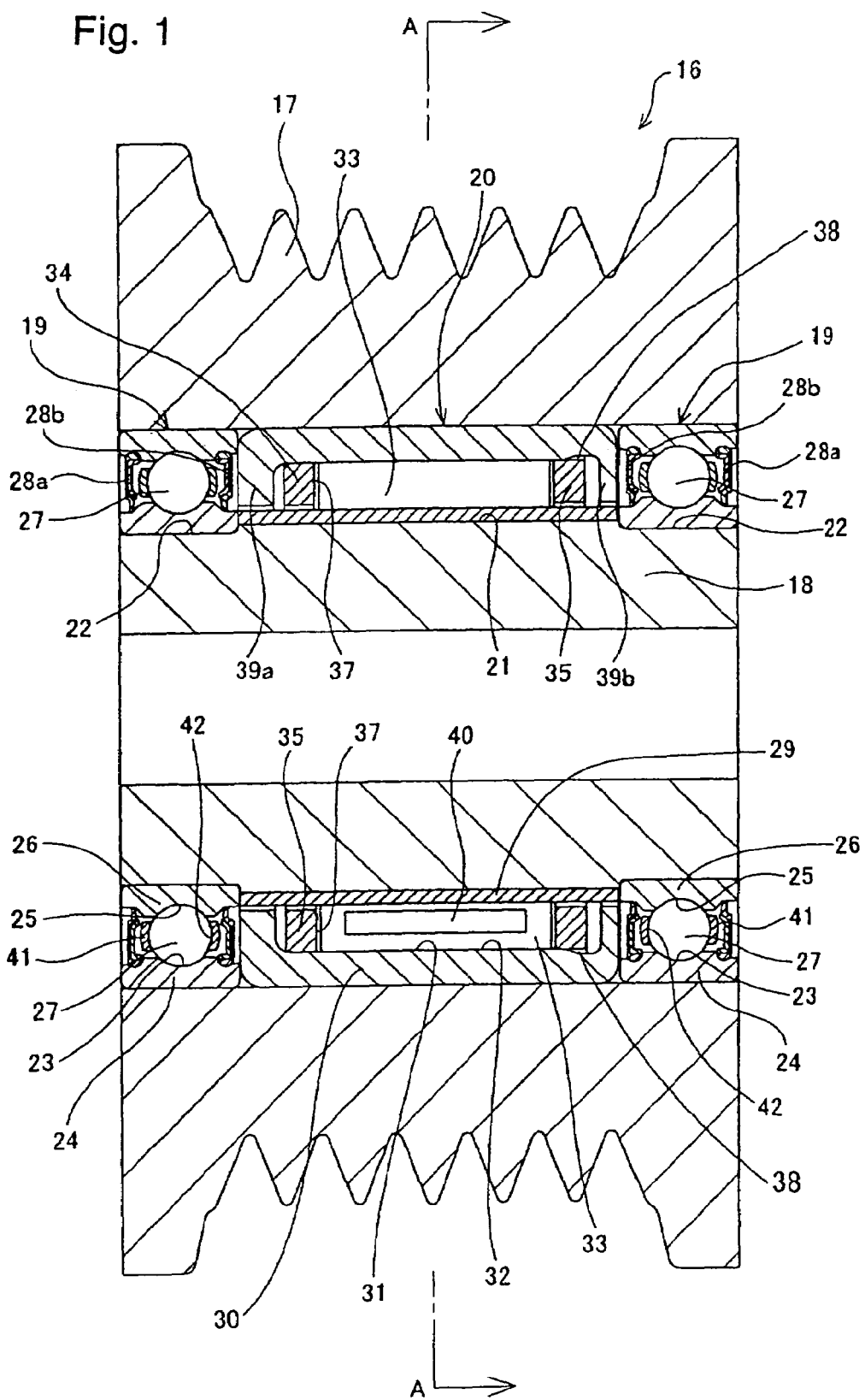
FIG. 1 is a cross sectional view to show a whole construction of a first example of embodiment of the present invention.

The construction and material of the retainer 41 that holds the balls 28 inside the ball bearings 19 such that they rotate freely are not particularly limited. It can be a pressed retainer in a wave-shape made of metal as shown in FIG. 1. However, in order to obtain even better durability, it is also possible to use a crown-shaped retainer made of synthetic resin as the retainer 41. In the case of using a synthetic resin retainer, the retainer is lighter than a metal retainer, so the response to changes in angular velocity is better. Also, when powder from abrasion of the retainer occurs, it is more difficult for the abrasion powder to cause the grease to become bad. Moreover, since the hardness of the abrasion powder is low, it does not cause damage such as indentation to the outer race tracks 23 or inner race tracks 25, and so it does not lower the flaking life of these tracks 23, 25. It is preferred that polyamide 46 having excellent heat resistance be used as the synthetic resin for this crown-shaped retainer. Also, in order to improve the strength for suppressing deformation during high-speed rotation, it is also possible for the synthetic resin to contain a reinforcing material such as glass fiber.

Figure 5:
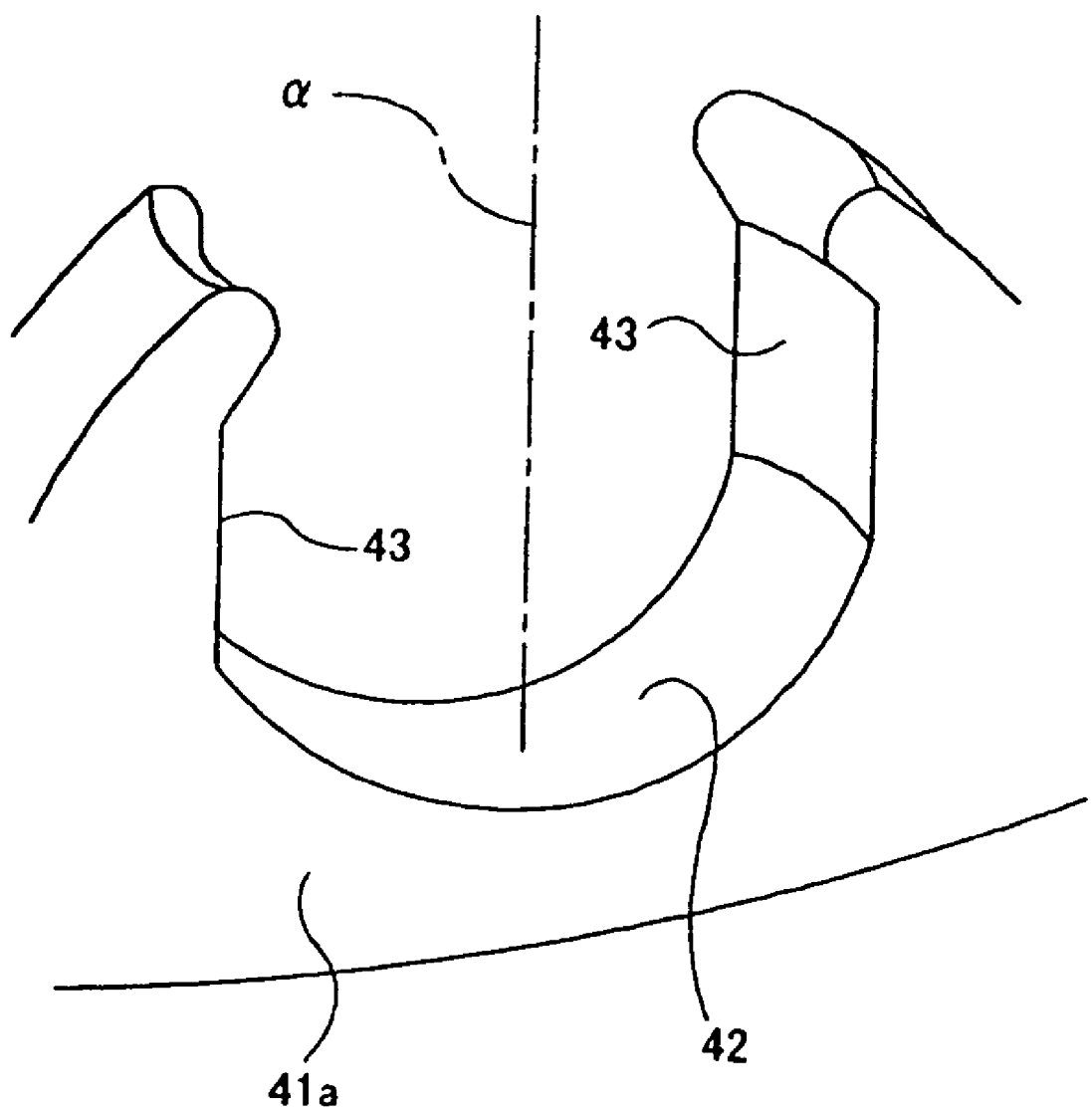
FIG. 5 is an enlarged view of part of the retainer of the support bearing in one example.

Furthermore, as shown in FIG. 5, when using a crown-shaped retainer, it is possible, on the inside of the pocket 42 for holding the balls 27, to form the sections on both ends in the circumferential direction that face the rolling contact surface of the balls 27 (so-called equator section where the balls 27 come in actual rolling contact with the outer race track 23 and inner race track 25) such that they have a partial cylindrical surface 43 whose center axis $\alpha$ is parallel with the center axis of the retainer 41a. By using a retainer 41a having pockets 42 with this kind of shape, it is possible to put a sufficient amount of grease between the inner peripheral surfaces of these pockets 42 and the rolling contact surfaces of the balls 27 to improve the lubrication of the ball bearings 19. Furthermore, it is possible to reduce the resistance that acts between the inner peripheral surfaces of the pockets 42 and the rolling contact surfaces of the balls 27, and reduce the rotation resistance of the ball bearings 19, and thus it is possible to reduce the rotation resistance during overrun of the roller clutch 20. Reducing this rotation resistance reduces the load on the engine 1 and contributes to the improvement of running performance such as acceleration performance and fuel-consumption performance.

Moreover, in the roller clutch 20, only when the pulley element 17 has a tendency to rotate in a specified direction relative to the sleeve 18, rotation force is freely transmitted between the pulley element 17 and the sleeve 18. In order to use this kind of roller clutch 20, the clutch inner ring 29 is tightly fitted onto the large-diameter section 21 of the sleeve 18. This clutch inner ring 29 is formed into a generally cylindrical shape by plastic working such as pressing of steel plate, such as carburized steel plate, and the inner and outer peripheral surfaces are both simple cylindrical surfaces. In other words, the clutch inner ring 29 is formed by performing heat treatment such as carburization or carbonitriding after performing plastic working such as pressing of steel plate such as carburized steel plate, or by performing heat treatment by normal quenching and tempering or nitriding of bearing steel.

Figure 2:
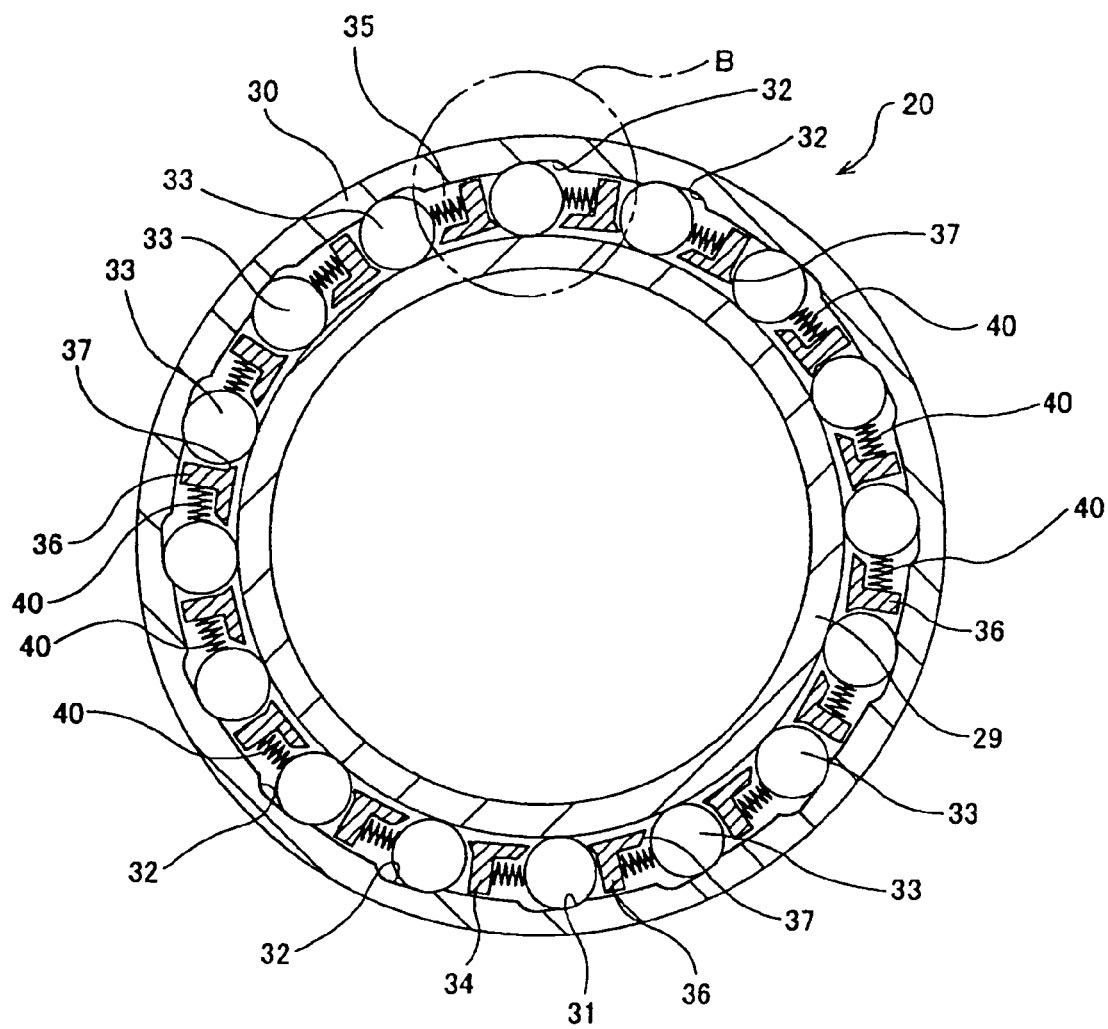
FIG. 2 is a cross sectional view taken along the line A-A in FIG. 1 to show the roller clutch only.
Figure 3:
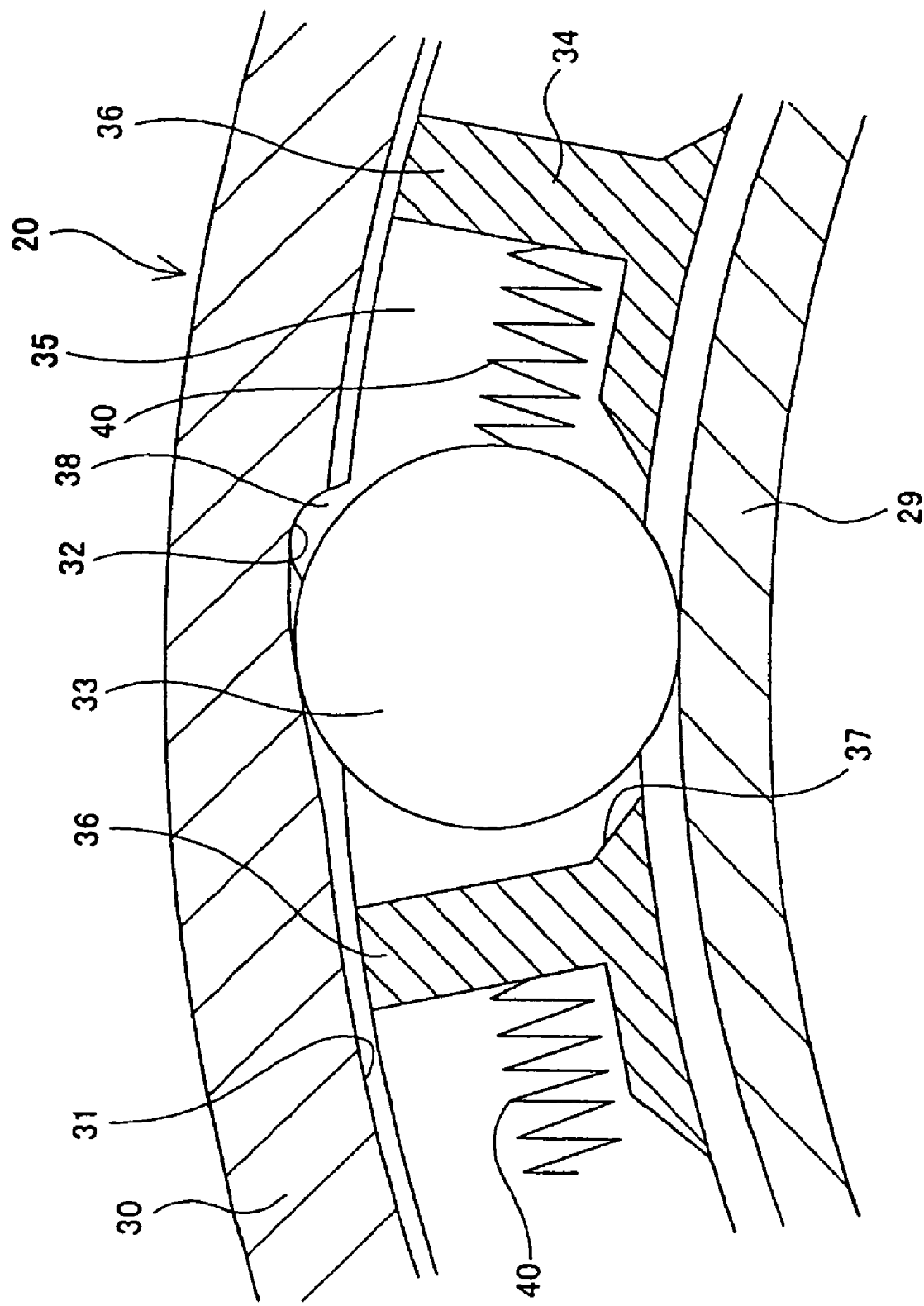
FIG. 3 is an enlarged view of Portion B in FIG. 2.

On the other hand, the inner peripheral surface of the clutch outer ring 30 which is tightly fitted onto the middle section of the inner peripheral surface of the pulley element 17, and it functions as a cam surface 31. In other words, by forming a plurality of concave sections 32 called ramp sections around the inner peripheral surface of the clutch outer ring 30 such that they are spaced uniformly in the circumferential direction as shown in FIG. 2 and FIG. 3, the inner peripheral surface functions as a cam surface 31. This kind of clutch outer ring 30 is also formed into a generally cylindrical shape by plastic working such as pressing of steel plate like carburized steel. That is, the clutch outer ring 30 is made by performing heat treatment such as carburization or carbonitriding after pressing of the steel plate like carburized steel.

Moreover, the plurality of rollers 33 that make up the clutch roller 20 together with the clutch inner ring 29 and clutch outer ring 30 are supported, such that they can rotate freely and move a little in the circumferential direction, by a clutch retainer 34 that is fitted onto the clutch outer ring 30 such that it cannot rotate with respect to the clutch outer ring

30. For these rollers 33, it is possible to use bearing steel that has been heat treated by normal quenching and tempering or by nitriding, ceramic, or chromium steel that has been heat treated by nitriding. Moreover, the clutch retainer 34 is formed into a generally cage-type cylindrical shape from a synthetic resin (for example, a synthetic resin like polyamide 66, polyamide 46 or polyphenylene sulfide that is mixed with about 20% glass fiber), and comprises a pair of circular ring shaped rim sections 35, and a plurality of a column sections 36 that connect these rim sections 35 together.

Also, the sections surrounded on four sides by the inside surfaces of the rim sections 35 and the side surfaces in the circumferential direction of the columns sections 36, define pockets 37 for holding the rollers 33 such that they can rotate freely as well as move freely a little in the circumferential direction. Moreover, as shown in FIG. 3, convex section 38 are formed at a plurality of locations around the outer peripheral surface of the rim sections 35 such that they are fitted with the concave section 32 formed on the inner peripheral surface of the clutch outer ring 30, such that the clutch retainer 34 is mounted to the clutch outer ring 30 such that it cannot rotate relative to the clutch outer ring 30. Also, by holding the clutch retainer 34 on both sides in the axial direction by inward facing collar sections 39*a*, 39*b* that are formed on both end sections in the axial direction of the clutch outer ring 30, this clutch retainer 34 is not able to move in the axial direction with respect to the clutch outer ring 30.

Furthermore, springs 40 are mounted as shown in FIGS. 2 and 3 on one of the side surfaces in the circumferential direction of the column sections 36 of the clutch retainer 34. These springs 40 that are located on each column section elastically press the rollers 33 that held in the pockets 37 in the same direction (to the left or counterclockwise direction in FIGS. 2 and 3) in the circumferential direction of the clutch retainer 34 toward the section in cylindrical space formed between the cam surface 31 and outer peripheral surface (cylindrical surface) of the clutch inner ring 29 where the width in the radial direction becomes narrow. In the example shown in the figures, the springs 40 are compression coil springs, however, actually plate springs that are made by bending spring steel into a triangular-shaped hook are often used for these springs 40. It is also possible to use synthetic resin springs that are made in one piece with the clutch retainer 34.

Moreover, in this example, the cross-sectional shape of the concave sections 32 that are formed on the inner peripheral surface of the clutch outer ring 30 is not straight line but a simple arc shape. The center of curvature of the arc of this cross-sectional shape is located away from the center of the clutch outer ring 30. Also, the radius of curvature of the arc and the center point are set such that this arc is a curve resembling a logarithmic spiral, and the so-called wedge angle is constant. This wedge angle is the angle between the tangent line at the point of contact between the concave sections 32 and the rolling contact surface of the rollers 33, and the tangent line at the point of contact between the outer peripheral surface of the clutch inner ring 29 and the rolling contact surface of the rollers 33. In this example, by suitably regulating the radius of curvature and center point of the arc, the wedge angle is nearly constant even when the rollers 33 are wedged into any section between the concave sections 32 and the outer peripheral surface of the clutch inner ring 29.

Figure 6:
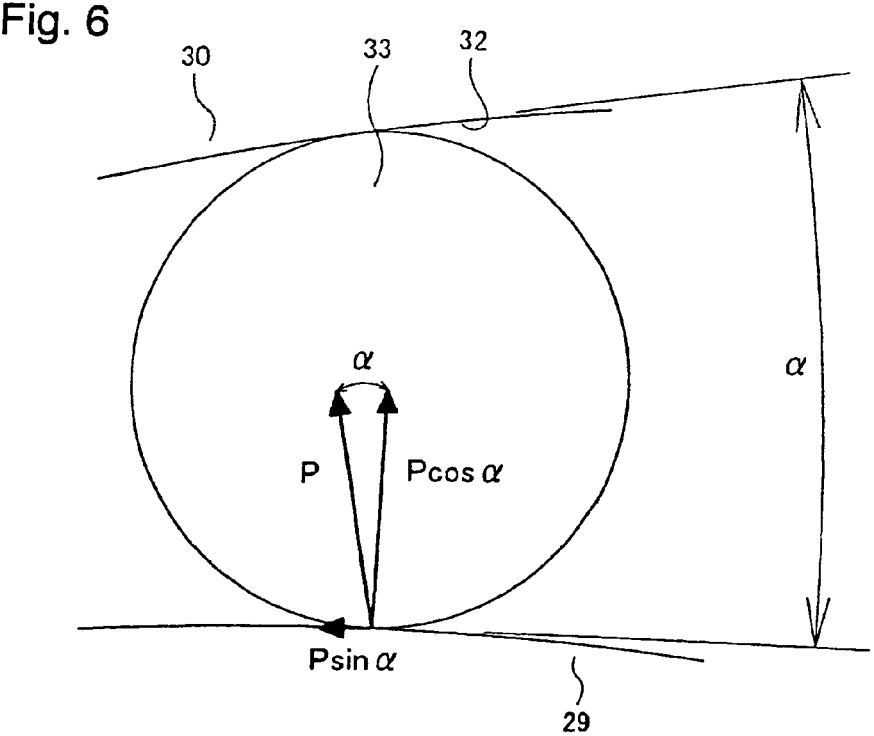
FIG. 6 is a schematic view to explain the size of the wedge angle which is desirable in achieving the locked state.

It is preferred that the size of the wedge angle be in the range from 8 degrees to 11 degrees. The reason for this is explained using FIG. 6. When the roller clutch 20 is transmitting torque between the pulley element 17 and sleeve 18, the load applied to the rollers 33 is assumed to be the same, and with respect to the load P applied to the roller 33 from the outer peripheral surface of the clutch inner ring 29, the smaller the wedge angle $\alpha$ is, the component of the load acting in the circumferential direction P·sin $\alpha$ becomes small. This means that the toque capacity of the roller clutch is small, so from the aspect of maintaining the capability to transmit torque, it is not desirable. On the other hand, the condition for the roller clutch 20 becoming locked so that it is possible to transmit torque is given by $\tan \alpha \leq \mu$ when $\mu$ is taken to be the coefficient of friction of the contact surface. From this equation as the wedge angle $\alpha$ becomes large, it is seen that the roller clutch 20 does not lock and torque cannot be transmitted between the pulley element 17 and the sleeve 18. In this example, the wedge angle $\alpha$ is regulated to being in the range from 8 degrees to 11 degrees, so it is possible to maintain the necessary torque capacity, and since the locked state is possible, torque can be stably transmitted.

This kind of roller clutch 20 is also lubricated by grease that is filled inside. The type of grease used in this case is not particularly limited, however, it is preferred that a grease having synthetic oil as the base oil, and a urethane type bodying or thickening agent, be used because of its excellent heat resistance (high-temperature stability) and its shear stability. Particularly in the case of the roller clutch 20, friction may occur at the section of contact between the roller contact surfaces of the rollers 33 and the outer peripheral surface of the clutch inner ring 29 and the inner peripheral surface of the clutch outer ring 30. In this state, a large shear force is applied to the grease, so in order to sufficiently maintain durability of the roller clutch 20, it is necessary to use grease that has excellent shear stability. Since grease having a urethane type bodying or thickening agent has excellent shear stability, it can be preferably used. Also, when the base oil is a synthetic oil having a low fluid point, sufficient lubrication in a wide range from the low-temperature environment when starting, to a high-temperature environment after starting can be obtained. Therefore, it is possible to effectively prevent the occurrence of damage such as flaking or seizure between the rolling contact surfaces of the rollers 33 and the outer peripheral surface of the clutch inner ring 29 and the inner peripheral surface of the clutch outer ring 30.

The grease suitable for lubrication of the roller clutch 20 is also the grease suitable for lubrication of the ball bearings 19. Therefore, it is possible to fill the ball bearings 19, 19 and the roller clutch 20 with the same kind of grease. In that case, it is possible to prevent problems such as a degradation of greases which may occur when the greases filled in sections are mixed to each other.

With the roller clutch 20 constructed as described above, the pulley element 17 and sleeve 18 have a tendency to rotate relatively in a specified direction, or in other words, when the sleeve 18 has a tendency to rotate relative to the pulley element 17 in the direction (counterclockwise in FIGS. 2 and 3) that the springs 40 are pushing the rollers 33, the rollers 33 are wedged into the section of the cylindrical space where the width in the radial direction becomes narrow. In this state, relative rotation of the sleeve 18 and the pulley element 17 is not possible (locked state). On the other hand, when there is a tendency for relative rotation of the pulley element 17 and sleeve 18 in the direction opposite the specified direction, or in other words, when there is a tendency for the sleeve 18 to rotate relative to the pulley element 17 in the direction opposite to the direction that the springs 40 press the rollers 33 (clockwise direction in FIGS. 2 and 3), the rollers move back against the elastic force of the springs 40 into the section of the cylindrical space where the width in the radial direction is wide, and there is relative rotation of the pulley element 17 and sleeve 18 (overrun state).

The function of the pulley apparatus 16 with built-in roller clutch, which is the rotation-transmission apparatus with built-in roller clutch for starting an engine of this example constructed as described above, when the pulley apparatus 16 is used as a drive-pulley apparatus 6 for an engine-starting apparatus for the idling-stop vehicle shown in FIG. 55, is as follows. First, when starting the engine, electric power flows to the starter motor 4, and the sleeve 18 is fitted and fixed onto that the tip end of the rotation-drive shaft 5 and the clutch inner ring 29 that is fitted and fixed onto this sleeve 18 are rotated in the counterclockwise direction in FIGS. 2 and 3. Therefore, the rollers 33 move in the counterclockwise direction of the FIGS. 2 and 3 and move toward the section of the cylindrical space between the outer peripheral surface of the clutch inner ring 29 and inner peripheral surface of the clutch outer ring 30 where the width in the radial direction becomes narrow. As a result, the rolling contact surfaces of the rollers 33 are wedged into the wedge shape between the outer peripheral surface of the clutch inner ring 29 and inner peripheral surface of the clutch outer ring 30, and roller clutch 20 becomes locked and power is transmitted from the clutch inner ring 29 to the clutch outer ring 30. In this state, the crankshaft 2 (see FIG. 55) of the engine 1 is rotated and driven by way of the pulley element 17, endless belt 7 and follower pulley 3, and the engine 1 starts.

After the engine 1 starts, electric power stops flowing to the starter motor 4 and the rotation-drive shaft 5 stops. In this state, the pulley element 17 is rotated and driven by the crankshaft 2 of the engine 1 by way of the follower pulley 3 and endless belt 7, and the clutch outer ring 30 continues to rotate on the counterclockwise direction in FIGS. 2 and 3. As a result, the roller clutch 20 is in the overrun state, and the rotation of the pulley element 17 no longer is transmitted to the sleeve 18. Therefore, when the engine 1 is operating, the starter motor 4 does not become a load against the rotation of the engine 1.

When the roller clutch 20 is in the overrun state like this, the rollers 33 are pressed by the column sections 36 of the clutch retainer 34 and the springs 40, and rotate together with the clutch outer ring 30 that is fitted into the pulley element 17. However, when the rpm of this clutch outer ring 30 is less than the rpm necessary to start the engine 1 (for example, speed after applying the transmission ratio of the belt transmission to 400 rpm to 500 rpm in the case of a gasoline engine), the centrifugal force acting on the rollers 33 is not a value that will compress the springs 40. Also, when starting the engine 1, a force in the same direction as the elastic force of the springs 40 is applied to the rollers 33 from the outer peripheral surface of the clutch inner ring 29. Therefore, when starting the engine, the rollers 33 definitely move toward the section of the space between the outer peripheral surface of the clutch inner ring 29 and the inner peripheral surface of the clutch outer ring 30 where the width is narrow, and the roller clutch 20 becomes locked.

Figure 4:
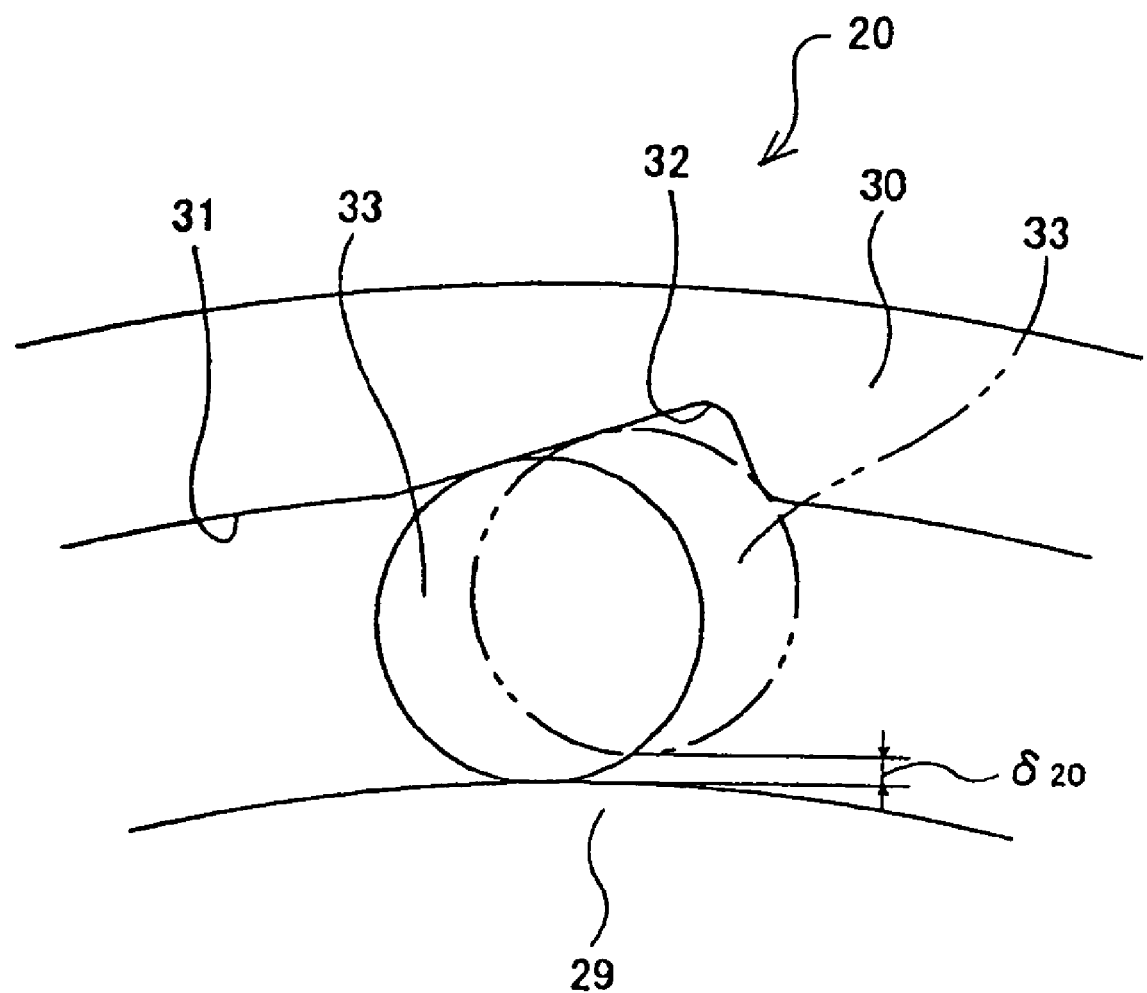
FIG. 4 is a schematic view to show a portion of the roller clutch, taken in the same direction to that of FIG. 3, to explain the size of the clearance with respect to the roller clutch.
Figure 7:
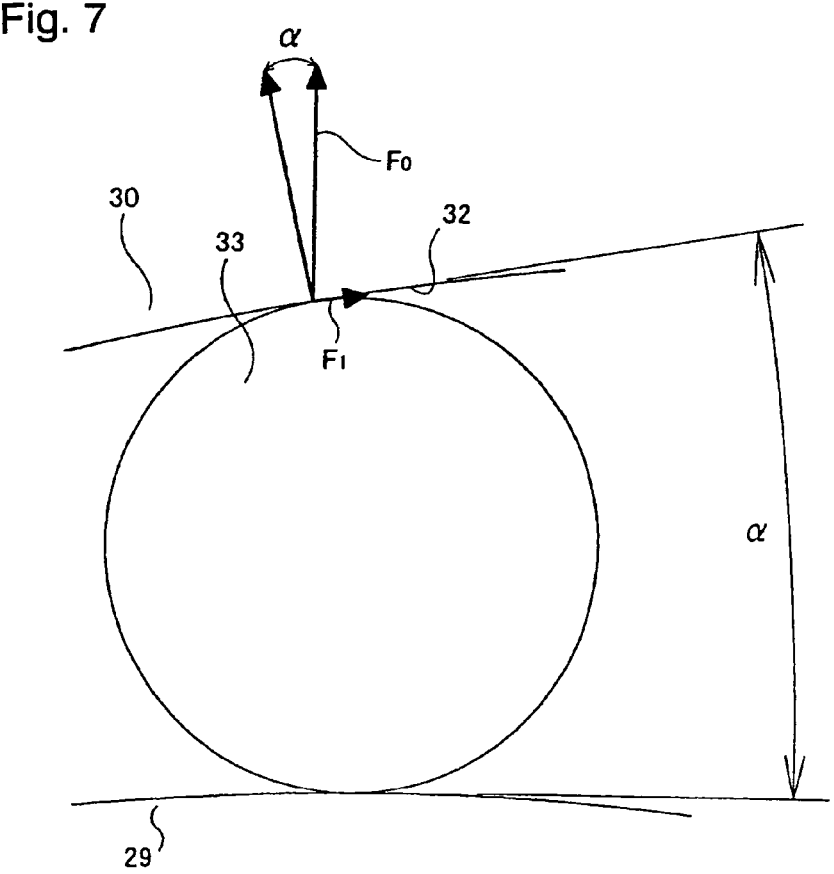
FIG. 7 is a schematic view to explain the size of the wedge angle which is desirable in separating the rolling contact surface of the roller and the outer peripheral surface of the clutch inner race.

On the other hand, when the engine 1 starts and the rpm of the clutch outer ring 30 is greater than the idling rpm of the engine 1 (for example, speed after applying the transmission ratio of the belt transmission to 700 rpm to 800 rpm in the case of a gasoline engine), not only is the connection of the roller clutch 20 broken (overrun state), but as shown by the dashed line in FIG. 4, the rolling contact surfaces of the rollers 33 of the roller clutch 20 become separated from the outer peripheral surface of the clutch inner ring 29. This will be explained with reference to FIG. 7.

When the engine 1 is turning, a centrifugal force $F_0 (= m \cdot \omega^2 \cdot r)$ acts on the rollers 33, and the rollers 33 are pressed to the bottom of the concave sections 32. Since the bottom surfaces of these concave sections 32 are inclined, the rollers 33 have a tendency to be moved by the component force $F_1 (= F_0 \cdot \sin \alpha)$ in the direction that will press the springs 40 (compress the springs 40) (see FIGS. 2 and 3). Also, after the engine 1 starts, after the electric power flowing to the starter motor 4 stops, the clutch inner ring 29 also stops, so the force moving the roller 33 in the counterclockwise direction of FIG. 3 is just the elastic force of the springs 40.

In this state, the centrifugal force $F_0$ increases due to the increase in rotation force, and when the magnitude of the component force $F_1$ becomes larger than the elastic force of the springs 40, the rollers 33 compress the springs 40 and move toward the deep section of the concave section 32, and move from the state shown by the solid line in FIG. 4 to the state shown by the dashed line. As a result, the rolling contact surfaces of the rollers 33 separate from the outer peripheral surface of the clutch inner ring 29. In this state, the heat of friction that occurs inside the roller clutch 20 is suppressed to a minimum even though the engine 1 is turning at high speed, and as described above, this makes it possible to improve the durability of the roller clutch 20 and the adjacent ball bearings 19. Of course, it is also possible to prevent damage to the roller clutch 20 itself due to abnormal wear, seizure or the like.

In order for the rolling contact surfaces of the rollers 33 to actually become separated from the outer peripheral surface of the clutch inner ring 29 after the engine starts in this way, it is preferable that the wedge angle $\alpha$ be set near the upper limit of the range from 8 degrees to 11 degrees, that is 9°30' to 10°30'. The reason for this is, that the larger the wedge angle $\alpha$ is, the larger the component force $F_1$ of the centrifugal force $F_0$ becomes, and thus it is easier to compress the springs 40 and for the rolling contact surfaces of the rollers 33 to become separated from the outer peripheral surface of the clutch inner ring 29.

On the other hand, in the case where the pulley apparatus 16 with built-in roller clutch is installed in the auxiliary rotation-drive section of an automobile, the wide range of operating temperature must be taken into consideration. In other words, when used at low temperature, there are times when it is not possible to increase the wedge angle $\alpha$ so much in order to securely reach the locked state even when it becomes difficult for the rollers 33 to become wedged in the space between the outer peripheral surface of the clutch inner ring 29 and the inner peripheral surface of the clutch outer ring 30 due to the effect of the fluidity of the grease. In this case, the wedge angle $\alpha$ is set near the lower limit of the range 8 degrees to 11 degrees.

Moreover, in the case of this example, the depth of the concave sections 32 must be adequately regulated in order for the rolling contact surfaces of the rollers 33 to separate from the outer peripheral surface of the clutch inner ring 29 after the engine starts as described above. In other words, when the rollers 33 are located in the deepest section of the concave sections 32 as shown by the dashed line in FIG. 4, the size of the gap $\delta_{20}$ that exists between the rolling contact surfaces of the rollers 33 and the outer peripheral surface of the clutch inner ring 29 is larger than the size of the radial gap $\delta_{19}$ of the ball bearings 19 ($\delta_{20} < \delta_{19}$). It should be note that the gap $\delta_{20}$ is a radius dimension and the radial gap $\delta_{19}$ is a diameter dimension. Therefore, even when the center axis of the clutch inner ring 29 and the center axis of the clutch outer ring 30 are eccentric with respect to each other due to the radial gap $\delta_{19}$ of the ball bearings 19 (by just the amount of this radial gap $\delta_{19}$), the rolling contact surfaces of all of the rollers 33 will securely separate from the outer peripheral surface of the clutch inner ring 29 after the engine starts.

The rpm of the clutch outer ring 30 at which the rolling contact surfaces of the rollers 33 will separate from the outer peripheral surface of the clutch inner ring 29 is regulated in consideration of the durability of the roller clutch 20, and it is preferably set as low a possible such that the engagement of roller clutch 20 is secured when starting the engine 1. However, in this case, taking into consideration the degradation over time of the springs 40, in order that the engagement of roller clutch 20 is securely made even when the elastic force of the springs 40 decreases a little, for example it is considered that, in the case of a new part, the rpm of the clutch outer ring 30 is set to a value such that the rolling contact surfaces separate from the outer peripheral surface when the rpm of the crankshaft 2 of the engine 1 is from 1000 rpm to 1500 rpm. In this case, in the initial state, when the engine 1 is idling, the rolling contact surfaces come in friction contact with the outer peripheral surface, however, the contact pressure at the rubbing surfaces in this case becomes very small due to the effect of the centrifugal force. Also, since the rpm itself is low, the friction heat and wear that occur on the rubbing surfaces is kept to a minimum.

Figure 8:
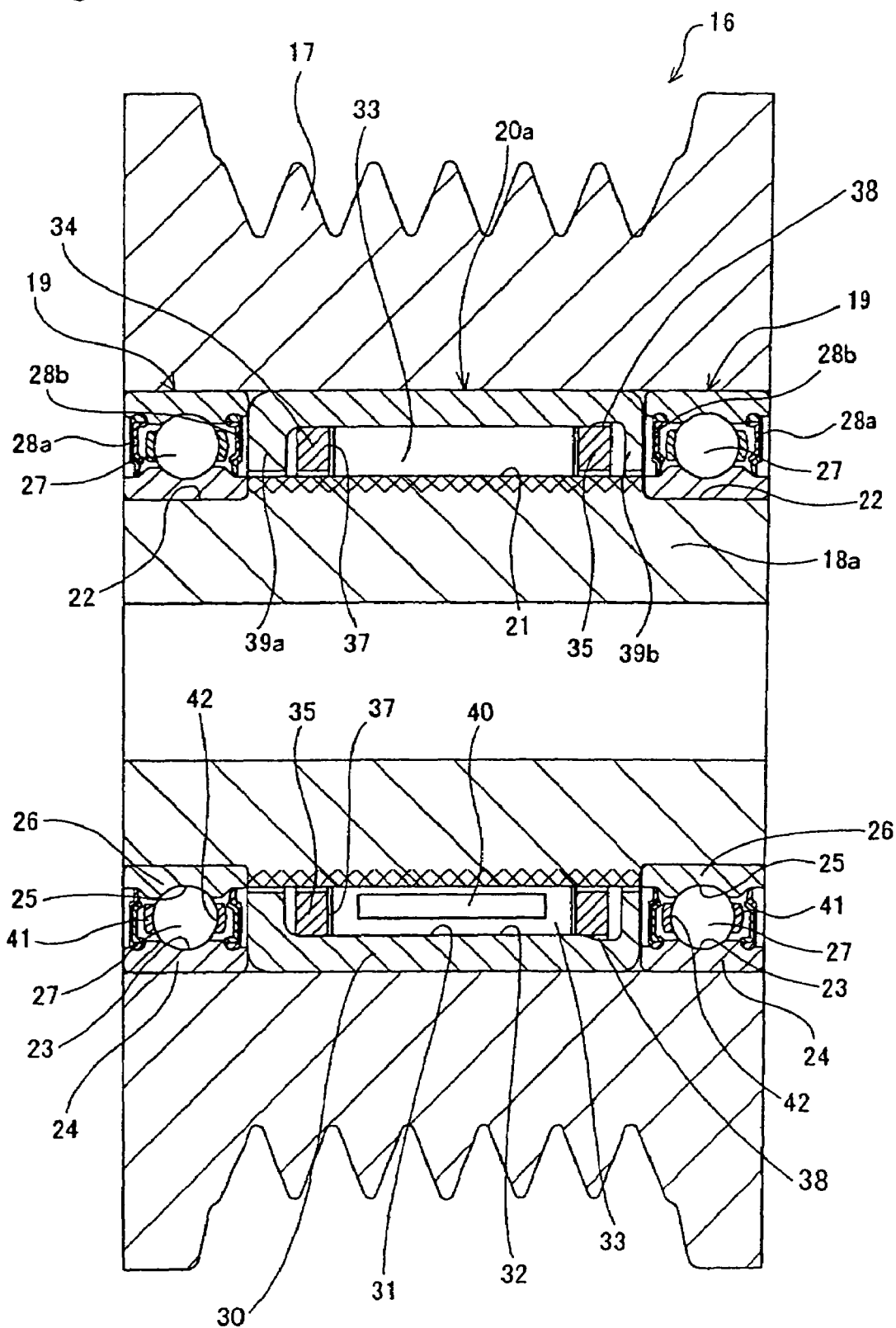
FIG. 8 is a cross sectional view to show the whole construction of the second example of embodiment of the present invention.

Next, FIG. 8 shows a second example of the embodiment of the invention. In this example, the independent clutch inner ring 29 is omitted from the construction of the first example shown in FIG. 1, and the middle section of the sleeve 18a is made to function as the clutch inner ring of the roller clutch 20a. In order for this, in this example, the surface layer (the diagonal cross section shown in FIG. 8) of the large-diameter section 21 formed in the middle section of the sleeve 18a is hardened by heat treatment such as induction heat treatment or carbonitriding, and the hardness of the surface of this large-diameter section 21 is made to be Hv 500 or more.

By using this kind of construction, this example does not require an independent clutch inner ring 29, and so it is possible to simplify part manufacturing, part management and assembly, and thus it is possible to reduce costs. Also, since the number of parts is decreased, assembly error can be reduced, and thus it is possible to improve performance due to the improvement of precision of the pulley apparatus with built-in roller clutch. In order to prevent deformation of the rolling contact surfaces of the rollers 33 when pressed hard, surface hardening is performed for the surface layer of the large-diameter section 21 only, so the section near the inner peripheral surface of the sleeve 18a is left as is without being quench-hardened. As a result, processing work such as forming a male screw or spline on the inner peripheral surface of the sleeve 18a can be performed easily. Therefore, there is no limitation in the structure where the sleeve 18a is fitted onto the end section of the rotation-drive shaft 5 (see FIG. 55). When applying the invention, the sleeve can also be omitted, and the outer peripheral surface of the rotating shaft, such as the rotation-drive shaft 5, itself can be used as the inner race track for clutch that comes in contact with the rolling contact surfaces of the rollers of the roller clutch. In this case, the inner race of the support bearings is fitted directly onto the outer peripheral surface of the rotating shaft, such as the rotation-drive shaft 5.

In each of the examples described above, the case of installing and using the rotation-transmission apparatus with built-in roller clutch in the engine starting apparatus for an idling-stop vehicle was explained, however, application of the examples described above is not limited to an engine starting apparatus. Use of the construction of the examples described above is effective in applications where the rpm of the rotating members in the overrun state is faster than the rpm of the rotating members in the locked state, and where the operating time in the overrun state is long. As an example of this kind of application, is the auxiliary drive apparatus such as a compressor that is installed in an idling-stop vehicle.

Figure 9:
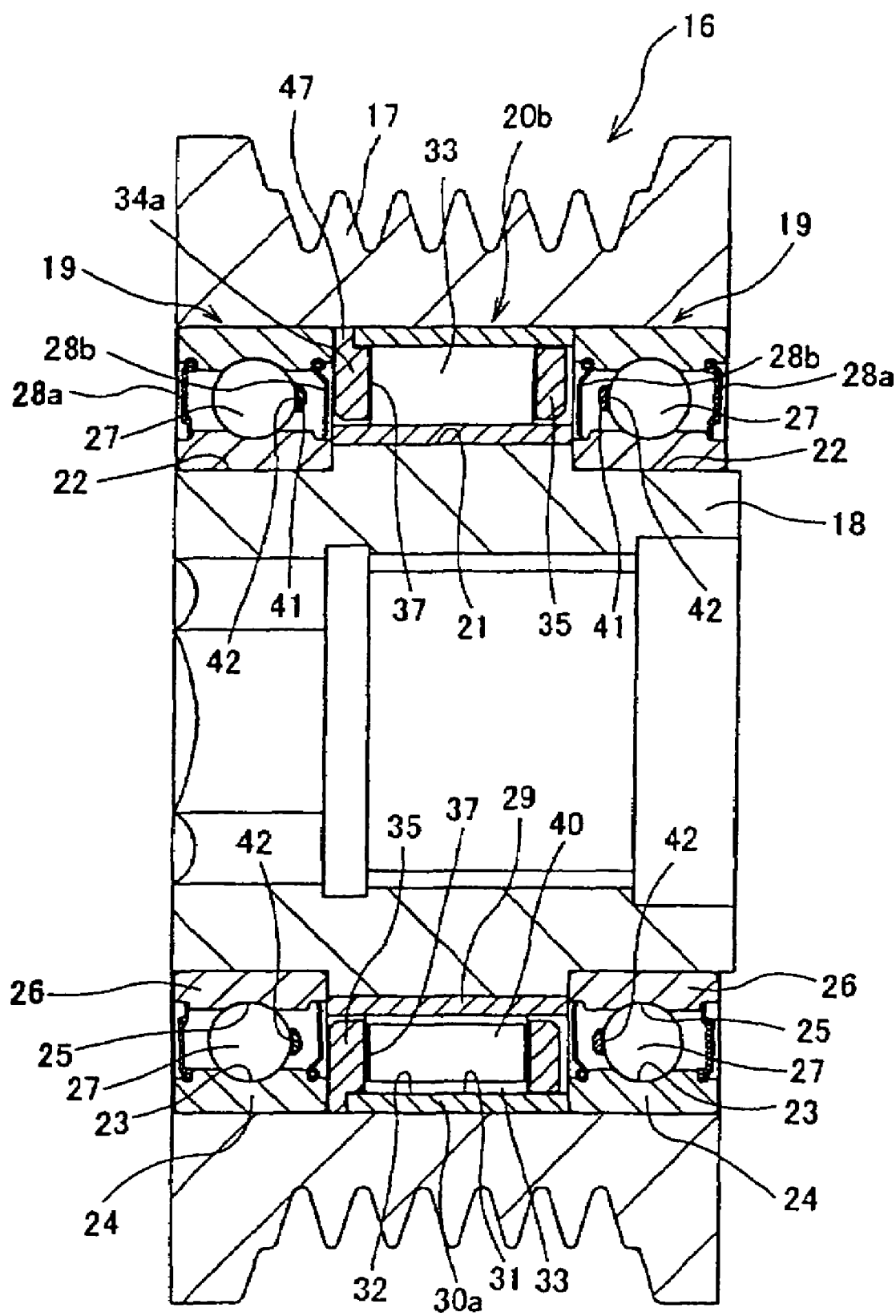
FIG. 9 is a cross sectional view to show the whole construction of the third example of embodiment of the present invention.

Furthermore, when applying this invention, the construction of each of the components of the rotation-drive-transmission apparatus with built-in roller clutch can be changed as long at the elements given in the claims of this disclosure are satisfied. First, in the case of the third example of the invention shown in FIG. 9, a cylindrical shaped member that does not have bent sections on both ends is used as the clutch outer ring 30a. Together with this, a collar section 47 that protrudes outward in the radial direction is formed around the outer peripheral surface on the end section of the clutch retainer 34a is held between the clutch outer ring 30a and the outer race 24 of the ball bearing 19 to regulate the position in the axial direction of the clutch retainer 34a.

Figure 10:
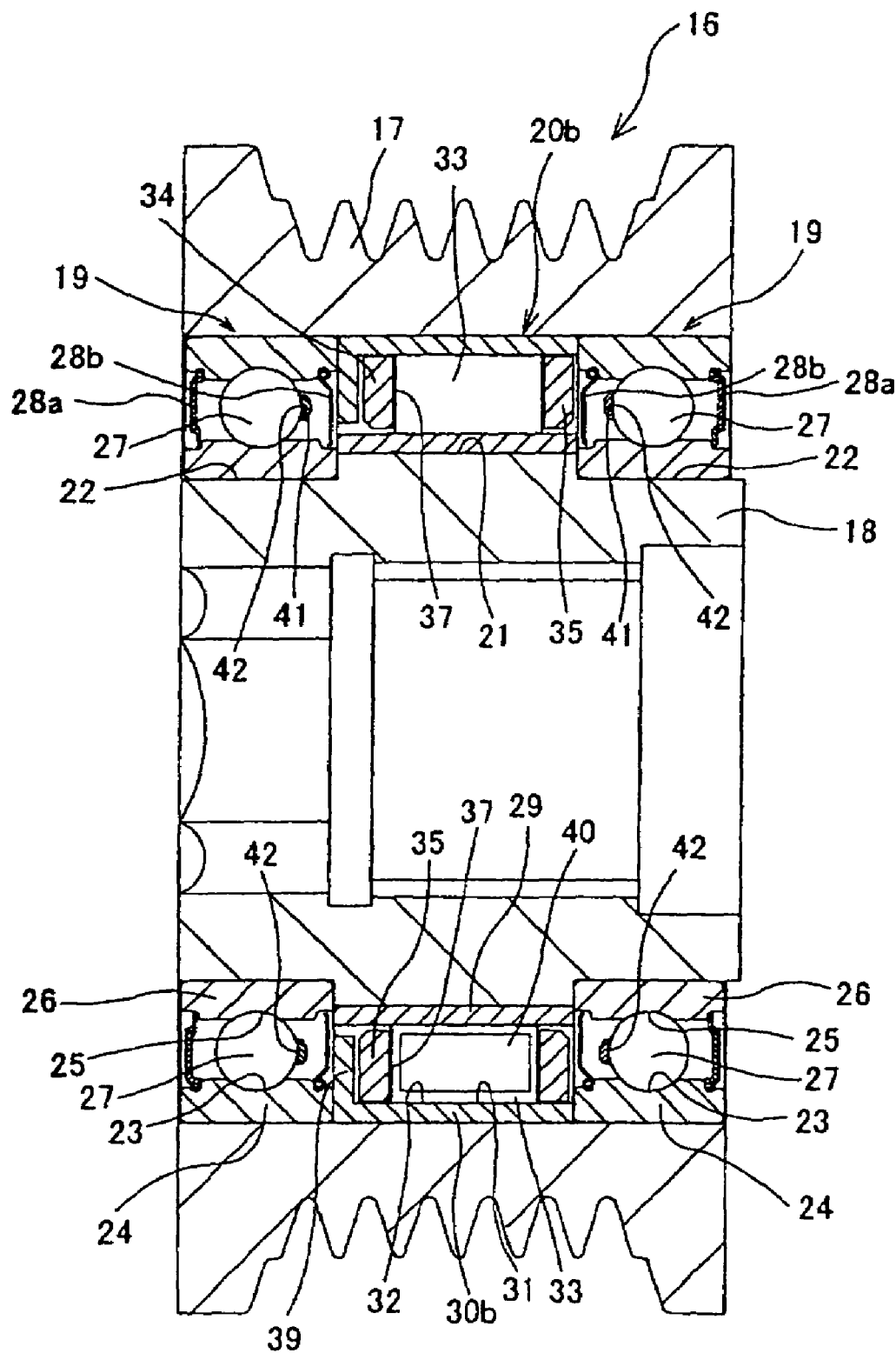
FIG. 10 is a cross sectional view to show the whole construction of the fourth example of embodiment of the present invention.

Next, in the case of a fourth example shown in FIG. 10, a member on which an inward facing collar section 39 is formed on only one end section (left end section in FIG. 10) is used as the clutch outer ring 30b. In this example, the position in the axial direction of the clutch outer ring 30b is regulated by being held between the outer races 24 of the pair of ball bearings 19. Also, the position in the axial direction of the clutch retainer 34 is regulated by the inward facing collar section 39 and one of the outer races 24 (the race on the right side in FIG. 10).

Figure 11:
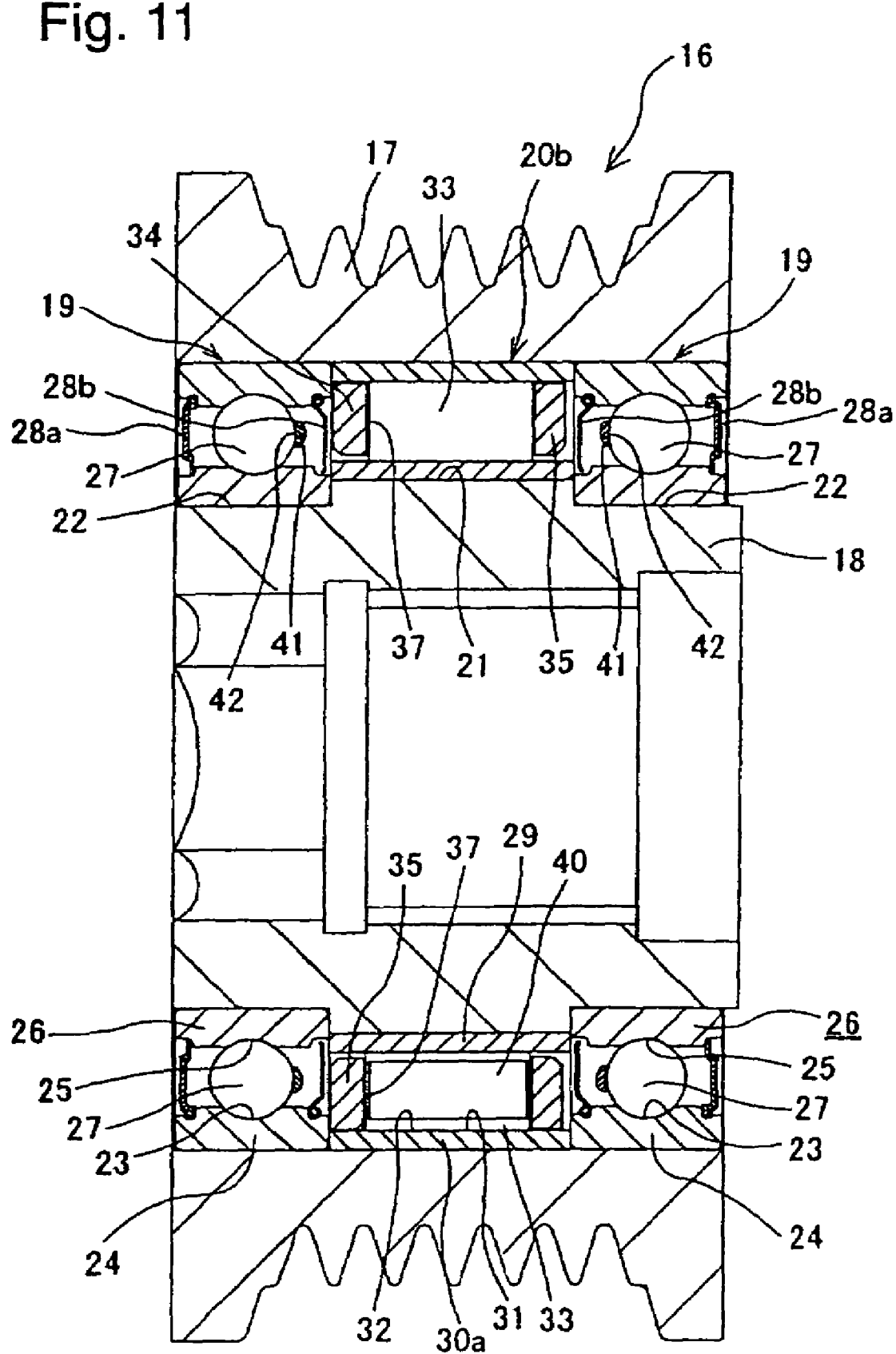
FIG. 11 is a cross sectional view to show the whole construction of the fifth example of embodiment of the present invention.

Next, in the case of a fifth example shown in FIG. 11, a cylindrical member that does not have bent sections on both ends is used as the clutch outer ring 30a. Also, the position in the axial direction of the clutch retainer 34 is regulated by the outer races 24 of the pair of ball bearings 19.

Figure 12:
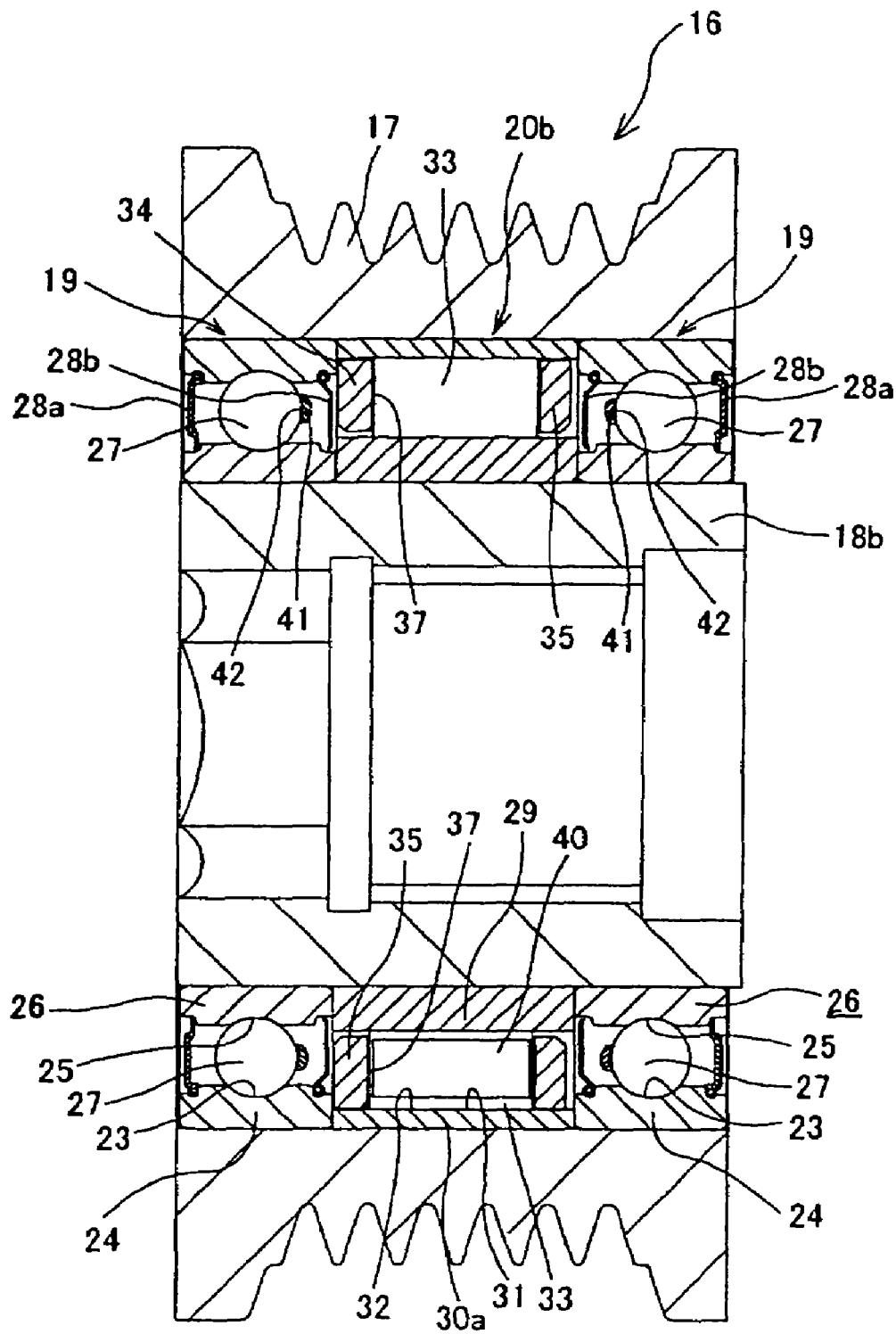
FIG. 12 is a cross sectional view to show the whole construction of the sixth example of embodiment of the present invention.

Next, in the case of a sixth example shown in FIG. 12, a cylindrical member that does not have bent sections on both ends is used as the clutch outer ring 30a. Also, the outer peripheral surface of the sleeve 18b is a simple cylindrical surface that does not have a stepped section in the middle. The clutch inner ring 29 is tightly fitted onto the middle section in the axial direction of this sleeve 18b through interference fit.

Figure 13:
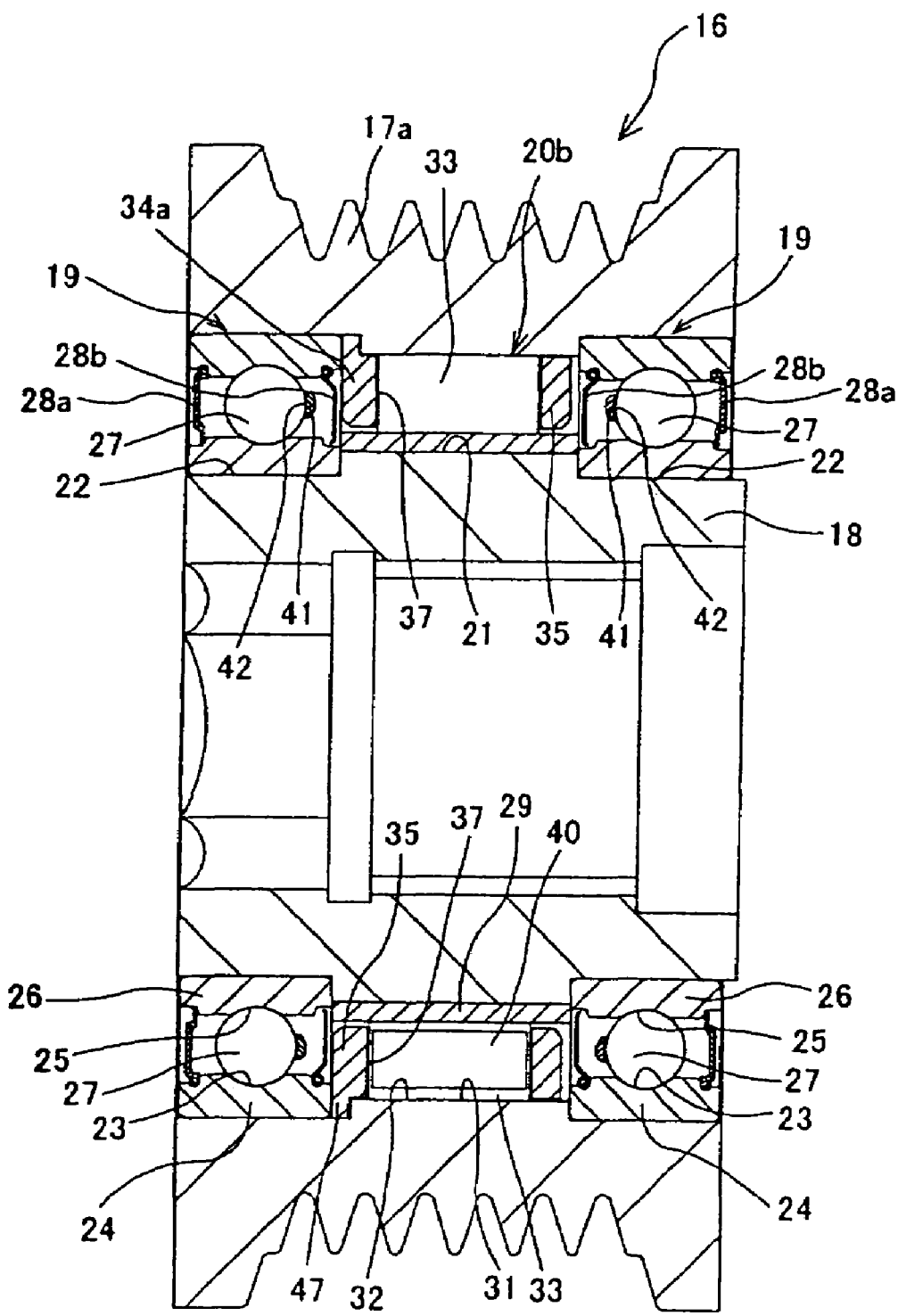
FIG. 13 is a cross sectional view to show the whole construction of the seventh example of embodiment of the present invention.

Next, in the case of a seventh example shown in FIG. 13, the inner peripheral surface in the middle section of the pulley element 17a has a smaller diameter than on both ends, and the cam surface 31 is formed directly on this inner peripheral surface in the middle section. Corresponding to this, a collar section 47 is formed around the outer peripheral surface on one end of the clutch retainer 34a to protrude outward in the radial direction, and held between the end surface of the section in the middle section where the diameter becomes smaller and the outer race 24 of the ball bearing 19, so as to regulate the position in the axial direction of the clutch retainer 34a.

Figure 14:
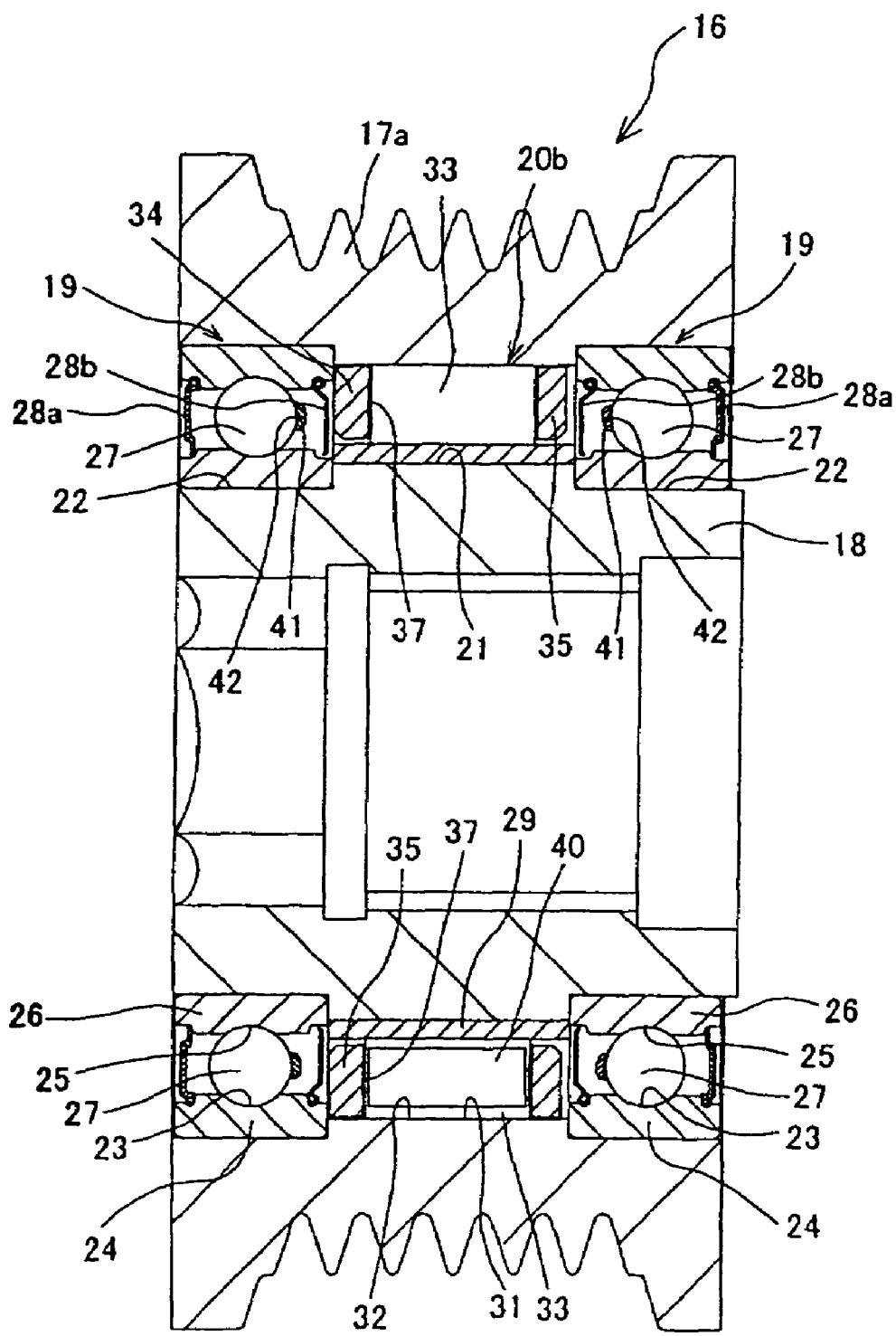
FIG. 14 is a cross sectional view to show the whole construction of the eighth example of embodiment of the present invention.

Next, in the case of an eighth example shown in FIG. 14, the inner peripheral surface in the middle section of the pulley element 17a has a smaller diameter than on both ends, and the cam surface 31 is formed directly on this inner peripheral surface in the middle section. Also, the position in the axial direction of the clutch retainer 34 is regulated by the outer races 24 of the pair of ball bearings 19.

Figure 15:
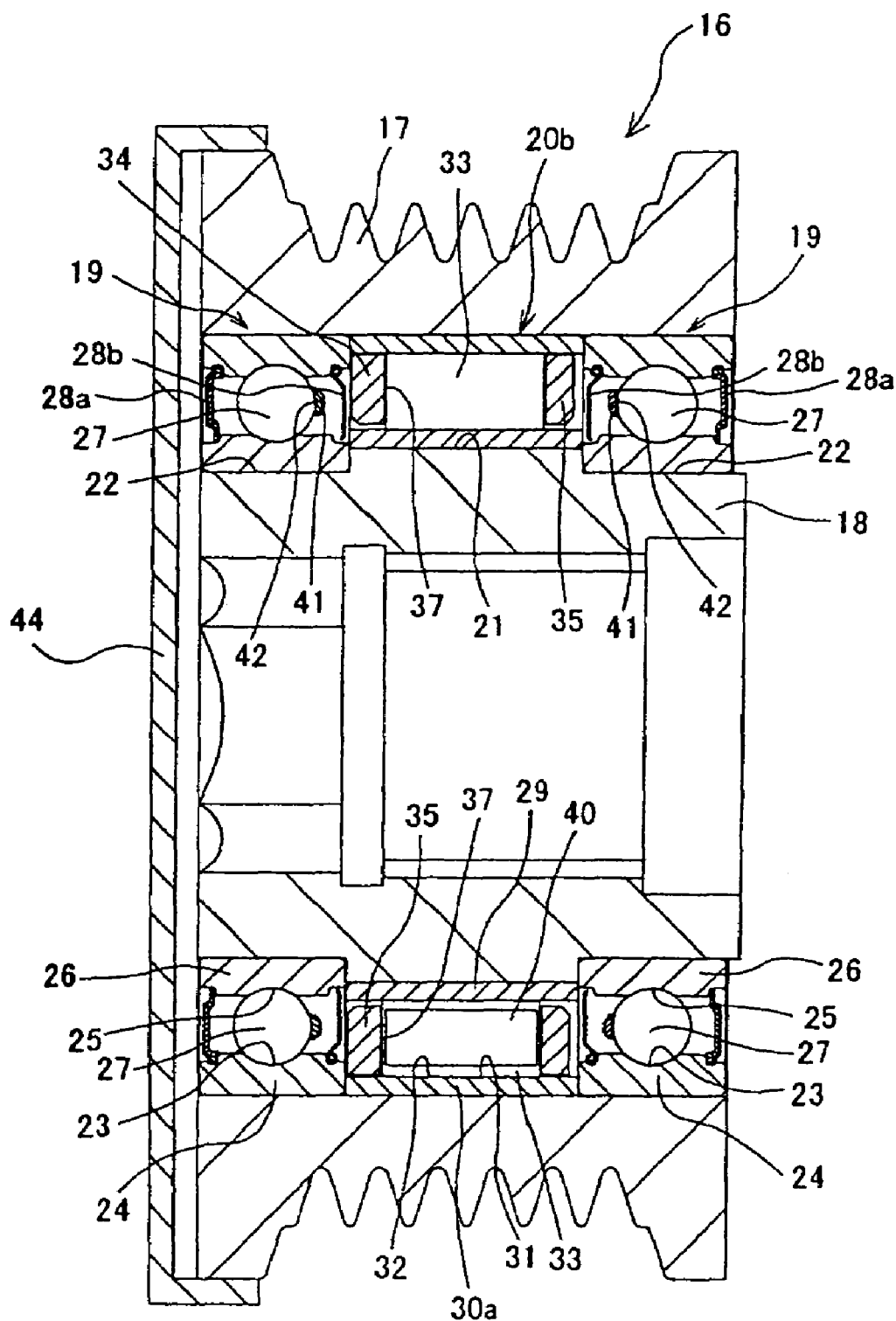
FIG. 15 is a cross sectional view to show the whole construction of the ninth example of embodiment of the present invention.

Next, in the case of a ninth example shown in FIG. 15, an end cap 44 the is made of synthetic resin or metal and formed into a petri-dish shape is fitted onto the outside end (left end in FIG. 15) of the pulley element 17, and it prevents foreign matter from getting into the space where the ball bearings 19 and roller clutch 20b are housed.

Figure 16:
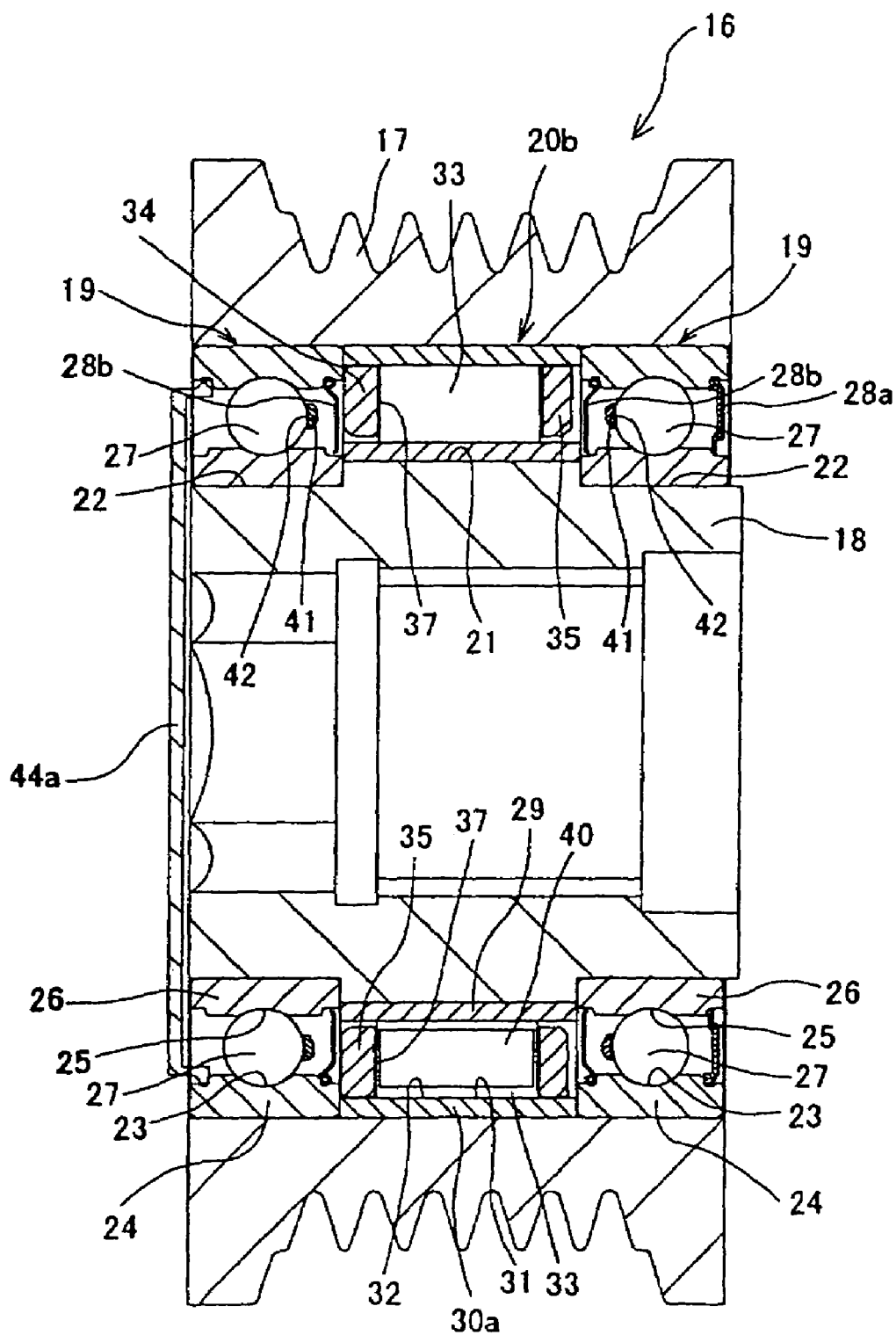
FIG. 16 is a cross sectional view to show the whole construction of the tenth example of embodiment of the present invention.

Next, in the case of a tenth example shown in FIG. 16 the outer edge section of an end cap 44a is fitted into an attachment groove that is formed on the inner peripheral surface on the outside end of the outer race 24 of the outside (left side in FIG. 16) ball bearing 19, and it prevents foreign matter from getting into the space where the ball bearings 19 and roller clutch 20b are housed.

Figure 17:
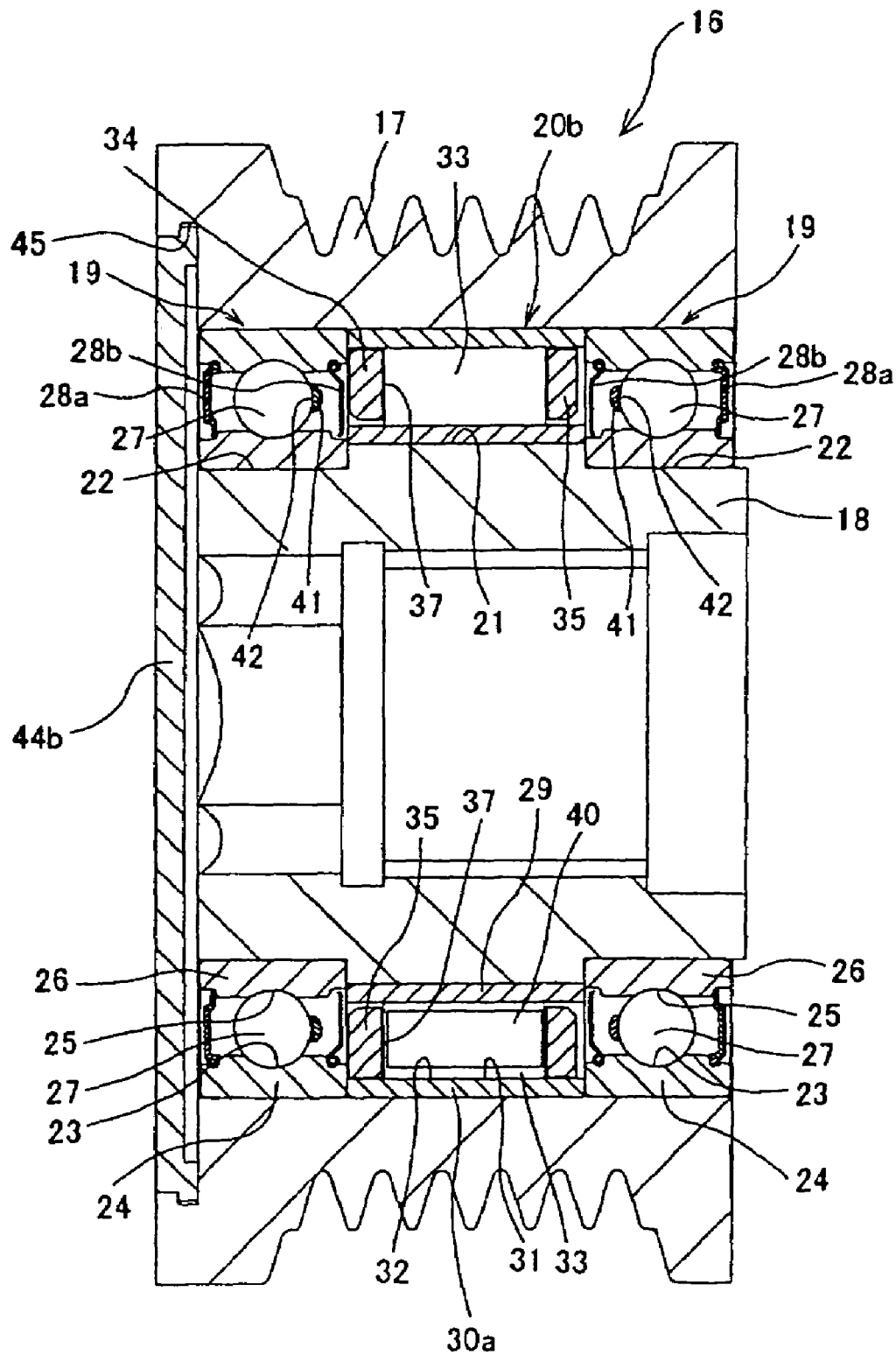
FIG. 17 is a cross sectional view to show the whole construction of the eleventh example of embodiment of the present invention.

Next, in the case of an eleventh example shown in the FIG. 17, the outer edge section of an end cap 44b is fitted into a cut-out section 45 that is formed on the outside end surface (surface on the left end in FIG. 17) of the pulley element 17, and it prevents foreign matter from getting into the space where the ball bearings 19 and roller clutch 20b are housed.

Figure 18:
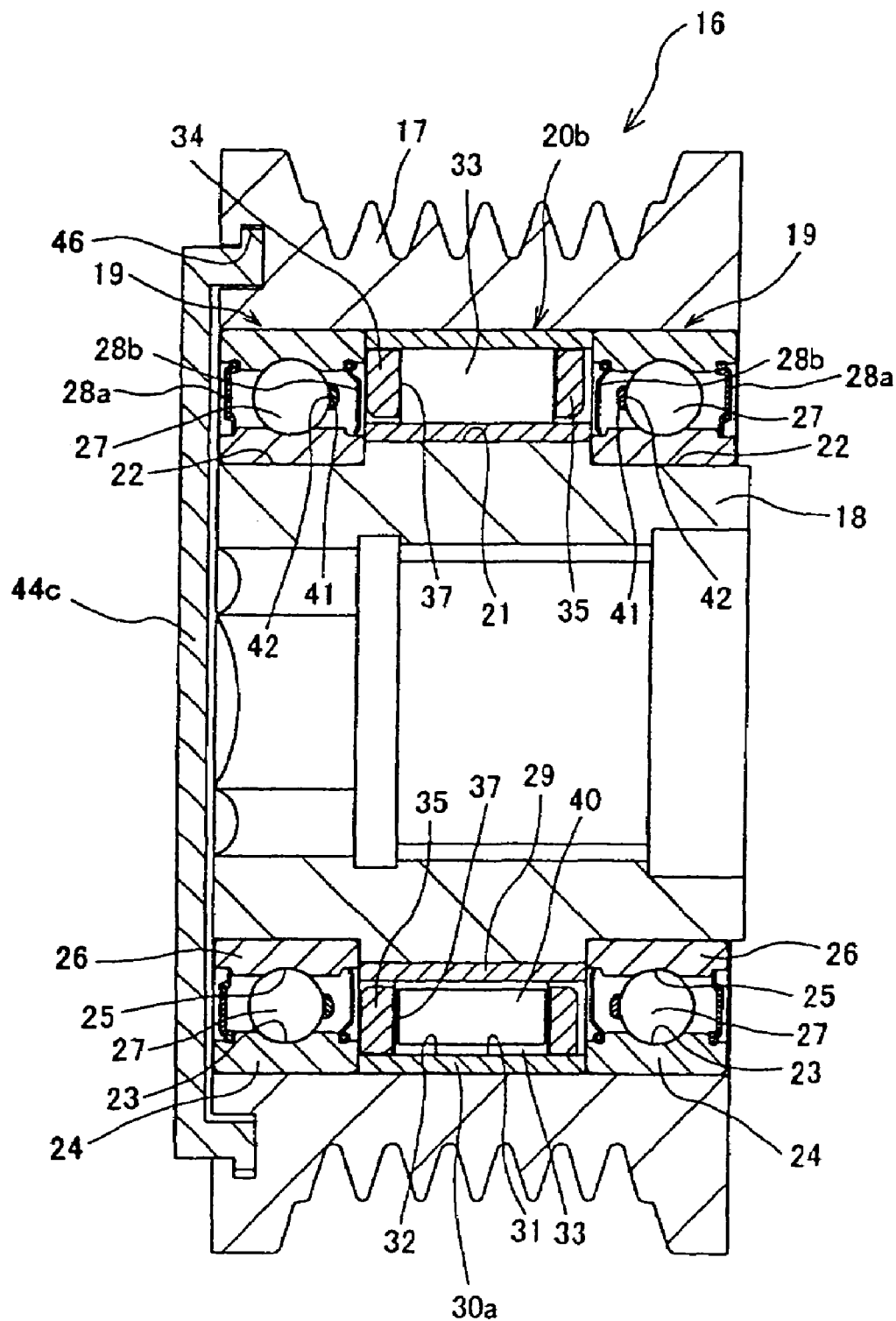
FIG. 18 is a cross sectional view to show the whole construction of the twelfth example of embodiment of the present invention.

Next, in the case of a twelfth example shown in FIG. 18 the outer edge section of an end cap 44c is fitted into a dovetail-groove shaped attachment groove 46 that is formed on the outside end surface (surface on the left end in FIG. 18) of the pulley element 18, and it prevents foreign matter from getting into the space where the ball bearings 19 and roller clutch 20b are housed. In this example, the dimension in the axial direction of the part of the pulley element 17 that is located further outside in the radial direction than the end cap 44c is decreased.

A summary of the construction of the pulley apparatus with built-in roller clutch 16 of the first thru twelfth examples described above is as follows.

This pulley apparatus with built-in roller clutch 16 transmits power only in a specified direction between the circular-ring-shaped pulley, which has an endless belt that runs around its outer peripheral surface and rotates only in the specified direction during operation, and the rotating shaft that is inserted through the center section of this pulley and rotates only in this specified direction during operation.

Also, the pulley apparatus with built-in roller clutch 16 comprises: a pair of support bearings, which are located in the circular-ring-shaped space between the inner peripheral surface of the pulley and the outer peripheral surface of the rotating shaft and spaced apart from each other in the axial direction, and a roller clutch that is located in this circular-ring shaped space between this pair of support bearings.

Moreover, this roller clutch engages with the rotating shaft when it rotates in the specified direction and transmits power to the pulley from the rotating shaft, however, when the pulley is rotating in the specified direction faster than the rotating shaft, the roller clutch idles and does not transmit power from the pulley to the rotating shaft.

Furthermore, a cam surface for moving the plurality of rollers of the roller clutch in the radial direction of the pulley is formed around the inner peripheral surface of the pulley or around the inner peripheral surface of a clutch outer ring that is fitted inside this pulley, and the outer peripheral surface of the rotating shaft or the outer peripheral surface of a clutch inner ring that is fitted onto the rotating shaft is a cylindrical surface.

With the kind of pulley apparatus with built-in roller clutch 16 of the first thru twelfth examples, when the rotating shaft is stopped, or when the pulley rotates faster than the rotating shaft, not only is the connection of the roller clutch open, but the rolling contact surfaces of the plurality of rollers of the roller clutch are separated from the outer peripheral surface of the rotating shaft or the outer peripheral surface of the clutch inner ring that fits around the rotating shaft. Therefore, when the pulley is rotating, it is possible to suppress to a minimum the friction heat that occurs inside the roller clutch, and thus it is possible to improve the durability of the roller clutch and the adjacent support bearings.

Figure 19:
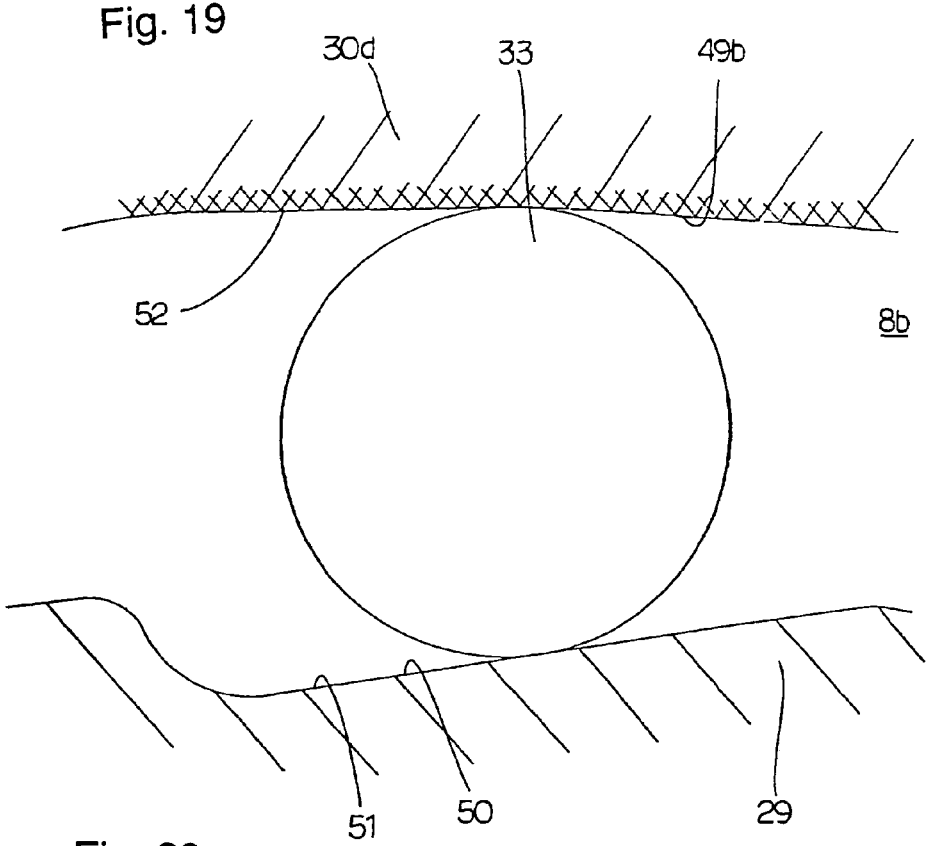
FIG. 19 is a view similar to FIG. 22 to show a reference example for the present invention.
Figure 20:
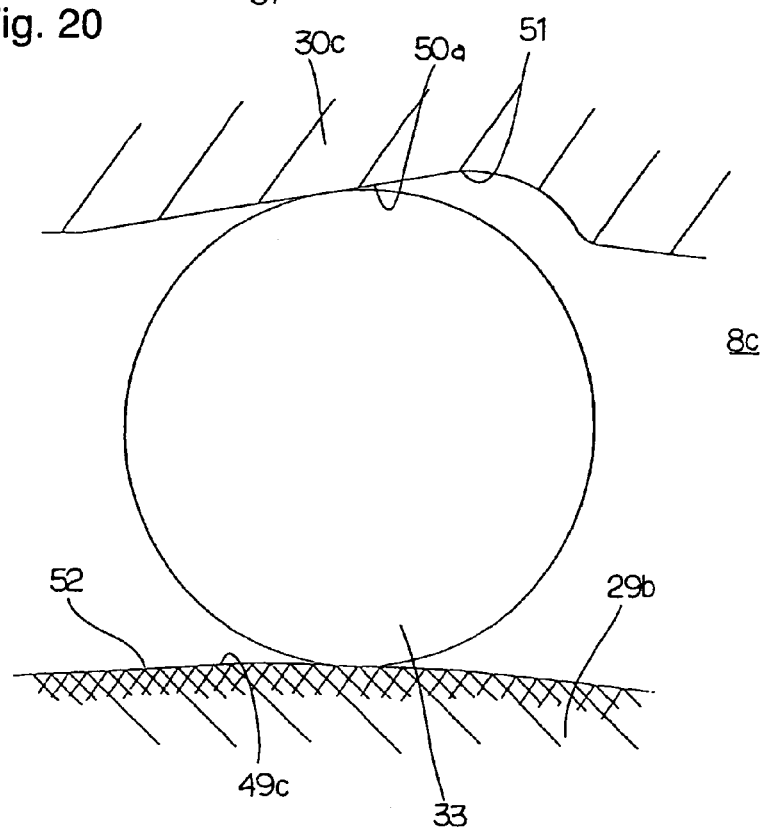
FIG. 20 is a view similar to FIG. 23 to show the thirteenth example of embodiment of the present invention.

Next, FIG. 19 shows a reference example that is outside the range of this invention, and FIG. 20 shows a thirteenth example of the invention. Both of these examples were invented for the purpose of sufficiently maintaining the durability of a rotation-transmission apparatus with built-in roller clutch, which include that for starting an engine, however, more particularly for the purpose of solving the following problems. The following explanation explains the case in which the rotation-transmission apparatus with built-in roller clutch is used as an auxiliary drive apparatus, however, it is the same as the case in which it is used for starting an engine.

Figure 21:
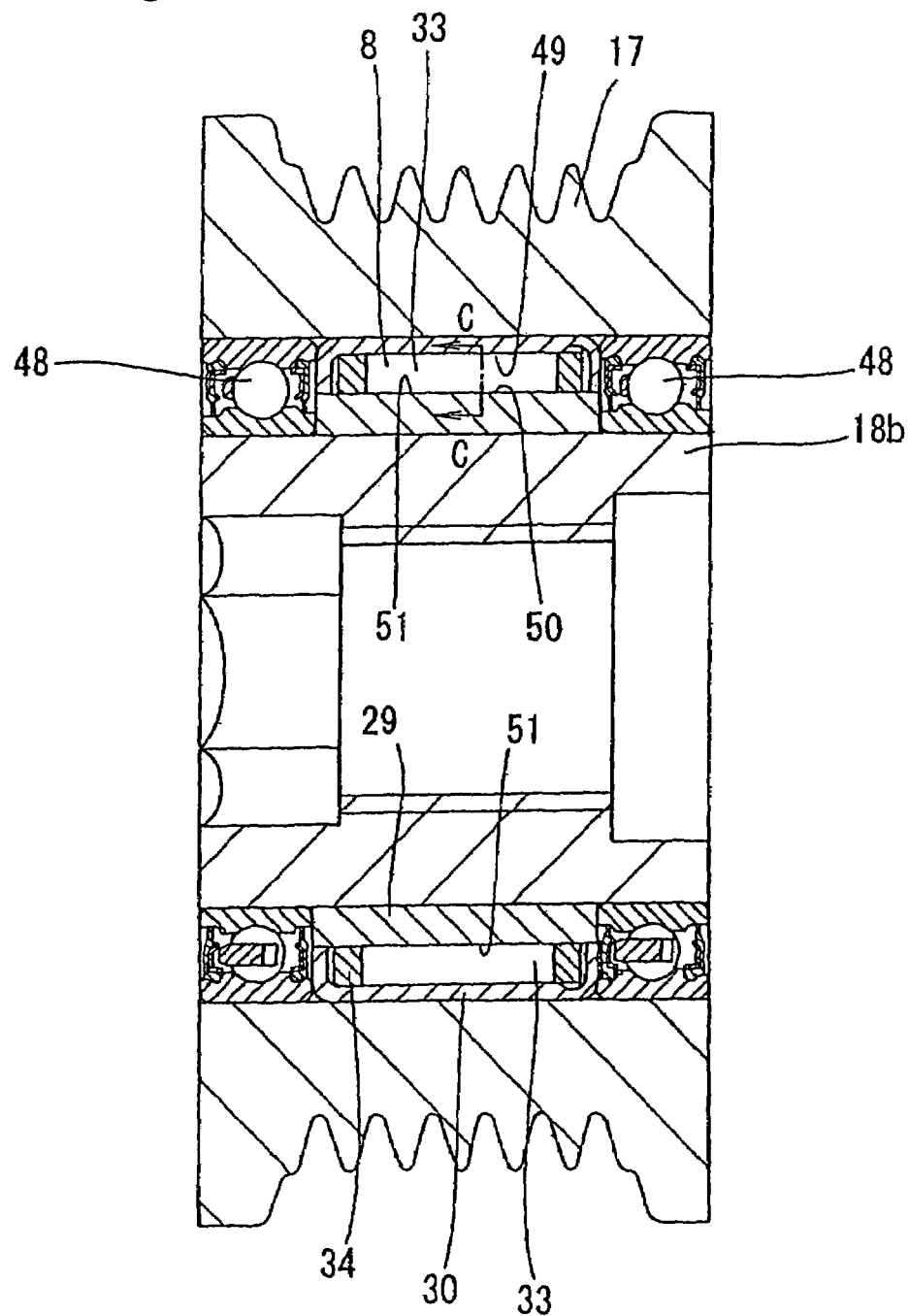
FIG. 21 is a cross sectional view to show a first example of the conventional structure of the pulley apparatus with built-in roller clutch.
Figure 22:
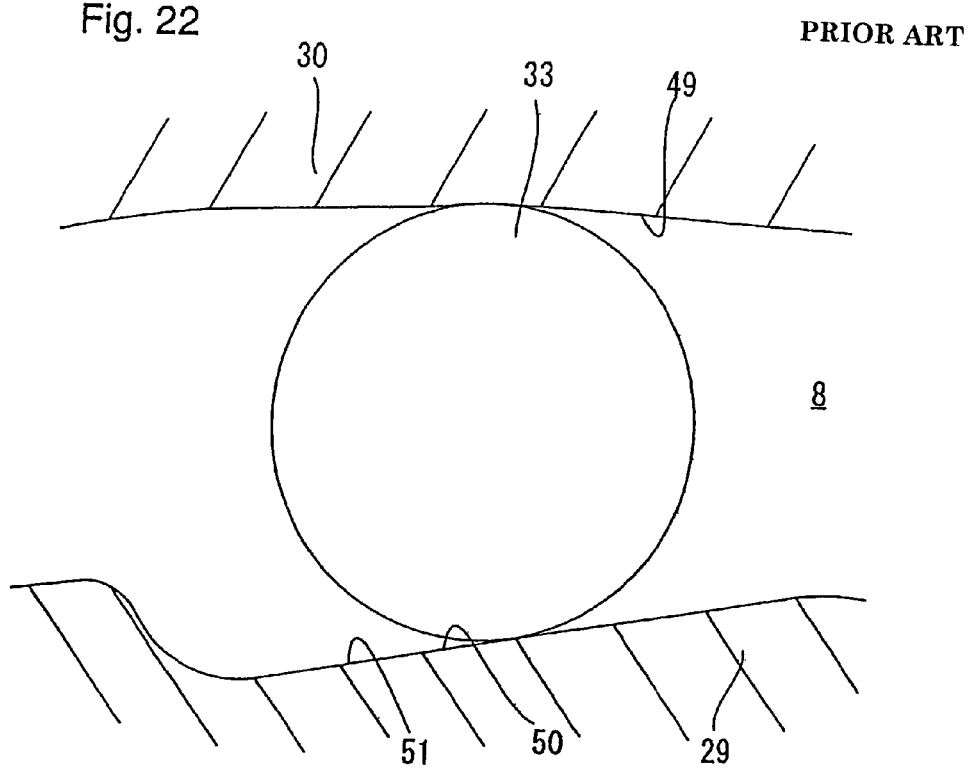
FIG. 22 is a cross sectional view taken along the line C-C in FIG. 21 with part of it omitted.

That is, the use of a pulley apparatus with a built-in one-way clutch has been known conventionally as a pulley apparatus for driving auxiliary devices such as an alternator (for example, refer to patent documents 1 and 3). FIGS. 21 and 22 show a first example of the conventional construction of a pulley apparatus with a built-in roller clutch, which is one type of this kind of pulley-apparatus with built-in one-way clutch. This pulley-apparatus with built-in one-way clutch comprises a sleeve 18b and a pulley element 17 that are concentric with each other. Also, there is a roller clutch 8, which is a one-way clutch, and a pair of support bearings 48 located between the outer peripheral surface of the sleeve 18b and the inner peripheral surface of the pulley element 17.

The sleeve 18b is has a generally cylindrical shape, and it is fitted and fastened onto the rotating shaft of the auxiliary device such as an alternator, and it rotates with this rotating shaft. On the other hand, the pulley element 17 also has a generally cylindrical shape, and the cross-sectional shape in the width direction of the middle section around its outer peripheral surface is wave shaped, around which part of an endless belt, called a poly V-belt, is placed. Also, there is a roller clutch 8 located in the middle section in the axial direction of the circular-ring shaped space that exists between the outer peripheral surface of the sleeve 18b and the inner peripheral surface of the pulley element 17, and also on both ends in the axial direction of this same space there is a pair of support bearings 48 such that they are located on both sides in the axial direction of the roller clutch 8. Of these, the pair of support bearings 48 support radial loads that are applied to the pulley element 17, and make it possible for the pulley element 17 to rotate relative to the sleeve 18b. In the example shown in the drawings, deep-groove type ball bearings are used for these support bearings 48.

Also, only when there is a tendency for relative rotation between the pulley element 17 and sleeve 18b in a specified direction, the roller clutch 8 transmits rotation force between the pulley element 17 and the sleeve 18b. This roller clutch 8 comprises: an inner member, which is a clutch inner ring 29 made of steel plate, and a outer member, which is a clutch outer ring 30 made of steel plate, a plurality of steel rollers 33, a clutch retainer 34 made of synthetic resin, and elastic members (not shown in the figures), which are springs. Of these, the clutch inner ring 29 is tightly fitted onto the outer peripheral surface in the middle section of the sleeve 18b, and the clutch outer ring 30 is tightly fitted into the inner peripheral surface in the middle section of the pulley element 17, respectively through interference fit. The inner peripheral surface in the middle section of the clutch outer ring 30 is a cylindrical surface 49, and the outer peripheral surface of the clutch inner ring 29 is a cam surface 50. In other words, a plurality of concave sections 51 called ramp sections are formed on the outer peripheral surface of the clutch inner ring 29 such that they are evenly spaced around in the circumferential direction, and the outer peripheral surface of this clutch inner ring 29 functions as a cam surface 50.

Moreover, in the cylindrical space between this cam surface 50 and the cylindrical surface 49, there are a plurality of rollers 33, and a clutch retainer 34 (omitted in FIG. 22) that holds the rollers 33 such that they can freely roll and move a little in the circumferential direction. The rollers 33 are located in sections in alignment with the concave sections 51. Also, by attaching the inner peripheral edge of the clutch retainer 34 to part of the cam surface 50, it is prevented from rotating relative to the clutch inner ring 29. In other words, the clutch retainer 34 and clutch inner ring 29 rotate in synchronization. Moreover, there are springs (not shown in the figure) between the clutch retainer 34 and the rollers 33 so as to press the rollers 33 in the same direction in the circumferential direction (right direction in FIG. 22) toward the shallow side of the concave sections 51.

In the case of this roller clutch 8, when there is a tendency for the clutch outer ring 30 to rotate in the clockwise direction (to the right) in FIG. 22 with respect to the clutch inner ring 29, as shown in the same figure, the rollers 33 become wedged between the cylindrical surface 49 and the bottom surfaces of the concave sections 51 of the cam surface 51. As a result, rotation force begins to be transmitted between the clutch outer ring 30 and clutch inner ring 29, and the clutch outer ring 30 and clutch inner ring 29 rotate together. This state is called the locked state. On the other hand, when there is a tendency for the clutch outer ring 30 to rotate in the counterclockwise direction in FIG. 2 (rotate to the left) with respect to the clutch inner ring 29, the rollers 33 move against the elastic force of the springs toward the deep section of the concave sections 51 (sections on the left side in FIG. 22) and the pressure at the points of contact between the rolling contact surfaces of the rollers 33 and the cylindrical surface 49 droves. As a result, rotation force stops being transmitted between the clutch outer ring 30 and the clutch inner ring 29, and the clutch outer ring 30 and clutch inner ring 29 rotate relative to each other. This state is called the overrun state.

In the pulley apparatus with built-in roller clutch constructed as described above, the sleeve 18b is fitted and fastened onto the end section of the rotating shaft of an auxiliary device such as an alternator, and an endless belt runs around the outer peripheral surface of the pulley element 17. This endless belt also runs around the drive pulley that is fastened to the end section of the engine crankshaft, and is driven by the rotation of this drive pulley. With the pulley apparatus with built-in roller clutch is assembled in this state, when the running speed of the endless belt is constant or has a tendency to increase, the roller clutch 8 becomes engaged (lock state), and rotation power is freely transmitted from the pulley element 17 to the rotating shaft. However, when the running speed of the endless belt decreases, the connection of the roller clutch 8 is broken (overrun state) and the pulley element 17 and rotating shaft freely rotate relative of each other. As a result, even when the rotational angular speed of the crankshaft changes, it is possible to prevent rubbing between the endless belt and the pulley element 17, and thus together with being able to prevent the generation of noise called crying and a drop in the life of the endless belt due to friction, it is possible to prevent a drop in the power-generating efficiency of the alternator.

Figure 23:
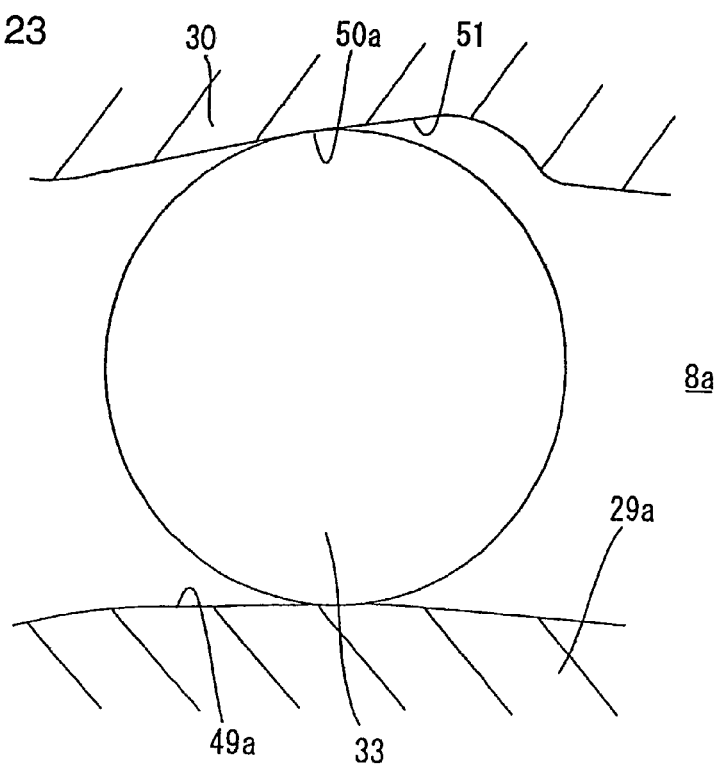
FIG. 23 is a view similar to FIG. 22 to show a second example of the conventional structure of the pulley apparatus with built-in roller clutch.

In the case of the pulley apparatus with built-in roller clutch shown in FIGS. 21 and 22 described above, the cylindrical surface 49 of the roller clutch 8 is located around the inner peripheral surface of the clutch outer ring 30, and the cam surface 50 is located around the outer peripheral surface of the clutch inner ring 29. However, the locations in the radial direction of the cylindrical surface and cam surface may be opposite as in the case of the second example of prior construction of a pulley apparatus with built-in roller clutch shown in FIG. 23 (refer to Patent Document No. 4). In other words, in the case of the roller clutch 8a shown in FIG. 23, the cylindrical surface 49a is located around the outer peripheral surface of the clutch inner ring 29a, and the cam surface 50a is located around the inner peripheral surface of the clutch outer ring 30c. Moreover, in the case of the construction of the roller clutches 8, 8a described above, the cylindrical surfaces 49, 49a and cam surfaces 50, 50a may be formed directly on the inner peripheral surface of the pulley element 17 and the outer peripheral surface of sleeve 18b (refer to Patent Document No. 4).

Figure 24:
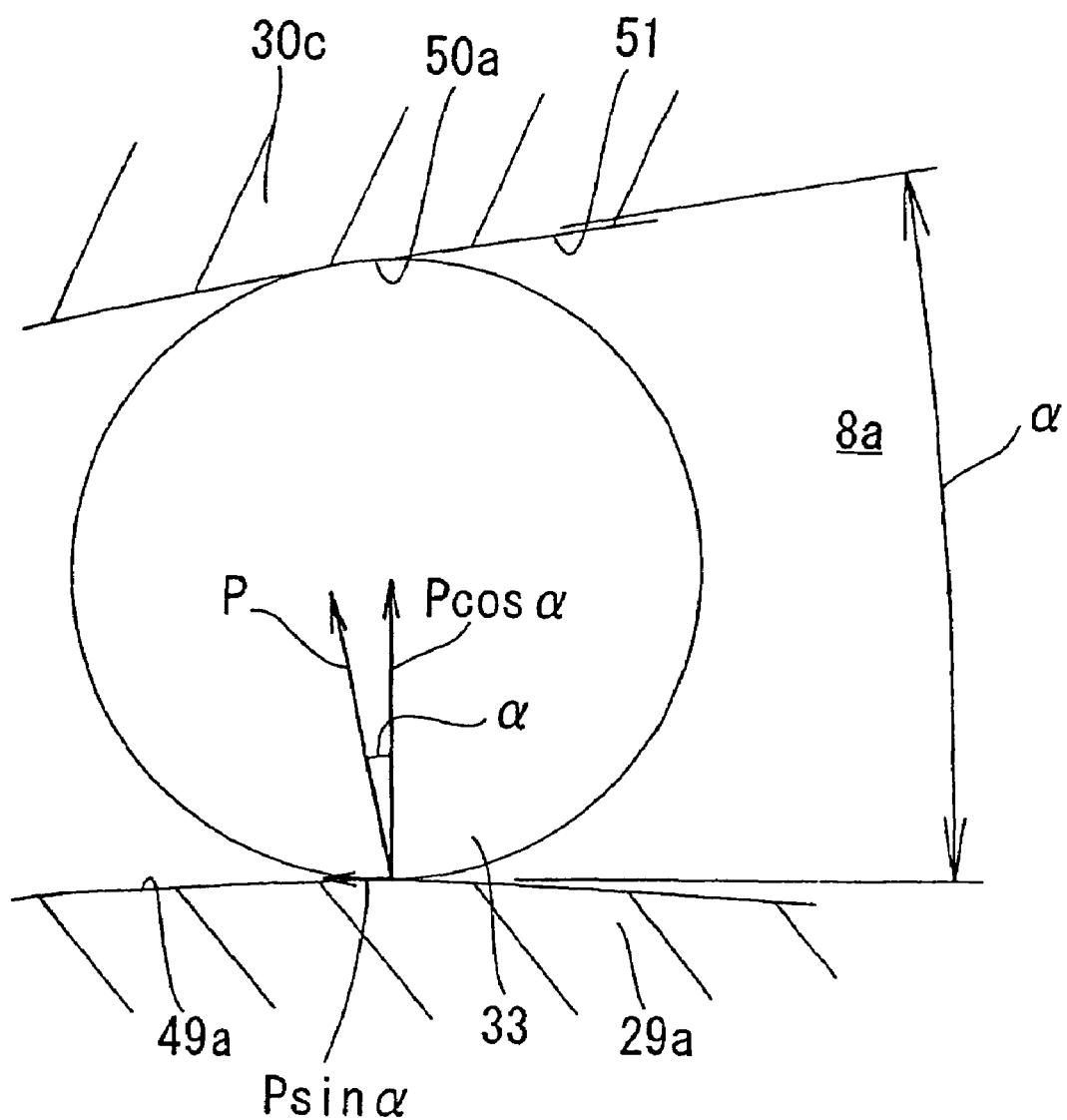
FIG. 24 is a view similar to FIG. 23 to explain forces applied to the rollers from the cylindrical surface and the cam surface.

In order to securely achieve the locked state of the roller clutch 8, 8a described above, for example, as shown in FIG. 24, when the rollers 33 are pushed into the section where the width of the space between the cylindrical surface 49a and the cam surface 50a (wedge angle α) is narrow, it is necessary that slipping does not occur at the points of contact between the rolling contact surfaces of the rollers 33 and the cylindrical surface 49a. Here, the force P that the rollers 33 receive from the cylindrical surface 49a will be considered. This force P is the combination of the friction force [P·sin α] that acts at the points of contact between the rolling contact surfaces of the rollers 33 and the cylindrical surface 49a, and the vertical resistance force [P·cos α] that acts on the rollers 33 from the cylindrical surface 49a. When the coefficient of static friction at the point of contact is taken to be μ, then the maximum static friction force at the point of contact is [μP·cos α]. Therefore, the condition to prevent any slipping between the rolling contact surfaces of the rollers 33 and the cylindrical surface 49a is [P·sin α≦μP·cos α] (in other words, the friction force [P·sin α] acting at this point of contact is up to the maximum static friction force [μP·cos α]). Also, from this condition [P·sin α≦μP·cos α], it can be seen that the larger the coefficient μ of static friction at the point of contact is, the more difficult it is for slipping to occur at the point of contact.

On the other hand, the vertical resistance force that the rollers 33 receive from the cam surface 50a becomes larger as the force P becomes larger. Also, as the vertical resistance force that the rollers 33 receive from the cam surface 50a becomes large, the maximum friction force at the points of contact between the rolling contact surfaces of the rollers 33 and the cam surface 50a becomes large, and it becomes difficult for slipping to occur at these points of contact. However, if slipping does not occur at the points of contact between the rolling contact surfaces of the rollers 33 and the cylindrical surface 49a (the condition [P·sin α≦μP·cos α] described above), the force P becomes larger as the rotation force to be transmitted by the roller clutch 8, 8a becomes larger. Therefore, by making the coefficient μ of static friction at the points of contact between the rolling contact surfaces of the rollers 33 and the cylindrical surface 49a large, it is possible for the force P to become larger, and as a result, it is more difficult for slipping to occur at the points of contact between the rolling contact surfaces of the rollers 33 and the cam surface 50a.

From this it can be seen that by making the coefficient μ of static friction at the points of contact between the rolling contact surfaces of the rollers 33 and the cylindrical surface 49a large, it becomes difficult for slipping to occur at the points of contact between the rolling contact surfaces of the rollers 33 and the cylindrical surface 49a, and at the points of contact between the rolling contact surfaces of the rollers 33 and the cam surface 50a, and as a result it is easy to achieve the locked state of the roller clutch 8, 8a.

Therefore, employing a method of regulating the condition of lubrication at the points of contact between the rolling contact surfaces of the rollers 33 and the cylindrical surface 49a is considered as a method for increasing the coefficient μ of static friction at these points of contact. However, since it is difficult to regulate the condition of lubrication at the points of contact, employing this method is difficult.

Therefore, increasing the roughness of the rolling contact surfaces of the rollers 33 and the cylindrical surface 49a, in contact with each other, is considered as another method for increasing the coefficient μ of static friction at these points of contact. However, the rolling contact surfaces of the rollers 33 and the cylindrical surface 49a are metal surfaces. Also, there is rubbing between the rolling contact surfaces of the rollers 33 and the cylindrical surface 49a during overrun. Therefore, if the roughness of the rolling contact surfaces of the rollers 33 and the cylindrical surface 49a increased, the friction force acting on the points of rubbing between these surfaces during overrun increases, and it is easy for wear or seizure to occur at the points of rubbing.

The construction of the first reference example and the thirteenth example shown in FIGS. 19 and 20 take into consideration the problem mentioned above, and together with making it possible to securely achieve the locked state of the one-way clutch, the construction makes it difficult of wear or seizure to occur at the points of rubbing during overrun of the one-way clutch.

First, the first reference example shown in FIG. 19 is an example of a pulley apparatus with built-in roller clutch that is fastened to the end of the rotating shaft of an alternator, and the feature of this construction is the characteristics of the cylindrical surface 49b of the roller clutch 8b, that is one-way roller clutch. The construction and function of the other parts are the same as those of the first example of prior construction of the pulley apparatus with built-in roller clutch shown in FIGS. 21 and 22 and described above, so any redundant figures and explanations will be omitted or simplified, and this explanation will center on the characteristics of this example.

The roller clutch 8b of the pulley apparatus with built-in one-way clutch of this example comprises a cylindrical surface 49b that is located around the inner peripheral surface of the clutch outer ring 30d, and a cam surface 50 that is located around the outer peripheral surface of the clutch inner ring 29. In this example, the pulley apparatus with built-in one-way clutch is fastened to the end of the rotating shaft of an alternator, and it is basically operated in the locked state, and the amount of time it is operated in the overrun state is very short compared with the overall operating time. Taking this into consideration, with the roller clutch 8b that is assembled in the pulley apparatus with built-in one-way clutch of this example in order to easily achieve the locked state during operation of the engine, and in order that the plurality of rollers 33 are not moved into the concave sections of the cam surface by the centrifugal force due to rotation, as mentioned above, the cam surface 50 is located around the outer peripheral surface of the clutch inner ring 29.

Moreover, in this example, a chemical conversion coating, specifically manganese phosphate layer 52 is formed on the cylindrical surface 49b. The process for forming this kind of manganese phosphate layer 52 is summarized below. Under specified temperature conditions, the inner peripheral surface of the clutch outer ring 30d which is the base material, is immersed in a manganese phosphate saline solution. As a result, isolated phosphoric acid occurs due to the first dissociation of the manganese phosphate saline solution, and the iron on the inner peripheral surface (metal surface) of the clutch outer ring 30d dissolves. Together with this, the concentration of the hydrogen ions on this metal surface decreases, and while dissociation equilibrium of the manganese phosphate saline solution transits on this metal surface, crystals of insoluble manganese phosphate salt are deposited on this metal surface. The deposited crystals become the manganese phosphate layer 52.

In the case of the pulley apparatus with built-in one-way clutch constructed as described above, the manganese phosphate layer 52 is formed on the cylindrical surface 49b. The surface of this manganese phosphate layer 52 is rough, so it is possible to increase the coefficient of static friction at the points of contact between the cylindrical surface 49b having this manganese phosphate layer 52 and the rolling contact surfaces of the plurality of rollers 33. Therefore, when the roller clutch 8b is in the locked state, it is difficult for slipping to occur at the points of contact between the cylindrical surface 49b and the rolling contact surfaces of the rollers 33. Therefore, in the case of this example, it is possible to securely achieve the locked state.

On the other hand, when the roller clutch 8b is in the overrun state, the manganese phosphate layer 52 prevents metal contact between the cylindrical surface 49b and the rolling contact surfaces of the rollers 33. Also, lubricant is held between the crystal grains of the manganese phosphate layer 52, so there is good lubrication at the points of rubbing between the cylindrical surface 49b and the rolling contact surfaces of the rollers 33 due to this lubricant. Therefore, during overrun of the roller clutch 8b, it is difficult for wear or seizure to occur at the points of rubbing.

Next, FIG. 20 shows a thirteenth example of the embodiment of the invention corresponding to claims 1 and 6. This example is a rotation-transmission apparatus with built-in roller clutch for starting an engine and is attached to the end of the drive shaft that is rotated and driven by a starter motor. Similar to the first reference example shown in FIG. 19, the feature of this example is in the characteristics of the cylindrical surface 49c of the one-way roller clutch 8c. The construction and function of the other parts are substantially the same as those of the first and second examples of prior art construction of the pulley apparatus with built-in roller clutch shown in FIGS. 21 and 23 and described above, so any redundant figures and explanations will be omitted or simplified, and this explanation will center on the characteristics of this example.

The roller clutch 8c of the rotation-transmission apparatus with built-in roller clutch for starting an engine of this example comprises a cylindrical surface 49c that is located around the outer peripheral surface of the clutch inner ring 29b, and a cam surface 50a that is located around the inner peripheral surface of the clutch outer ring 30a. Also, there is the manganese phosphate layer 52 that is a chemical conversion coating formed on the cylindrical surface 49c. In the rotation-transmission apparatus with built-in roller clutch of the example, constructed as described above, a sleeve 18b (see FIG. 21) is fitted and fastened onto the end of the drive shaft of the starter motor, and an endless belt runs around the outer peripheral surface of the pulley element 17 (see FIG. 21). This endless belt also runs around a follower pulley that is fastened to the end of the engine crankshaft.

Also, when starting the engine, electric power flows to the starter motor that then rotates and drives the rotation-transmission apparatus with built-in roller clutch, and rotates and drives the crankshaft by way of the endless belt and follower pulley. In other words, at this time, the roller clutch 8c is in the locked state and transmits power from the drive shaft of the starter motor to the endless belt. Also, after the engine has started the roller clutch 8c changes in the overrun state such that drive shaft of the starter motor does not turn even though the endless belt is running with the rotation of the crankshaft. Therefore, the starter motor does not become a resistive load against the operation of the engine, and durability of the starter motor not decreased. With this kind of construction, it is possible to immediately start the engine by just starting the starter motor. Therefore, by installing this kind of construction in an idling stop vehicle, it is possible to start moving again in a short time after an idling stop, and so there is no feeling of discomfort when the operator starts the engine again.

As described above, the rotation-transmission apparatus with built-in roller clutch for starting an engine of this example is operated most of the time in the overrun state and the amount of time that it is operated in the locked state is very short when compared with the overall operating time. Taking this into consideration, the cam surface 50a is located around the inner peripheral surface of the clutch outer ring 30c as mentioned above in order to make the plurality of rollers 33 retract into the concave sections 51 of the cam surface 50a by the centrifugal force caused by rotation when the roller clutch 8c that is assembled in this rotation-transmission apparatus with built-in roller clutch for starting an engine is in the overrun state when the engine starts, so that rubbing is prevented between the rolling contact surfaces of the rollers 33 and the cylindrical surface 49c.

In the case of the rotation-transmission apparatus with built-in roller clutch for starting an engine of this example constructed as described above, a manganese phosphate layer 52 is formed on the cylindrical surface 49c of the roller clutch 8c, so as in the case of the first reference example shown in FIG. 19 described above, it is possible for this roller clutch 8c to securely achieve a locked state, and it is difficult for wear and seizure to occur in the rubbing section between the cylindrical surface 49c and the rolling contact surfaces of the plurality of rollers 33 when in the overrun state, and thus it is possible to improve durability. Particularly, in the case of this embodiment, the roller clutch 8c is in the locked only for a short time when starting the engine, and after the engine starts the roller clutch 8c is in the overrun state as long as the engine is running and there is no rubbing between the rolling contact surfaces of the rollers 33 and the cylindrical surface 49c. Therefore, it is possible to more effectively obtain the effect of making it difficult for wear or seizure to occur at the rubbing sections during overrun.

In the examples described above, of the rolling contact surfaces of the rollers and the cylindrical surface of the roller clutch, a chemical conversion layer was formed only on the cylindrical surface, however, it is also possible to form this chemical conversion coating on just the rolling contact surfaces of the rollers, or to form it on both the rolling contact surfaces of the rollers and the cylindrical surface. In these cases, it is possible to easily achieve the locked state, and to make it difficult for wear or seizure to occur at the rubbing sections during overrun. Also, in addition to the roller clutch described above, the first reference example shown in FIG. 19 and the thirteenth example shown in FIG. 20 can also be applied to a one-way clutch having different construction such as a cam clutch like a sprag clutch.

The first reference example and the thirteenth example shown in FIGS. 19 and 20 are for the improvement of the pulley apparatus with built-in one-way clutch that is fastened to the end of the rotating shaft such as in the alternator or compressor of an auxiliary device for an automobile, the starter motor of the starting apparatus for an automobile, or the auxiliary-drive motor of an idling-stop vehicle, and the one-way clutch that is assembled and used in this pulley apparatus with built-in one-way clutch. Also, a summary of the construction of the one-way clutch (first, second one-way clutch) and the pulley apparatus with built-in one-way clutch (first to third pulley apparatus with built-in one-way clutch) shown in the first reference example and thirteenth example is given below.

First, the first one-way clutch comprises: an inner member, an outer member that is located around the outside of the inner member such that it is concentric with the inner member, and a plurality of engaging members that are located between the outer peripheral surface of the inner member and the inner peripheral surface of the outer member. Also, at least one of the outer peripheral surface of the inner member and the inner peripheral surface of the outer member is a cylindrical surface. Moreover, only when there is a tendency for relative rotation in a specified direction of the inner member and outer member, is rotation force transmitted between the inner member and outer member by way of the engaging members that engage with the outer peripheral surface of the inner member and the inner peripheral surface of the outer member.

Particularly, in the first one-way clutch described above, a chemical conversion coating such as a manganese phosphate layer is formed on at least one of the surface of the engagement members and the cylindrical surface.

Moreover, similar to the roller clutches 8, 8a described above and shown in FIGS. 21 to 23, the second one-way clutch (roller clutch) comprises: an inner member, an outer member that is located around the outside of the inner member such that it is concentric with the inner member, a cam surface, a cylindrical surface, a plurality of rollers, a retainer, and elastic members. Of these, the cam surface is located around one of the outer peripheral surface of the inner member and the inner peripheral surface of the outer member, and it has a concave sections located a plurality of locations in the circumferential direction. Also, the cylindrical surface is located around the other of the outer peripheral surface of the inner member and the inner peripheral surface of the outer member. The rollers are located in the cylindrical space between the cylindrical surface and the cam surface in the sections that match up with the concave sections. The retainer is supported in the cylindrical space such that it cannot rotate with respect to the member around which the cam surface is formed, and it holds the rollers such that they can rotate freely and can move a little in the circumferential direction. The elastic members are located between the retainer and the rollers, and press these rollers in the same circumferential direction.

Particularly, in the second one-way clutch (roller clutch) described above, a chemical conversion coating such as a manganese phosphate layer is formed on at least one of the rolling contact surface of the rollers and the cylindrical surface.

Also, the first pulley apparatus with built-in one-way clutch comprises: a cylindrical pulley that fits around the rotating shaft such that it is concentric with the rotating shaft, support bearings, and a one-way clutch. Of these, the support bearings are located between the outer peripheral surface of the rotating shaft and the inner peripheral surface of the pulley, and they supports radial loads that act between the rotating shaft and pulley, and make it possible relative rotation of the rotating shaft and pulley possible. Moreover, the one-way clutch is located between the outer peripheral surface of the rotating shaft and the inner peripheral surface of the pulley in the section separated in the axial direction from the support bearings, and it transmits rotation power between the rotating shaft and pulley only when there is relative rotation of the rotating shaft and pulley in a specified direction.

Particularly, in this first pulley apparatus with built-in one-way clutch, this one-way clutch is either the first or second one-way clutch described above.

Moreover, in the second pulley apparatus with built-in one-way clutch, the rotating shaft is a component of an alternator, and the cylindrical surface of the one-way clutch is located around the inner peripheral surface of the outer member, and the cam surface is located around the outer peripheral surface of the inner member.

Furthermore, in the third pulley apparatus with built-in one-way clutch, the rotating shaft is the drive shaft that is rotated and driven by a starter motor, and the cylindrical surface of the one-way clutch is located around the outer peripheral surface of the inner member, and the cam surface is located around the inner peripheral surface of the outer member.

In the case of the first and second one-way clutches and first thru third pulley apparatuses with built-in one-way clutches, a chemical conversion coating, such as a manganese phosphate layer is formed on at least one of the surface of the plurality of engagement members and the cylindrical surface of the one-way clutch. The surface of this chemical conversion coating is rough. Therefore, it is possible to make the coefficient of static friction at the points of contact between the surface of the plurality of engagement members and the cylindrical surface large. Therefore, when the one-way clutch is provided in the locked state, it is difficult for slipping to occur at the points of contact between the surface of the plurality of engagement members and the cylindrical surface, and thus it is easy to achieve the locked state. On the other hand, when the one-way clutch is in the overrun state, the chemical conversion coating makes it possible to prevent metallic contact between the surfaces of the plurality of engagement members and the cylindrical surface. Together with this, lubricant is held between the crystal grains of this chemical conversion coating, so this lubricant makes it possible to have good lubrications at the sections of rubbing between the surface of the plurality of engagement members and the cylindrical surface. Therefore, when the one-way clutch is in the overrun state, it is difficult for wear and seizure to occur at these rubbing sections. In this way, together with being able to securely achieve the locked state, it is possible to make it difficult for wear and seizure to occur in the areas of rubbing during the overrun state, and thus it is possible to improve reliability and durability.

Figure 25:
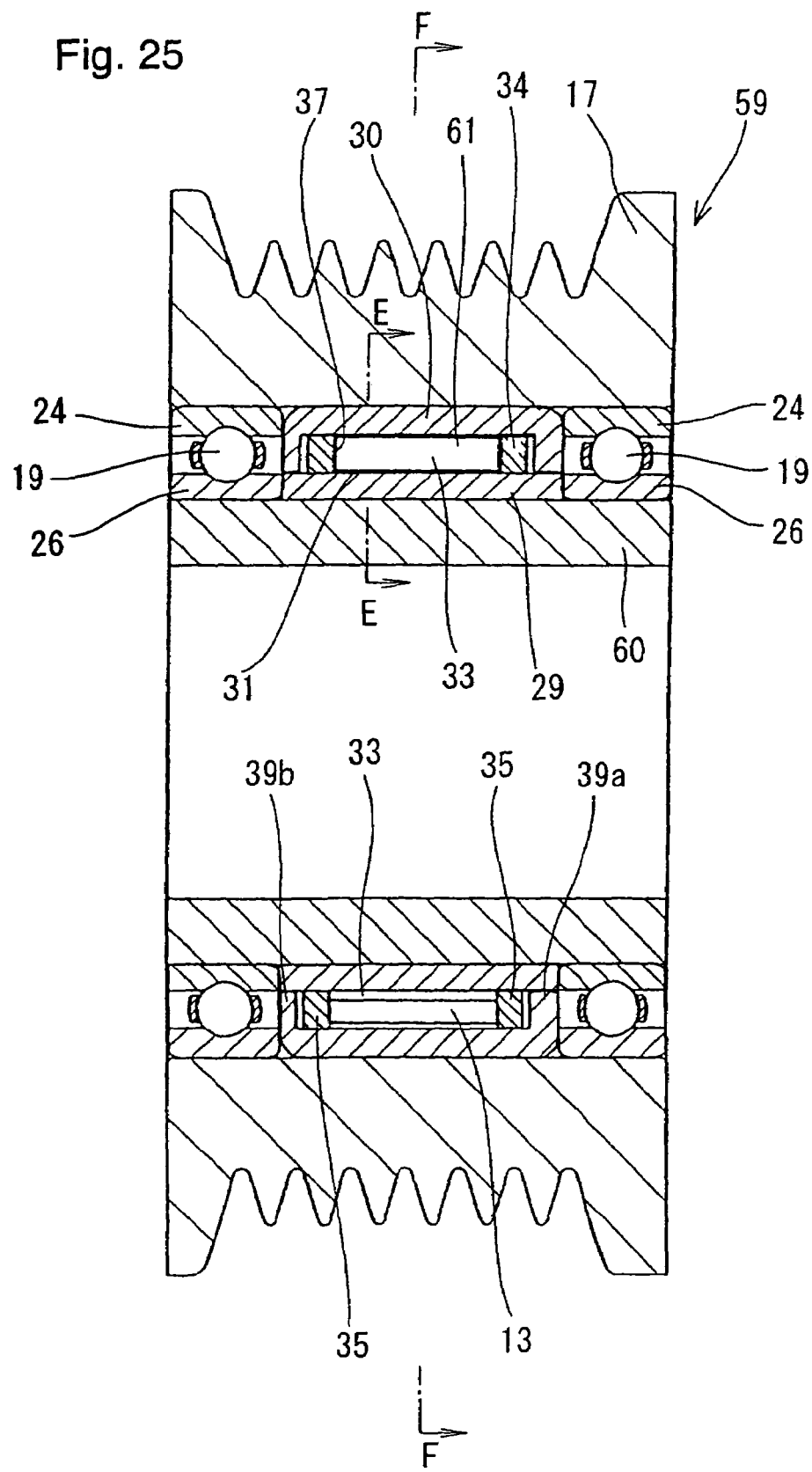
FIG. 25 is a cross sectional view to show a fourteenth example of embodiment of the present invention.
Figure 26:
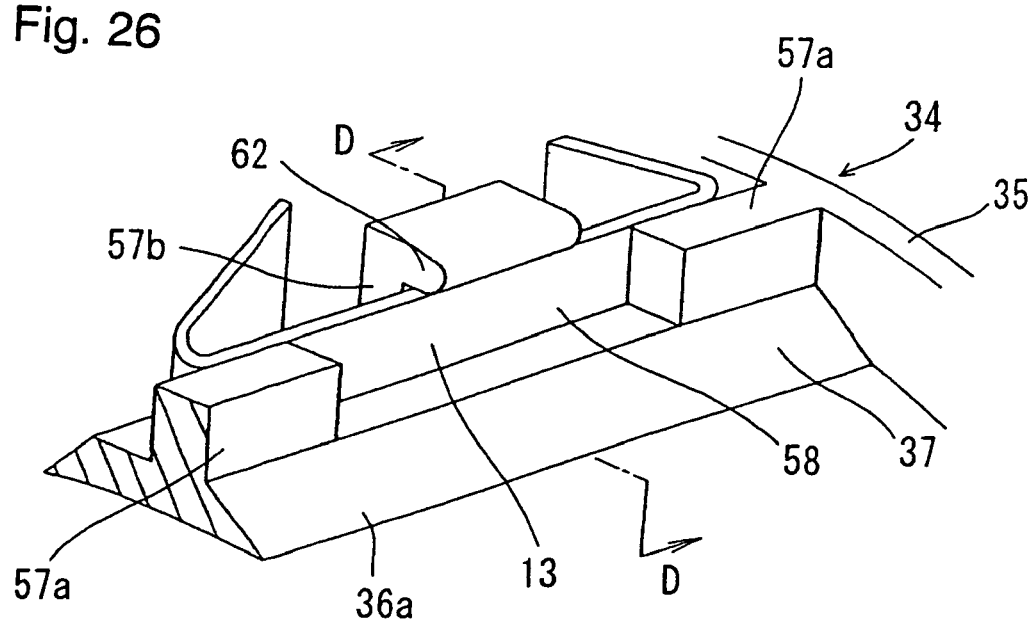
FIG. 26 is a partly cut-away, perspective view of the retainer and springs taken from FIG. 25.
Figure 27:
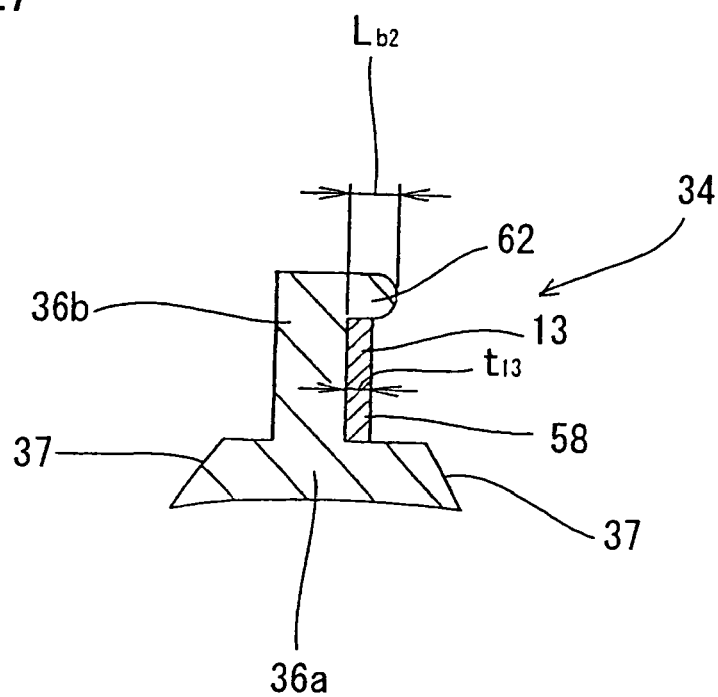
FIG. 27 is a cross sectional view taken along the line D-D in FIG. 26.
Figure 28:
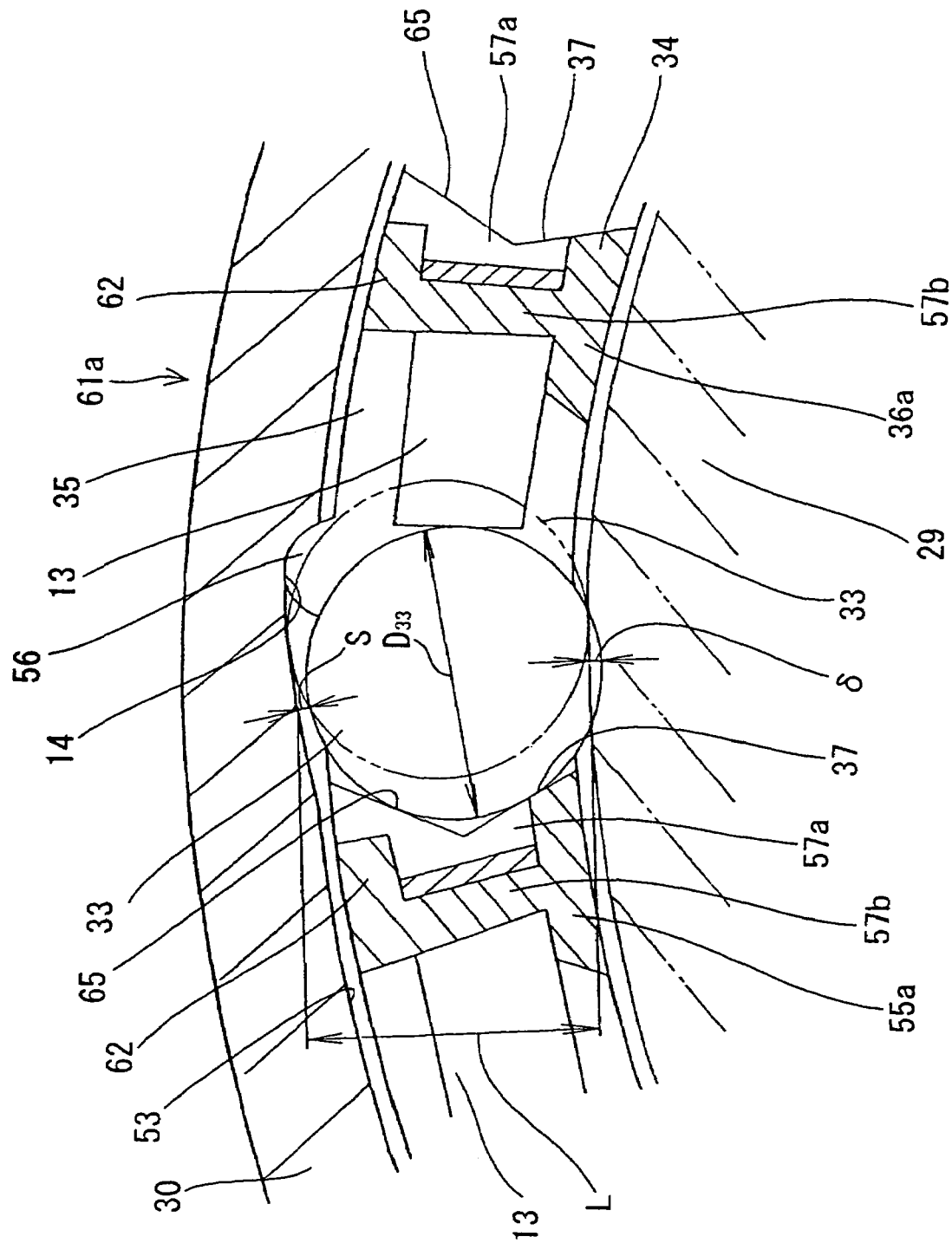
FIG. 28 is a cross sectional view, corresponding to the cross section of E-E of FIG. 25, to show a fifteenth example of embodiment of the present invention to explain the positional relation between the clutch inner race and the rollers in the state before the clutch inner race is pressed on the inner diameter side of the rollers.
Figure 29:
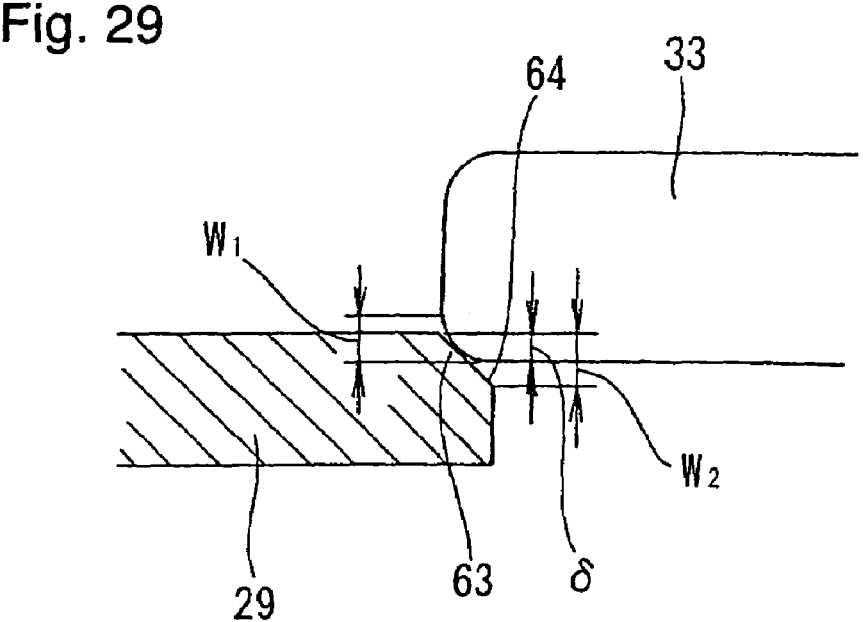
FIG. 29 is a cross sectional view to show an engagement state of the beveled section formed in the clutch inner raced and the rollers at the outer peripheral edge portion of their ends.
Figure 30:
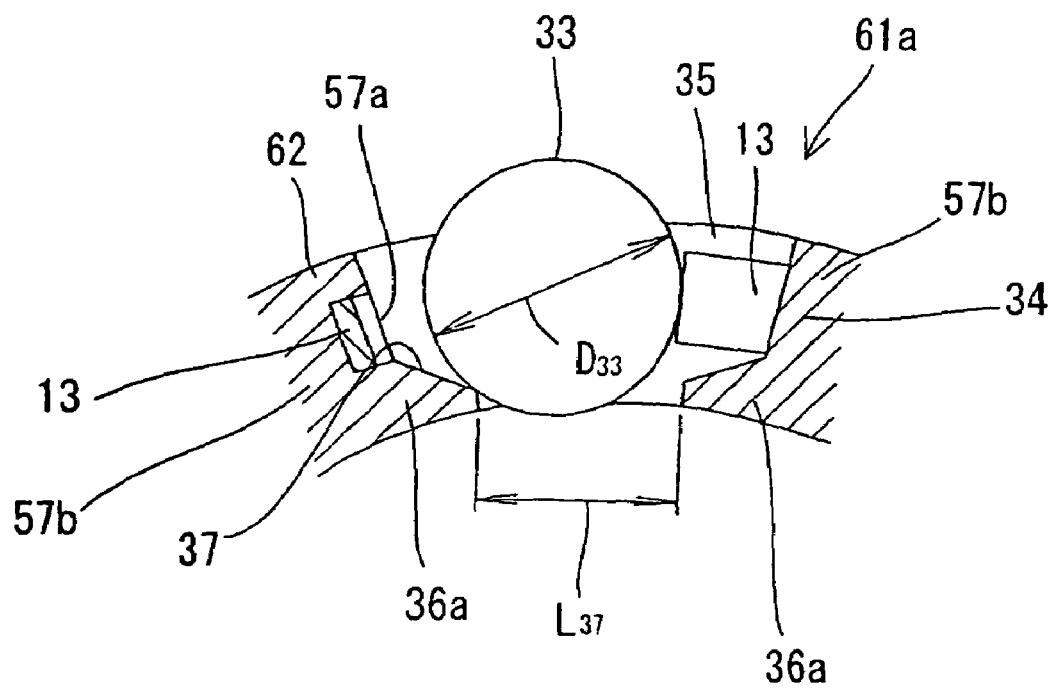
FIG. 30 is a partly omitted, cross sectional view to show a sixteenth example of embodiment of the present invention.
Figure 31:
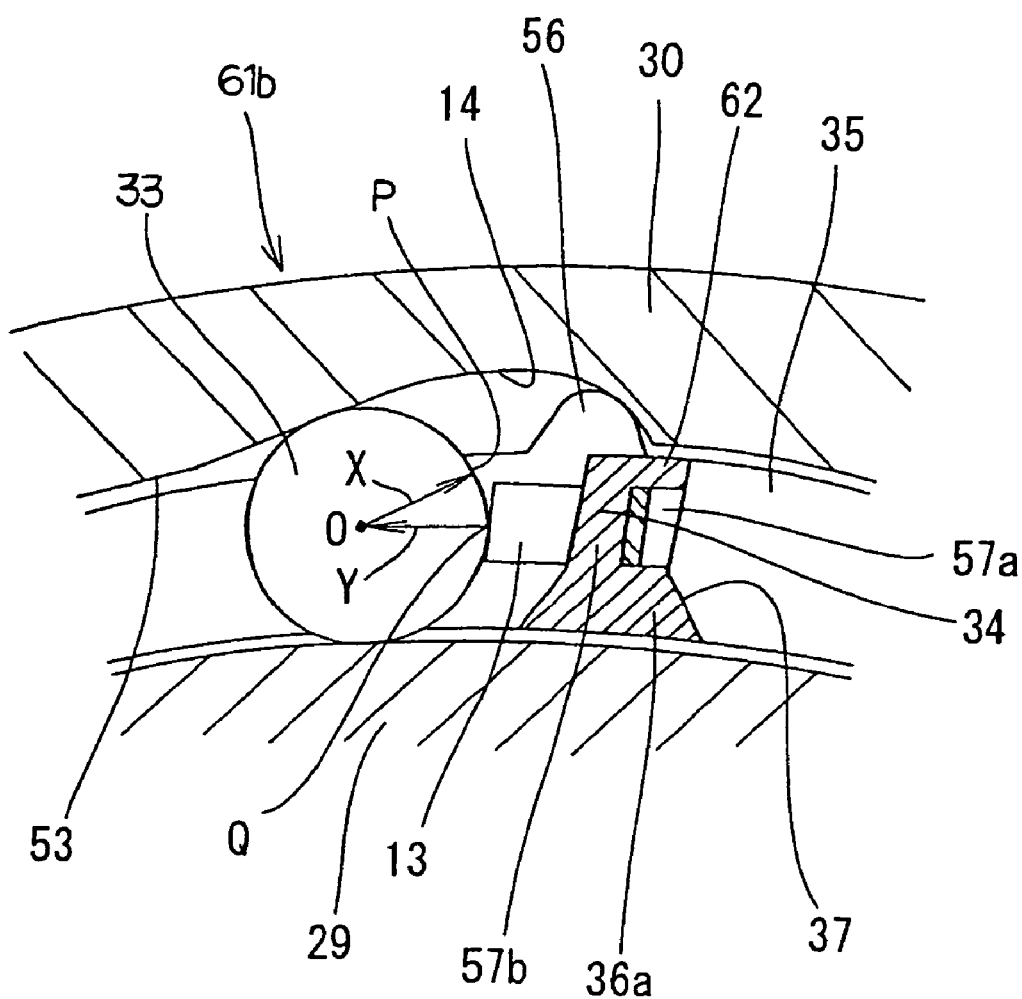
FIG. 31 is a cross sectional view, similar to FIG. 8, to show a seventeenth example of embodiment of the present invention in the state when the locked state is transited to the over-run state.

Next, FIGS. 25 to 27 shows a fourteenth example of the embodiment of the invention, FIGS. 28 and 29 show a fifteenth example of the embodiment of the invention, FIG. 30 shows a sixteenth example of the embodiment of the invention, and FIG. 31 shows a seventeenth example of the embodiment of the invention. Each example was invented to sufficiently maintain the durability of a rotation-transmission apparatus with built-in roller clutch for starting an engine, and more specifically were invented with the object of solving the following problems.

Figure 32:
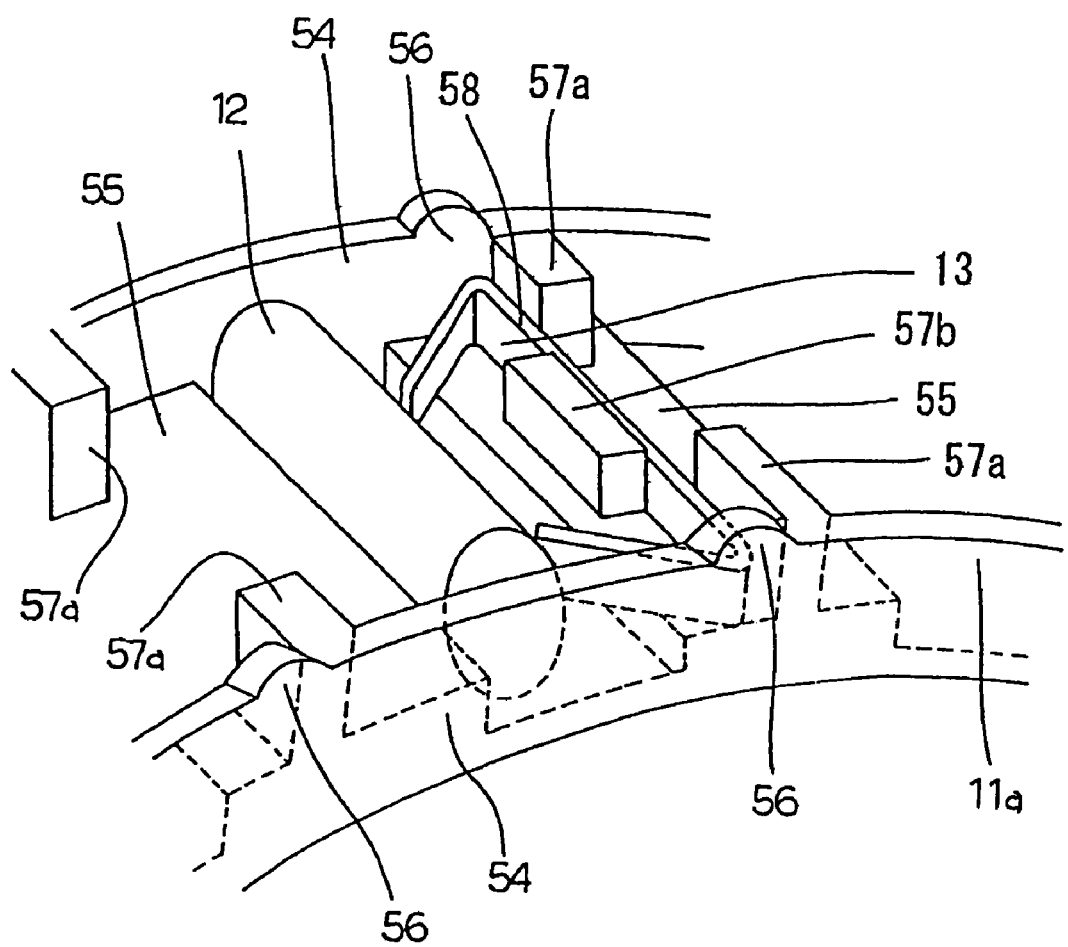
FIG. 32 is a perspective view to show part of a second example of the conventional structure of the roller clutch with the inner and outer races omitted.
Figure 33:
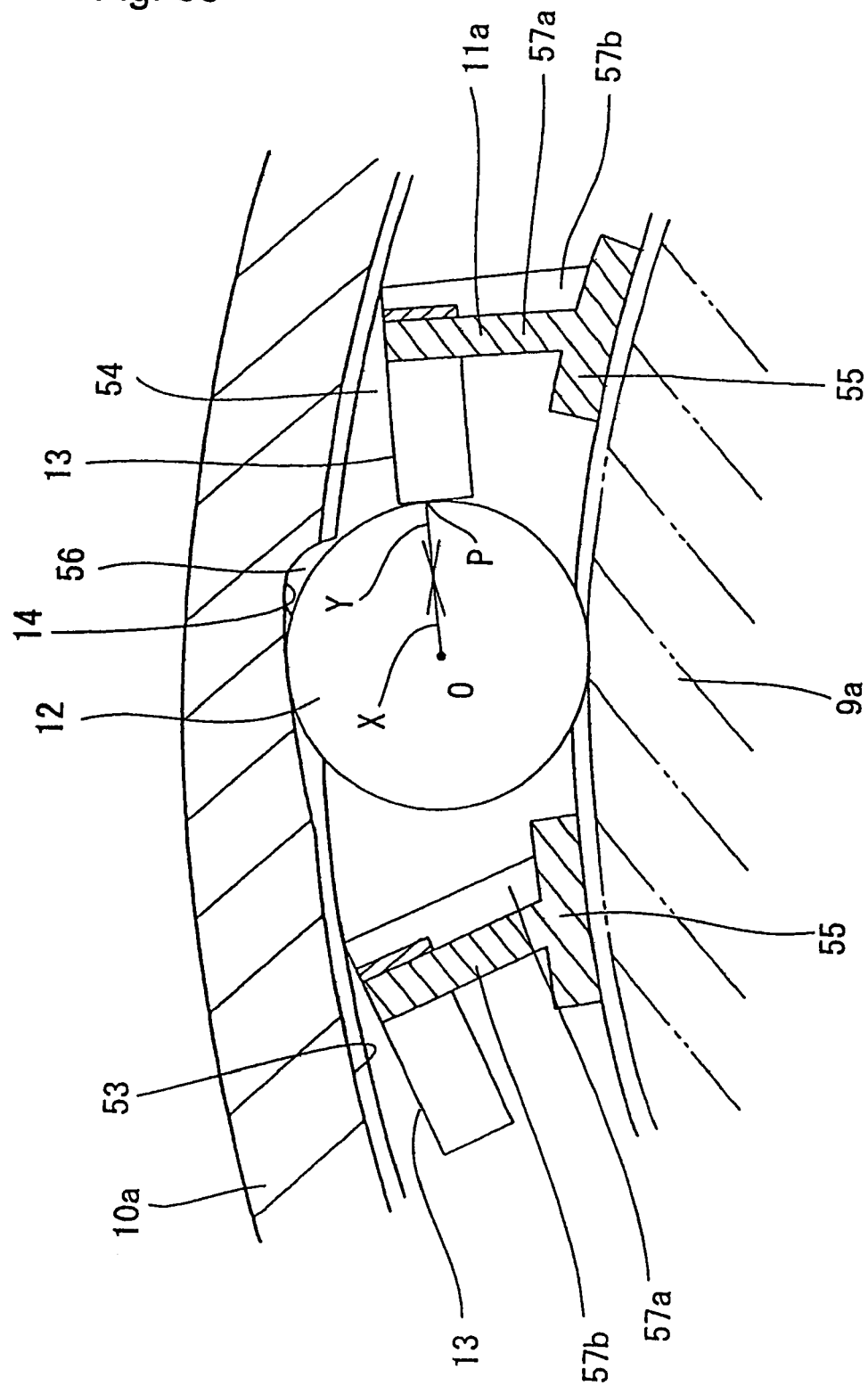
FIG. 33 is a cross sectional view to show part of a third example of the conventional structure of the roller clutch with the inner and outer races omitted.

That is, conventionally a roller clutch as disclosed in Patent Document No. 4, for example, has been known as a one-way clutch having the function of allowing transmission of rotation in only a specified direction between a pair of concentrically placed members. FIGS. 32 and 33 show a second and third example of the prior art construction of a known roller clutch. First, the second example of the prior art construction of a known roller clutch shown in FIG. 32 comprises: an inner ring 9a or inner member, and an outer ring 10a or outer member (see FIG. 33) that are concentric with each other, a retainer 11a that is located between the outer peripheral surface of the inner ring 9a and the inner peripheral surface of the outer ring 10a, a plurality of rollers 12 and the same number of springs 13 as rollers 12. The inner peripheral surface of the outer ring 10a is a cam surface 53 (explained later using FIG. 33) having a plurality of concave sections 14 that are called ramp sections, and the outer peripheral surface of the inner ring 9a is a simple cylindrical surface. Moreover, the retainer 11a comprises a pair of circular-ring shaped rim sections 54 and column sections 55 that are located at a plurality of locations in the circumferential direction to connect the rim sections 54 at the locations. Also, the convex sections 56 are formed around the outer peripheral edge of the rim sections 54 and engaged with the aforementioned concave sections 14, so that relative rotation of the retainer 11a with respect to the outer ring 10a is prevented. In other words, the retainer 11a and outer ring 10a are made to rotate in synchronization.

Moreover, the springs 13 are formed by bending spring steel plate into a triangular hook shape. Also, protruding support sections 57a, 57b are formed on the outside surface of in the radial direction of the column sections 55 in the axially middle section of the retainer 11a, at three locations in the axial direction and the base sections 58 of the springs 13 are supported by these protruding support sections 57a, 57b. In other words, by supporting the base section 58 of the spring 13 between the pair of protruding support sections 57a that are formed near both ends in the axial direction of the column sections 55, and the one protruding support section 57b that is located in the middle section in the axial direction thereof, the base sections 58 are supported by the protruding sections 57a, 57b. Also, these springs 13 press the rollers 12 in the same circumferential direction toward the shallow side of the concave sections 14.

Furthermore, in the case of the third example of prior art construction of a roller clutch shown in FIG. 33, the rollers 12 are held between the cam surface 53 of the outer ring 10a and the outer peripheral surface of the inner ring 9a, and in the state when these rollers 12 roll along the concave sections 14 to the deep side of the concave sections 14, the position of the tip edge of the springs 13 comes in contact with the front ends of the rolling contact surfaces of the rollers 12 (the position indicated by the point P in FIG. 33) in the direction of movement of the center axis O of the rollers 12 (direction indicated by the arrow X in FIG. 33). Therefore, in this example, in this state, the direction that the springs 13 press the rollers 12 (the direction indicated by the arrow Y in FIG. 33) and the direction of movement of the center axis O are located on the same line.

In the case of the conventionally known roller clutches constructed as described above, when there is a tendency for the inner ring 9a to rotate relative to the outer ring 10a in the counterclockwise direction of FIG. 33, the rollers 12 are wedged between the outer peripheral surface of the inner ring 9a and the inner peripheral surface of the outer ring 10a, and rotation force is transmitted between the inner ring 9a and outer ring 10a. On the other hand, when there is a tendency for the outer ring 10a to rotate at high speed in the counterclockwise direction of FIG. 33 faster than the inner ring 9a, the rollers 12 move against the elastic force of the springs 13 toward the deep section of the concave sections 14, and the contact pressure at the points of contact between the rolling contact surfaces of the rollers 12 and the outer peripheral surface of the inner ring 9a drops, and rotation force is not transmitted between the inner ring 9a and outer ring 10a (idling state).

In the case of the conventionally known roller clutches shown in FIGS. 32 and 33 and described above, the cam surface 53 is located around the inner peripheral surface of the outer ring 10a and the outer peripheral edge of the retainer 11a fits with the concave sections 14 of this cam surface 53, so in the overrun state, the retainer 11a rotates with the outer ring 10a. Therefore, during operation, it is easy for this retainer 11a to rotate at high speed. However, in the case of the second and third examples of prior art construction described above, preventing the springs 13 from shifting in the outer radial direction with respect to the protruding supports 57a, 57b formed on the column sections 55 was not taken into consideration. Therefore, when the roller clutch is in the overrun state and the retainer 11a is rotating at high speed, it becomes easy for the springs 13 to shift outward in the radial direction with respect to the protruding supports 57a, 57b. Also, in the extreme case, there is the possibility that the springs 13 will come out from between the protruding supports 57a, 57b. In the case that the springs 13 shift or come out of place, it is not possible to maintain the necessary performance of the roller clutch. Particularly, when this roller clutch is used in a rotation-transmission unit for the engine-starting apparatus of a so-called idling-stop vehicle, it is easy for the problems described above to occur. The reasons why these problems easily occur will be explained below.

The function of an engine-starting apparatus of an idling-stop vehicle and the fact that it is necessary to use an apparatus with a built-in one-way clutch as the drive-pulley apparatus 6 (see FIG. 55) located on the end of the rotation-drive shaft 5 of a starter motor 4 in order to have this function are as explained above. Also, the possibility of using the prior known roller clutch shown in FIGS. 32 and 33 as this drive-pulley apparatus is as described above. Moreover, when using this kind of roller clutch in the drive-pulley apparatus 6, it is possible to decrease vibration, noise and friction that occur when the clutch is not engaged, better than when a ratchet mechanism is used. Also, it is possible to decrease the friction the occurs when the clutch is not engaged better than when a cam clutch, such as a sprag clutch is used.

Furthermore, in the case of the second and third examples of prior art construction of a roller clutch shown in FIGS. 32 and 33, together with forming a cam surface 53 around the inner peripheral surface of the outer ring 10a, the retainer 11a was made to rotate together with this outer ring 10a. Therefore, this differs from the case where the cam surface is formed around the outer peripheral surface of the inner ring and the retainer rotates together with the inner race, and the rollers 12 are moved to the deep section of the concave sections 14 on the cam surface 53 by the centrifugal force that acts on the rollers 12 during operation. Therefore, in the overrun state, the rolling contact surfaces of the rollers 12 and the outer peripheral surface of the inner race 9a become separated, and it is possible to prevent rubbing between the surfaces. As a result, it is possible to prevent the grease from becoming degraded easily due to friction heat that occurs at the points of contact, and it is possible to prevent friction loss from becoming large.

However, when using the examples of the roller clutch shown in FIGS. 32 and 33 in the drive-pulley apparatus 6, after the engine starts, the retainer 11a, the outer ring 10a and the plurality of rollers 12 continue to rotate at high speed. Therefore, a large centrifugal force acts for a long time on the springs 13 that are supported by the protruding support sections 57a, 57b of the retainer 11a, and it becomes easy for the springs 13 to shift toward the outer diameter side with respect to the protruding support sections 57a, 57b. Also, when the springs 13 shift a large amount toward the outer diameter side in this way, it becomes impossible to maintain the necessary performance of the roller clutch. When the roller clutch shown in FIGS. 32 and 33 are used in the drive-pulley apparatus 6 in this way, it becomes easy for problems to occur because the shifting of the springs 13 toward the outer diameter side with respect to the protruding support sections 57a, 57b is not taken into consideration.

Moreover, when the roller clutch shown in FIGS. 32 and 33 is used in the drive-pulley apparatus 6, in the locked state it transmits the torque for starting the engine between the inner ring 9a and outer ring 10a, so the torque that must be transmitted between the inner ring 9a and outer ring 10a becomes large. Therefore, in order to change from the overrun state to the locked state smoothly and completely, the elastic force of the springs 13 must be larger than the elastic force of the springs that are used in a normal roller clutch. However, when the elastic force of the springs 13 is large, the first and second problems described below occur. First, the first problem that occurs when the elastic force of the springs 13 is made large is that when the rollers 12 and springs 13 are assembled in the retainer 11a, the rollers 12 are pressed strongly to one section of the retainer 11a. When the rollers 12 are pressed like this, a part of the rollers 12 protrudes a lot toward the inner diameter side from the inner peripheral edge of the retainer 11a, and there is a possibility that the diameter of the inscribed circle of the rolling contact surface of the plurality of rollers 12 will become smaller than the outer diameter of the inner ring 9a. If the diameter of this inscribed circle is smaller than the outer diameter of the inner ring 9a, when the inner ring 9a is pressed toward the inner diameter side of the rollers 12 to assemble the roller clutch 1, the end surfaces in the axial direction of the rollers 12 interfere (collide) with the end surface in the axial direction of the inner ring 9a. When these surfaces interfere with each other in this way and the work of pressing the inner ring 9a is continued, there is a possibility that the rollers 12 will fall from between the springs 13 and column sections 55 inside the retainer 11a. When the rollers 12 fall out of place in this way, if the elastic force of the springs 13 is small, it is easier to put the rollers 12 that fell out back into place. However, when the elastic force of the springs 13 in the roller clutch that is used in an engine-starting apparatus is large, it is difficult to put the rollers 12 that fell out back into place, so the work of assembling the roller clutch is troublesome.

As the second problem that occurs when the elastic force of the springs 13 is too large is that when changing from the locked state to the overrun state, the movement of the rollers 12 along the concave sections 14 of the cam surface to the deep side of the concave sections 14 due to the action of the centrifugal force may be hindered by the elastic force of the springs 13. Particularly, in the third example of prior art construction shown in FIG. 33, in regards to the direction of movement of the center axis O of the rollers 12 when the rollers 12 move from the locked state toward the overrun state along the concave sections 14 to the deep side of the concave sections 14, when the springs 13 come in contact with the front ends of the rolling contact surfaces of the rollers 12, it is easy for the movement of the rollers 12 along the concave sections 14 toward the deep side of the concave sections 14 to be hindered by the springs 13. Also, in regards to the direction of the movement of the center axis O from the locked state toward the overrun state, when the springs 13 come in contact more with the rolling contact surfaces of the rollers 12 on the outer diameter side of the retainer 11a than the position on the front ends of the rolling contact surfaces of the rollers 12, it becomes even easier for the movement of the rollers 12 to be hindered. When the movement of the rollers 12 is hindered by the springs 13 in this way, even in the overrun state the rolling contact surfaces of the rollers 12 do not separate from the outer peripheral surface of the inner ring 9a, and the rolling contact surfaces of the rollers 12 rub against the outer peripheral surface of the inner ring 9a, and thus it becomes easy for friction heat and friction loss to occur at the points of contact between these surfaces. The occurrence of friction heat becomes the cause of a decrease in the durability of the grease filled inside the roller clutch, and the occurrence of friction loss becomes the cause of preventing an improvement in the performance of the mechanical apparatuses, such as the automobile having an engine installed with a starting apparatus with a roller clutch.

The fourteenth to seventeenth examples of the invention shown in FIGS. 25 to 31 take these problems into consideration, and they were invented with the object of eliminating at least the problems of the retainer rotating at high speed for a long time during operation, and the large elastic force of the elastic members or springs that occur when used in the engine-starting apparatus of an idling-stop vehicle.

First, FIGS. 25 to 27 show a fourteenth example of the invention. The pulley apparatus 59 of this embodiment, which is a rotation-transmission apparatus with built-in roller clutch for starting an engine, is used in the engine-starting apparatus of the idling-stop vehicle shown in FIG. 55 as the drive-pulley apparatus 6 for transmitting the rotation of the rotation-drive shaft 5 of the starter motor 4 to the endless belt 7. Also, when electric power flows to the starter motor 4, it transmits the rotation of the rotation-drive shaft 5 to the endless belt 7, however after the engine 1 starts and the endless belt 7 is driven by the engine 1, it does not transmit power from the endless belt 7 to the rotation-drive shaft 5.

This pulley apparatus 59 comprises a pulley element 17 around whose outer peripheral surface the endless belt 7 runs, and a sleeve 60 that is fitted and fastened to the end of the rotation-drive shaft 5, such that it is concentric with the pulley element 17. The pulley element 17 corresponds to the rotating member in the claims. Support bearings, which are a pair of ball bearings 19, and a roller clutch 61 are located between the outer peripheral surface of the sleeve 60 and the inner peripheral surface of the pulley element 17. Also, the inner peripheral surface of the pulley element 17 and the outer peripheral surface of the sleeve 60 are simple cylindrical surfaces.

The roller clutch 61 is located in the middle in the axial direction of the circular-ring shaped space that exists between the outer peripheral surface of the sleeve 60 and the inner peripheral surface of the pulley element 17, and the ball bearings 19 are located at both ends in the axial direction of this circular-ring shaped space on both sides in the axial direction of the roller clutch 61. Of these, the ball bearings 19 are the same as those used in the first example shown in FIGS. 1 to 5 and the outer races 24 of these ball bearings 19 are fitted and fastened to the inner peripheral surface on both end portions of the pulley element 17 through interference fit, and the inner races 26 are fitted and fastened to the outer peripheral surface on both end portions of the sleeve 60 through interference fit. In the case of the example shown in the figures, there is no pair of seal rings 28a, 28b (see FIG. 1) on the ends in the axial direction of the ball bearings 19, however it is possible to install seal rings 28a, 28b as in the first example.

Also, the roller clutch 61 transmits rotation force between the pulley element 17 and the sleeve 60 only when there is a tendency for relative rotation in a specified direction of the pulley 17 with respect to the sleeve 60. To construct this roller clutch 61, an inner member, or clutch inner ring 29, is fitted and fastened onto the middle section of the outer peripheral surface of the sleeve 60 through interference fit. This clutch inner ring 29 is formed into a generally cylindrical shape by plastic working, such as pressing of steel plate such as carburized steel, and both of the inner and outer peripheral surfaces are simple cylindrical surfaces.

On the other hand, the outer member or clutch outer ring 30 is fitted and fastened into the middle section of the inner peripheral surface of the pulley element 17 through interference fit, and the inner peripheral surface of the clutch outer ring 30 functions as a cam surface 31. In other words, by forming a plurality of concave sections 14, called ramp sections, on the inner peripheral surface of this clutch outer ring 30 with an even space between them in the circumferential direction, such that the depth decreases gradually (gradually becomes shallow) going in one direction (left direction in FIG. 33), the inner peripheral surface of the clutch outer ring 30 functions as a cam surface 31. This outer clutch ring 30 is also formed into a generally cylindrical shape by plastic working, such as pressing of steel plate such as carburized steel.

Also, the roller clutch 61 comprises a plurality of rollers 33 together with the clutch inner ring 29 and the clutch outer ring 30, and the rollers 33 are supported by a clutch retainer 34 such that they can roll freely and move a little in the circumferential direction. The clutch retainer 34 is fitted on the inside of the clutch outer ring 30 such that it cannot rotate with respect to the clutch outer ring 30. This clutch retainer 34 is made of synthetic resin (for example, a synthetic resin such as polyamide 66, polyamide 46, polyphenylene sulfide that is mixed 20% with glass fibers) and formed generally into a cage-type cylindrical shape, and comprises a pair of circular-ring shaped rim sections 35, and column sections 36a that connect the rim sections 35 to each other at a plurality of locations in the circumferential direction.

The sections surrounded on four sides by the inside surfaces of the rim sections 35 and the surfaces on the sides in the circumferential direction of the column sections 36a form pockets 37 for holding the rollers 33 such that they can roll freely and move a little in the circumferential direction. A plurality of convex sections 56 that are formed at a plurality of locations on the outer peripheral surface of the rim sections 35 are fitted with the concave sections 14 formed on the inner peripheral surface of the clutch outer ring 30, and the clutch retainer 34 is mounted to the clutch outer ring 30 such that it cannot rotate relative with respect to the clutch outer ring 30. Furthermore, inward facing collar sections 39a, 39b are formed on both ends in the axial direction of the outer clutch ring 30, and by holding the clutch retainer 34 on both sides in the axial direction by the collar sections 39a, 39b, the clutch retainer 34 does not move in the axial direction with respect to the clutch outer ring 30.

Moreover, springs 13 are mounted on part of the column sections 36a of this clutch retainer 34. In other words, in this example, as in the second and third examples of prior art construction shown in FIGS. 32 and 33, these springs 13 are formed by bending spring steel plate into triangular hook shapes. Also, protruding supports 57a, 57b are formed at three locations in the axial direction on the outside surfaces in the radial direction of the column sections 36a of the clutch retainer 34 such that they protrude toward the outside in the radial direction. Moreover, of these protruding supports 57a, 57b, the protruding supports 57a are formed in a pair near both ends in the axial direction of the column section 36a such that they both coincide with the phase in the circumferential direction of the clutch retainer 34. On the other hand, one protruding support 57b is formed in the middle section in the axial direction of the column section 36a and is out of phase in the circumferential direction of the clutch retainer 34 with respect to the other protruding supports 57a formed on the column section 36a. The base sections 58 of the springs 13 are held between the pair of protruding supports 57a formed near both ends in the axial direction of the column sections 36a, and the protruding support 57b that is formed in the middle section in the axial direction of the column sections 36a. With this construction, the base sections 58 of the springs 13 are supported by part of the columns sections 36a. Also, these springs 13 elastically press the rollers 33 held in the pockets 37 in the same circumferential direction of the clutch retainer 34 toward the section in the cylindrical space formed between the inner peripheral surface of the cam surface 31 and the outer peripheral surface (cylindrical surface) of the clutch inner ring 29 where the width in the radial direction becomes narrow.

Particularly, in this example, on the side surface in the circumferential direction of the protruding support 57b located in the middle section in the axial direction of the column sections 36a, an eave section 62 is located on the side surface that faces the side surface of the base section 58 of the springs 13 in the section that is separated further on the outer-diameter side than the side surface of this base section 58, and it protrudes toward the side of this base section 58. Also the length $L_{62}$ that the eave sections 62 protrude from the side surface in the circumferential direction of the protruding supports 57b located in the middle section in the axial direction is greater than the thickness $t_{13}$ of the base section 58 of the springs 13 ($L_{62}>t_{13}$).

The function of the pulley apparatus 6 with built-in roller clutch 61 constructed as described above when used in the engine-starting apparatus of a idling-stop vehicle is explained below. First, when starting the engine 1, electric power flows to the starter motor 4 and it turns the sleeve 60 that is fastened around the end of the rotation-drive shaft 5 and the clutch inner ring 29 that is fastened around this sleeve 60 in a specified direction (counterclockwise direction if FIG. 33). As this happens, the rollers 33 move toward the section in the circular-ring shaped space formed between the outer peripheral surface of the clutch inner ring 29 and the inner peripheral surface of the clutch outer ring 30 where the width in the radial direction is narrow. As a result, the rolling contact surfaces of the rollers 33 become wedged between the outer peripheral surface of the clutch inner ring 29 and the inner peripheral surface of the clutch outer ring 30, and the roller clutch 61 becomes locked, and rotation is transmitted from the clutch inner ring 29 to the clutch outer ring 30. In this state, the crankshaft 2 of the engine 1 (see FIG. 55) is driven by way of the pulley element 17, endless belt 7 and follower pulley 3, and the engine 1 starts.

After the engine 1 has started, electric power stops flowing to the starter motor 4 and the rotation-drive shaft 5 stops. In this state, the pulley element 17 is rotated and driven by the crankshaft 2 of the engine 1 by way of the endless belt 7 and the clutch outer ring 30 continues to rotate in the specified direction. As a result, the roller clutch 61 is set to the overrun state and does not transmit the rotation of the pulley element 17 to the sleeve 60. Therefore, when the engine 1 is operating, the starter motor 4 does not become a load against the rotation of the engine 1.

Particularly, in the case of the roller clutch assembled in the rotation-transmission apparatus with built-in roller clutch for starting an engine of this embodiment, of the protruding supports 57a, 57b formed on the columns sections 36a of the clutch retainer 34, eave sections 62 are located on the side surface in the circumferential direction of the protruding support 57b located in the middle section in the axial direction and on the side that faces the side surface of the base section 58 of the springs 13, on the outer-diameter side of the side surface. Also the protruding length $L_{62}$ that the eave sections 62 protrude from the side surface of the protruding support 57b is greater than the thickness $t_{13}$ of the base sections 58 of the springs 13 ($L_{62}>t_{13}$). Therefore, with this roller clutch, when a large centrifugal force acts on the springs 13 due to the high-speed rotation of the clutch retainer 34 during operation, it is possible to prevent the springs 13 from shifting or falling out of place toward the outer-diameter side with respect to the protruding supports 57a, 57b. Therefore, it is possible to improve the reliability of the roller clutch.

As a result with the rotation-transmission apparatus with built-in roller clutch for starting the engine of an idling-stop vehicle in which this roller clutch is assembled, it is possible to prevent the springs 13 from shifting toward the outer-diameter side and to improve reliability and durability of the roller clutch even though there is a tendency for the springs 13 to shift outward due to the continuing high-speed rotation of the clutch retainer 34 with the clutch outer ring 30 after the engine starts. Furthermore, in this example, the clutch retainer 34 is made of synthetic resin so it is lightweight and the work of manufacturing it can be simplified.

In this example, of the protruding supports 57a, 57b that are located on the column sections 36a, eave sections 62 are formed on just the protruding supports 57b that are located in the middle section in the axial direction for preventing the springs 13 from shifting outward or falling out of place. However, it is also possible to form the same kind of eave sections on the side surfaces of the protruding supports 57a that are located near both ends in the axial direction on the side surface and on the side that faces the side surface of the base section 58. Also, it is possible to form eave sections on just the protruding supports 57a that are located near both axial ends, without forming eave sections 62 on the protruding supports 57b that are located in the middle section in the axial direction. Increasing the number of eave sections 62 for each column section 36a in this way is more effective in preventing the springs 13 from shifting outward or falling out of place. However, in this case, the work of assembling the springs becomes very troublesome when compared with this example. Also, the shape of the springs 13 is not limited to a triangular hook shape as in this example, and a various shapes could be used, such as a 'U' shape. For example, in the case of using a spring having a 'U shape, one of the pair of arm sections of the spring corresponds to the base section in claim 7.

Next, FIGS. 28 and 29 show a fifteenth example of the embodiment of the invention. In this example, convex beveled sections 63, 64 (FIG. 29) that have a ¼ arc-shaped or partial conical-shaped cross section are formed on the outer edges of both ends in the axial direction of the rollers 33 and of both end surfaces in the axial direction of the clutch inner ring 29. The total width in the radial direction of these bevel sections is regulated as explained below by the relationship between the roller 33 and the clutch inner ring 29.

In other words, as shown in FIG. 28, the state in which the rollers 33 are held in the pockets 37 of the clutch retainer 34, and the rolling contact surfaces of the rollers 33 are pressed to one end in the circumferential direction of the pockets 37 (right ends in FIG. 28) by the springs 13 in the clutch retainer 34 is considered. In this example, in this state, the rolling contact surfaces of the rollers 33 do not come in contact with the cam surface 31 even when the clutch outer ring 30 is located around this clutch retainer 34 such that the convex sections 56 fit with the concave sections 14 of the cam surface 31. Also, the state where the clutch retainer 34 and clutch inner ring 29 are on the same axis, and the clutch inner ring 29 does not penetrate the inner-diameter side of the rollers 33, is considered. In the state where both members 34, 29 are placed in this way, the dimensions are regulated such that the amount δ that the rollers 33 move up toward the inner-diameter side more than the clutch track that is formed around the outer peripheral surface of the clutch inner ring 29 (the amount that the clutch inner ring 29 and the rollers 33 overlap in the axial direction) is less than the total of the width $W_1$ in the radial direction of the bevel section 63 on the ends of the rollers, and the width $W_2$ in the radial direction of the bevel sections 64 on the ends of the clutch inner ring 29 ($δ<W_1+W_2$). By satisfying this relationship, either one of the widths $W_1$, $W_2$ could be 0. In other words, it is also possible to form bevel sections on just the clutch inner ring 29 or the rollers 33.

The work of assembling the roller clutch 61a constructed as described above is performed as explained below. First, together with mounting the springs 13 into the clutch retainer 34, the rollers 33 are held in the pockets 37 formed in the clutch retainer 34. In this state, the springs 13 press the rollers 33 to one side in the circumferential direction of the pockets 37. Then the assembled rollers 33, springs 13 and clutch retainer 34 are installed on the inner-diameter side of the clutch outer ring 30. When doing this, the convex fitting sections 56 formed on the clutch retainer 34 are fitted with the concave sections 14 formed on the cam surface 31 of the clutch outer ring 30, to prevent relative rotation between the clutch outer ring 30 and the clutch retainer 34. In the example shown in the figures, on one end in the circumferential direction of the pockets 37, an inclined surface 65 having a V-shaped cross section is formed on both end sections in the axial direction of the surface of one side in the circumferential direction (right side surface is FIG. 28) of the column sections 55a. Also, as described above, when the springs 13 press the rollers 33 to one side in the circumferential direction of the pockets 37, the rolling contact surfaces of the rollers 33 come in contact with the inclined surface 65.

Next, the clutch inner ring 29 is installed in the inner-diameter side of the rollers 33. First, one end in the axial direction (right end in FIG. 29) of the clutch inner ring 29 is inserted on the inner-diameter side of (fitted into) the rollers 33. When performing this insertion, the bevel sections 63, 64 that are formed on the end sections in the axial direction of the clutch inner ring 29 and the rollers 33 function as guide surfaces.

At the instant when the work of inserting the clutch inner ring 29 in the way begins, the phase in the circumferential direction of the rollers 33 with respect to the clutch outer ring 30 is as shown by the solid line in FIG. 28. In other words, the rollers 33 are located in the comparatively shallow sections of the concave sections 14 of the cam surface 31 formed around the inner peripheral surface of clutch outer ring 30. Also, in this state, a space s that is smaller than the amount δ that the rollers 33 protrude toward the inner-diameter side than the cylindrical surface around the outer peripheral surface of the clutch inner ring 29 exists in the space between the rolling contact surfaces of the rollers 33 and the concave sections 14. Also, in the section where the rollers 33 exist, the distance L between the outer peripheral surface of the clutch inner ring 29 and the cam surface 31 formed around the inner peripheral surface of the clutch outer ring 30 is less than the diameter $D_{33}$ of the rollers 33 ($L<D_{33}$). Therefore, with this phase of the rollers 33 in the circumferential direction of the clutch outer ring 30, it is difficult to fit the clutch inner ring 29 into the inner-diameter side of the rollers 33.

However, when installing the clutch inner ring 29 on the inner-diameter side of the rollers 33, cam surface 31 formed on the inner peripheral surface of the clutch outer ring 30 moves the rollers 33 in the circumferential direction against the elastic force of the springs 13. In other words, at the same time that the end in the axial direction of the clutch inner ring 29 enters the inner-diameter side of the rollers 33 due to the fit between each of the bevel sections 63, 64, the outer peripheral surface of the clutch inner ring 29 presses the rollers 33 against the inner peripheral surface of the clutch outer ring 30. Therefore, the rollers 33 receive a reaction force from the inner peripheral surface of the clutch outer ring 30 and the inclined surfaces of the concave sections 14 of the cam surface 31 formed around the inner peripheral surface of the clutch outer ring 30 presses the rollers 33 in directions orthogonal to the inclined surfaces. Also, of this force in the orthogonal direction, the component force acting in the circumferential direction of the clutch outer ring 30 moves the rollers 33 against the elastic force of the springs 13, and as shown by the dashed line in FIG. 28, the rollers 33 move into a specified location in the circumferential direction between the inner peripheral surface of the clutch outer ring 30 and the outer peripheral surface of the clutch inner ring 29, or in other words, the section where the space between these two surfaces coincides with the diameter $D_{33}$ of the rollers 33. In this stat, the roller clutch 61a is completely assembled.

Also, when assembling the pulley apparatus 59 (see FIG. 25) in which this assembled roller clutch 61a has been installed, the clutch outer ring 30 is tightly fitted into the pulley element 17 through interference fit (see FIG. 25), and the clutch inner ring 29 is tightly fitted onto the sleeve 60 through interference fit (see FIG. 25). In this state, the roller clutch 61a is assembled between the inner peripheral surface in the middle section of the pulley element 17 and the outer peripheral surface in the middle section of the sleeve 60.

Moreover, a pair of ball bearings 19 (see FIG. 25) are installed between the inner peripheral surface on both ends in the axial direction of the pulley element 17 and the outer peripheral surface on both ends in the axial direction of the sleeve 60 so that they are located on both sides in the axial direction of the roller clutch 61*a*. In this state, the pulley apparatus 59 is completely assembled.

In the case of the rotation-transmission apparatus with built-in roller clutch for starting the engine of an idling-stop vehicle of this embodiment assembled as described above, bevel sections 63, 64 are formed on the outer peripheral edges of ends in the axial direction of the rollers 33 and ends in the axial direction of the clutch inner ring 29. Also, in the state where the rollers 33 are held in the clutch retainer 34, and each of these rollers 33 is pressed by the springs 13 located in the clutch retainer 34 toward part of the pockets 37, and where the clutch retainer 34 is placed concentric with the clutch inner ring 29, the amount $\delta$ that the rollers 33 move further toward the inner-diameter side than the clutch track formed around the outer peripheral surface of the clutch inner ring 29 is less than the total of the width $W_1$ in the radial direction of the bevel sections 63 on the ends of the rollers 33, and the width $W_2$ of the bevel sections 64 on the end of the clutch inner ring 29 ($\delta < W_1 + W_2$). Therefore, in this example, with the rollers 33 held in the clutch retainer 34, the work of inserting the clutch inner ring 29 into the inner-diameter side of the rollers 33 can be performed smoothly. Moreover, it is possible to prevent the rollers 33 from falling out of place into the inner-diameter side of the clutch retainer 34 due to interference between the ends in the axial direction of the rollers 33 and the end in the axial direction of the clutch inner ring 29. Therefore, the work of assembling the roller clutch that is installed in the rotation-transmission apparatus with built-in roller clutch for starting an engine of this embodiment can be simplified. As a result, with the rotation-transmission apparatus with built-in roller clutch for starting the engine of an idling-stop vehicle in which this roller clutch is installed, it is possible to prevent the rollers from falling out of place, and assembly work can be performed easily even when the elastic force of the springs 13 is large.

The other construction and function are substantially the same as in the case of the fourteenth example shown in FIGS. 25 to 27, so any redundant explanation is omitted.

Next, FIG. 30 shows a sixteenth example of the embodiment of the invention. In this example, of the opening sections of the pockets 37 of the clutch retainer 34, the width $L_{37}$ in the circumferential direction of the opening in the inner-diameter side of the clutch retainer 34 is less than the diameter $D_{33}$ of the rollers 33 ($L_{37} < D_{33}$). In this kind of example, when the rollers 33 are held in pockets 37, the rollers 33 cannot pass through the opening on the inner-diameter side. Therefore, when fitting the clutch inner ring 29 on the inner-diameter side of the rollers 33 with the rollers 33 held in the clutch retainer 34 (see FIGS. 25, 28 and 29), it is possible to prevent the rollers 33 from falling into the inner-diameter side of the clutch retainer 34 even when there is interference with part of the rollers 33 and part of the clutch inner ring 29. Therefore, in this example as well, similar to in the case of the fifteenth example described above using FIGS. 28 and 29, the work of assembling the roller clutch 61*a* can be performed easily. As a result, in the case of the rotation-transmission apparatus with built-in roller clutch for starting the engine of an idling-stop vehicle in which this roller clutch is installed, it is possible to perform assembly work easily even when the elastic force of the springs 13 is large.

The other construction and functions are substantially the same as in the case of the fifteenth example shown in FIGS. 28 and 29 described above, so any redundant explanation is omitted. The shape of the clutch retainer 34 is not limited to the shape shown in the figure, and various shapes could be used as long as of the opening section of the pockets 37, the width in the circumferential direction of the opening on the inner-diameter side of the clutch retainer 34 is less than diameter of the roller 33.

Next, FIG. 31 shows a seventeenth example of the embodiment of the invention. In this example, the location where the rolling contact surface of the rollers 33 of the roller clutch 61*b* comes in contact with the springs 13 is regulated by the relationship with the direction of movement of the rollers 33. In other words, the state in which the rollers 33 are held between the cam surface 53 of the clutch outer ring 30 and the outer peripheral surface of the clutch inner ring 29 and these rollers 33 move along the concave sections 14 of the cam surface 53 to the deep sides of the concave sections 14 is considered. With respect to the direction of movement (direction shown by the arrow X in FIG. 31) of the center axis O of the rollers 33 in this state, the dimensions of each section are regulated such that the tip edge of the springs 13 comes in contact with the rolling contact surface of the rollers 33 at a position (position indicated by the point Q in FIG. 31) further on the inside in the radial direction of the clutch retainer 34 than the position (position indicated by the point P in FIG. 31) on the front end of the rolling contact surface of the rollers 33. Also, in this example, when the rollers 33 are held between the cam surface 53 on the clutch outer ring 30 and the outer peripheral surface of the clutch inner ring 29, the direction that the springs 13 press the rollers 33 coincides with the tangential direction in the circumferential direction of the clutch retainer 34.

With the construction of this example, the direction that the springs 13 press the rollers 33 in the locked state (direction indicated by the Y arrow in FIG. 31) is inclined in the direction that a component force is produced to press the rollers 33 in the concave section 14 with respect to the direction of movement (direction indicated by the arrow X in FIG. 31) of the center axis O of the rollers 33 when the rollers 33 move from the locked state along the concave sections 14 to the deep side of the concave sections 14. Therefore, in this example, when changing from the locked state to the overrun state, the rollers 33 are moved easily along the concave sections 14 to the deep side of the concave sections 14 by the centrifugal force even when the elastic force of the springs 13 used in the engine-starting apparatus for an idling-stop vehicle is large. Therefore, in the overrun state, it is possible to prevent sliding contact between the rolling contact surfaces of the rollers 33 and the outer peripheral surface of the clutch inner ring 29, and thus it is possible to suppress the occurrence of friction heat and friction loss. Therefore, it is possible to improve the durability and performance of the roller clutch 61*b* of this example. As a result, with the rotation-transmission apparatus with built-in roller clutch for starting the engine of an idling-stop vehicle in which this roller clutch 61*b* is installed, it is possible to improve durability and performance even when springs 13 having a large elastic force are used.

The other construction and function are substantially the same as in the fourteenth example shown in FIGS. 25 to 27 described above, so any redundant explanation is omitted.

In each of the examples described above, the case in which the clutch outer ring 30 and clutch inner ring 29 of the roller clutch 61, 61a, 61b are separate from the pulley element 17 and sleeve 60 (see FIG. 25, etc.), and fitted around the inner peripheral surface of the pulley element 17 and around the outer peripheral surface of the sleeve 60 was explained. However, in the fourteenth to seventeenth examples shown in FIGS. 25 to 31 described above, construction is not limited to this, and construction is possible in which the clutch outer ring is integrated into one member with the pulley element, and the clutch inner ring is integrated into one member with the sleeve. In this case, the pulley element becomes the outer member and the sleeve becomes the inner member.

Moreover, in the fourteenth to the seventeenth examples shown in FIGS. 25 to 31 above, the case in which the roller clutch is assembled in a pulley apparatus 59, which is a rotation-transmission apparatus with built-in roller clutch for starting the engine of an idling-stop vehicle was explained. In other words, the roller clutch described in the fourteenth to the seventeenth examples above is used in a starting apparatus that starts the engine of an idling-stop vehicle. However, the use of the roller clutch assembled in the fourteenth to the seventeenth examples above is not limited to this. For example, in other rotation-transmission units for auxiliary drive apparatuses, where the retainer rotates at high speed for a long time during operation, and where there is a large torque transmitted between the clutch inner ring 29 and clutch outer ring 30 in the locked state, use of the roller clutch assembled in the fourteenth to the seventeenth examples above is effective. For example, in an idling-stop vehicle, the roller clutch of the fourteenth to the seventeenth examples above can be assembled between the inner peripheral surface of the rotating member that rotates together with the rotating shaft of a compressor and the outer peripheral surface of a sleeve that rotates together with the rotating shaft of the auxiliary drive motor when starting the compressor of a air-conditioning apparatus when the engine is stopped. A summary of the construction of the kind of roller clutch described in the fourteenth to the seventeenth examples above (first to fifth roller clutches) and a rotation-transmission unit for an auxiliary drive is given below.

First, similar to the second and third examples of a prior art roller clutch shown in FIGS. 32 and 33, the first to the fifth roller clutches each comprise: an outer member; an inner member that is located on the inner-diameter side of the outer member; a cam surface that is located around the inner peripheral surface of the outer member and that has concave sections at a plurality of locations in the circumferential direction and whose depth gradually decreases in one direction with respect to the circumferential direction; a plurality of rollers that are located in the cylindrical space between the inner peripheral surface of the outer member and the outer peripheral surface of the inner member; a retainer that holds these rollers; and a plurality of elastic members that have a base supported by part of the retainer, respectively, to press these rollers toward a section inside the cylindrical space where the thickness in the radial direction becomes narrow. Particularly, the first roller clutch comprises a plurality of protruding supports that protrude in the radial direction and that are provided on the outer peripheral surface in the middle section in the axial direction of the retainer at a location to face the side surface of the base of the elastic members; and eave sections that are located on the side surfaces of the protruding supports, respectively, on the side to face the side surfaces of the bases of the elastic members and are located further toward the outer-diameter side than the side surfaces of the bases to protrude out from the base side of the elastic members. Also, the protruding length that these eaves protrude out from the side surface of the protruding supports is greater than the thickness of a section of the base of the elastic members that faces this side surface.

Also, in the second roller clutch, bevel sections are formed on the outer peripheral edges of the end surfaces in the axial direction of the respective rollers, and/or the end surfaces in the axial direction of the inner member. When the rollers are held in pockets that are located at a plurality of locations in the circumferential direction of the retainer, respectively, such that the elastic force of the elastic members presses them toward part of the pocket, and when the inner member is located on the same axis line as the retainer at a location separated from the rollers in the axial direction, the amount that the rollers move further toward the inner-diameter side than the clutch track formed around the outer peripheral surface of this inner member is less than the total of the width in the radial direction of the bevel sections on the end sections of the rollers and the width in the radial direction of the bevel section on the end section of the inner member.

Moreover, in the third roller clutch, of the opening sections of the plurality of pockets located at a plurality of locations in the circumferential direction of the retainer for holding the rollers, the width in the circumferential direction of the opening on the inner-diameter side is less than the diameter of the rollers.

Also, in the fourth roller clutch, when the rollers are held between the cam surface and the outer peripheral surface of the inner member and these rollers move along the concave sections to the deep side of the concave sections, the elastic members come in contact with the rolling contact surface of the rollers at a location further on the inside in the radial direction of the retainer than the front end of the rolling contact surface of the rollers in the direction of movement of the center axis of the rollers.

Furthermore, the fifth roller clutch is the first to fourth roller clutches in which the retainer is made of synthetic resin.

Also, the rotation-transmission unit for an auxiliary drive comprises; a rotating member that rotates together with the rotating shaft of the engine or auxiliary device; a sleeve that rotates together with the rotating shaft of the auxiliary device or auxiliary-drive motor such as a starter motor; and one of the aforementioned first to fifth roller clutches that is located between the inner peripheral surface of the rotating member and the outer peripheral surface of the sleeve.

With the first to fifth roller clutches and the rotation-transmission unit for an auxiliary drive described above, it is possible to prevent problems that occur when the retainer rotates at high speed for a long time during operation and when elastic members having a large spring force are used as in the case when assembled in an engine-starting apparatus for an idling-stop vehicle.

First, in the case of the first roller clutch, together with forming eave sections on the side surfaces of the protruding supports that face the bases of the elastic members in a section that is located further on outer-diameter side than the bases, the protruding length that the eave section protrude from the side surfaces of the protruding supports is greater than the thickness of the portions of the bases that face the side surfaces. Therefore, even when a large centrifugal force acts on the elastic members during operation due to the high-speed rotation of the retainer, it is possible to prevent the elastic members from coming out of place or shifting toward the outer-diameter side with respect to the protruding supports, and thus it is possible to improve the reliability of the roller clutch. As a result, when the rotation-transmission unit for an auxiliary drive in which this roller clutch is assembled is used as an engine-starting apparatus for an idling-stop vehicle, even when the retainer continues to rotate at high speed for a long time together with the outer member and there is a tendency for the elastic member to easily shift toward the outer-diameter side, it is possible to prevent this shifting radially toward the outside and to improve reliability and durability.

Also, in the case of the second and third roller clutches, when inserting the inner member into the inner-diameter side of the plurality of rollers after the retainer and plurality of rollers have been assembled, it is possible to prevent the rollers from falling into the inner-diameter side of the retainer due to interference between the end surfaces in the axial direction of the rollers and the end surface in the axial direction of the inner member. Therefore, the work of assembling the roller clutch is simplified. As a result, when the rotation-transmission unit for an auxiliary drive in which this roller clutch is assembled is used as an engine-starting apparatus for an idling-stop vehicle, it is possible to prevent the rollers from falling out even when elastic members having a large elastic force are used, and to simplify the work of assembly.

Moreover, in the case of the fourth roller clutch, when changing from the locked state to the overrun state even when the elastic force of the elastic members is large, the rollers move easily along the concave section formed in the cam surface on the inner peripheral surface of the outer member to the deep side of the concave section due to the centrifugal force. Therefore, in the overrun state, it is possible to prevent sliding contact from being kept between the rolling contact surfaces of the rollers and the outer peripheral surface of the inner member, and to suppress the occurrence of friction heat and friction loss. Therefore, it is possible to improve the durability and performance of the roller clutch. As a result, when the rotation-transmission unit for an auxiliary drive in which this roller clutch is assembled is used as an engine-starting apparatus for an idling-stop vehicle, it is possible to improve the durability and performance even when elastic members having a large elastic force are used.

Furthermore, the rotation-transmission apparatus for an auxiliary drive in which the fifth roller clutch is assembled makes it possible to reduce the weight as well as simplify manufacturing of the apparatus.

In this way, the rotation-transmission apparatus for an auxiliary drive in which the first to the fifth roller clutches are assembled make it possible to prevent problems that occur when the retainer rotates at high speed for a long time during operation, and when the elastic force of the elastic members used is large.

Figure 34:
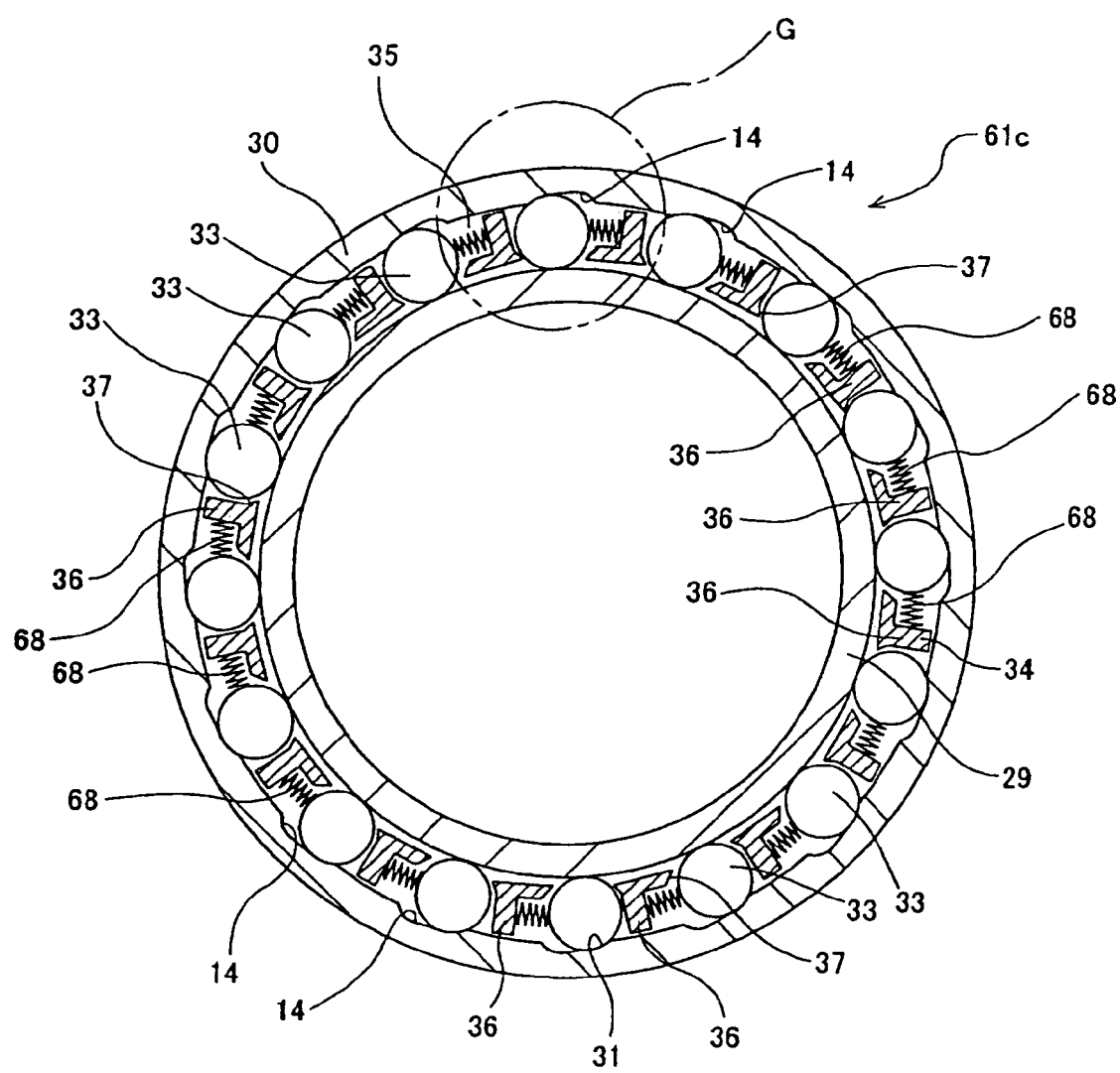
FIG. 34 is a view, corresponding to the cross section of F-F in FIG. 25, to show the roller clutch in an eighteenth example of embodiment of the present invention.
Figure 35:
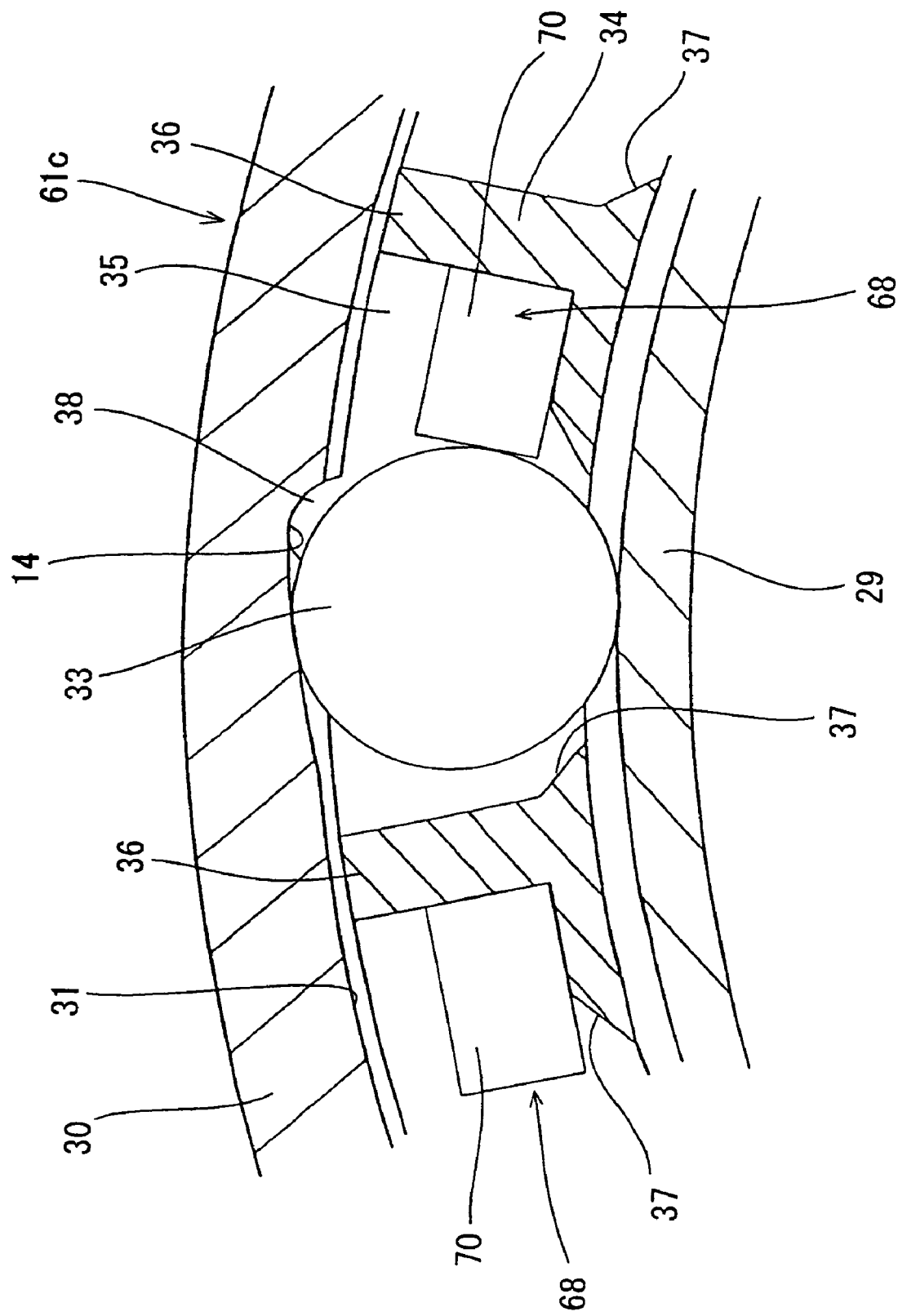
FIG. 35 is an enlarged view of Portion G.
Figure 36:
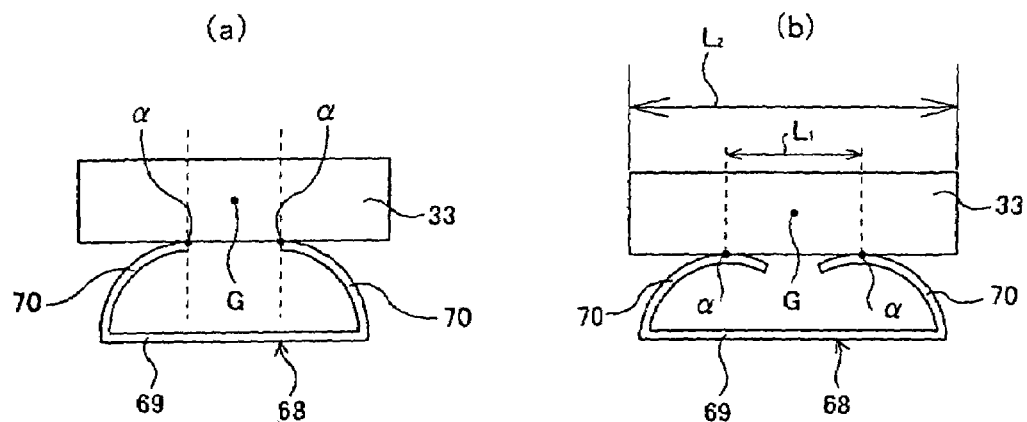
FIG. 36 is a view of the rollers and springs in the examples, wherein (a) shows a free state and (b) shows a compressed state.
Figure 37:
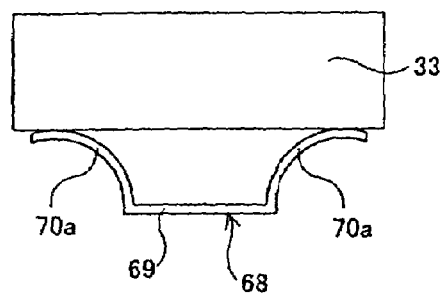
FIG. 37 is a cross sectional view, similar to FIG. 36(a), to show a nineteenth example of embodiment of the present invention.
Figure 38:
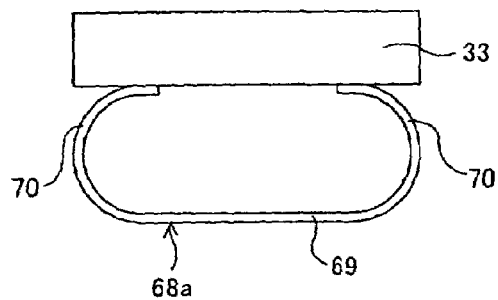
FIG. 38 is a cross sectional view, similar to FIG. 36(a), to show a twentieth example of embodiment of the present invention.
Figure 39:
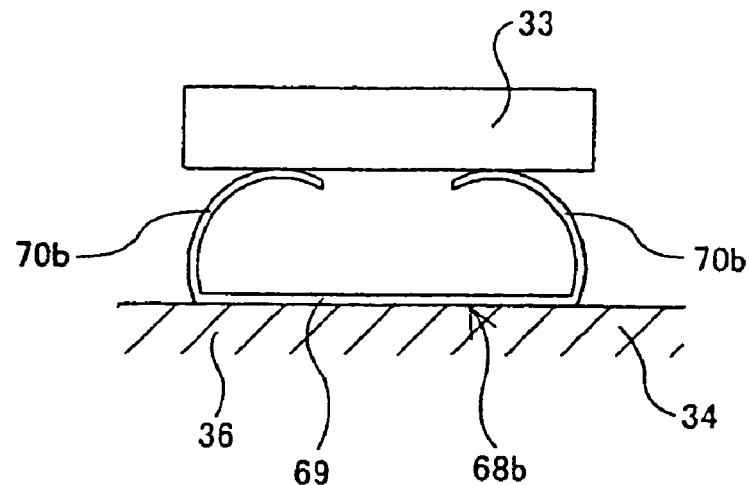
FIG. 39 is a cross sectional view, similar to FIG. 36(a), to show a twenty-first example of embodiment of the present invention.
Figure 40:
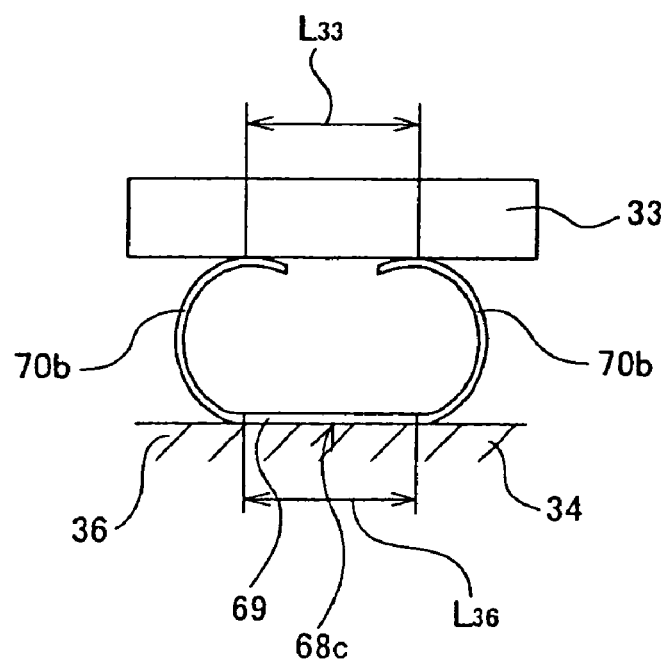
FIG. 40 is a cross sectional view, similar to FIG. 36(a), to show a twenty-second example of embodiment of the present invention.

Next, FIGS. 34 to 36 show an eighteenth example of the embodiment of the invention, FIG. 37 shows a nineteenth example of the invention, FIG. 38 shows a twentieth example of the invention, FIG. 39 shows a twenty first example of the invention, and FIG. 40 shows a twenty second example of the invention. Each of these examples was invented to maintain sufficient durability of a rotation-transmission apparatus with a built-in roller clutch for starting an engine, and more specifically with the object of solving the following problems.

In other words, in recent years idling-stop vehicles as described above are in part actually being used. Moreover, in order to provide specified functions to the engine-starting apparatus of this kind of idling-stop vehicle, the use of an apparatus with a built-in one-way clutch, such as the roller clutch 8 shown in FIG. 56 and described above, is considered as the drive-pulley apparatus 6 (see FIG. 55) that is located on the end of the rotation-drive shaft of a starter motor 4. This roller clutch 8 comprises a inner ring 9 and outer ring 10 that are arranged such that they are concentric with each other, and a retainer 11 and plurality of rollers 12 and springs 13 that are located between the outer peripheral surface of the inner ring 9 and the inner peripheral surface of the outer ring 10. Also, the outer peripheral surface of the inner ring 9 is a cam surface having a plurality of concave sections 14 called ramps, and the inner peripheral surface of the outer ring 10 is a simple cylindrical surface. Moreover, the springs 13 used for pressing the rollers 12, can be plate springs 13 that are bent into a triangular hook shape as shown in FIG. 41, plate springs 13a that are bent into an angular channel shape as shown in FIG. 42, or even plate springs 13b that are bent into and 'S' shape as shown in FIG. 43.

However, in the case of the roller clutch 8 described above, in the overrun state where rotation force is not transmitted, or in other words, in the state where the springs 13, 13a, 13b are pressed by the rollers 12, uneven wear and heat can occur due to partial sliding between the rollers 12 and the inner peripheral surface of the outer ring 10 when the attitude of the rollers 12 shift from the normal position in a direction that the center axis is tilted (skewed), and this could lead to premature life of the rollers 12 or outer ring 10. Particularly, in the case when the roller clutch 8 that is assembled in an engine-starting apparatus for the idling-stop vehicle described above is used for a long time in the overrun state where rotation force is not transmitted, preventing this kind of skew of the rollers 12 is important from the aspect of maintaining durability (lengthening life). Even in the locked state in which rotation force is transmitted, this kind of skew of the rollers 12 could cause problems such as making it difficult for the rollers 12 to fit properly between the outer peripheral surface of the inner ring 9 and the inner peripheral surface of the outer ring 10, making it such that a specified amount of power cannot be transmitted between the inner ring 9 and outer ring 10, and making it easy for large surface pressure to be applied causing damage as early flaking, and is not desirable.

Figure 41:
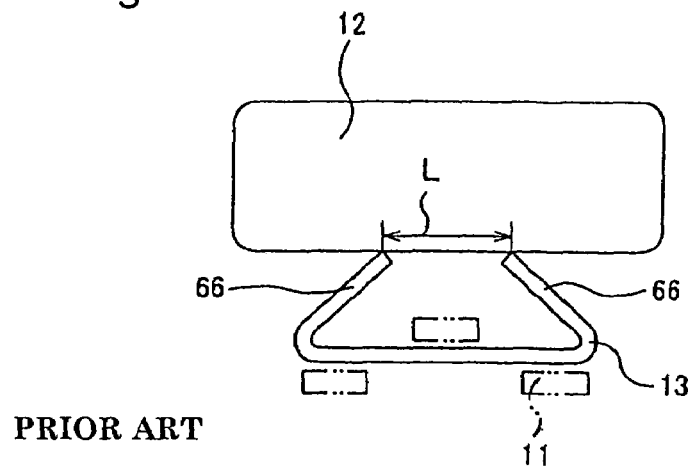
FIG. 41 is a cross sectional view, similar to FIG. 36(a), to show a first example of the conventional spring.

In the case of the triangular hook shaped spring 13 shown in FIG. 41, in the overrun state when the rotation force is not transmitted, or in other words, when the rollers 12 press by the springs, the space L in the axial direction between the points of contact between the pair of pressure sections 66 of these springs 13 and the rolling contact surfaces of the rollers becomes small (short). When this space L between the points of contact becomes small, the rigidity (moment rigidity) of the springs 13 that suppresses the moment load (force causing skew to occur) applied to the rollers 12 drops, and due to unavoidable errors in dimensions in these springs 13, it becomes easy for the direction that the springs 13 press the rollers 12 to shift from the proper direction. When the direction shifts, a moment is applied to the rollers 12 in a direction that tilts the rollers 12. As a result, it becomes easy for the rollers 12 to become skewed. Also, when these rollers 12 are skewed, there is a possibility that the springs 13 will be unable to provide sufficient pressure to restore the attitude of the rollers to the proper position. Therefore, there is a possibility that the problems described above may occur due to skew of the rollers 12 and lead to early life of the roller clutch.

Figure 42:
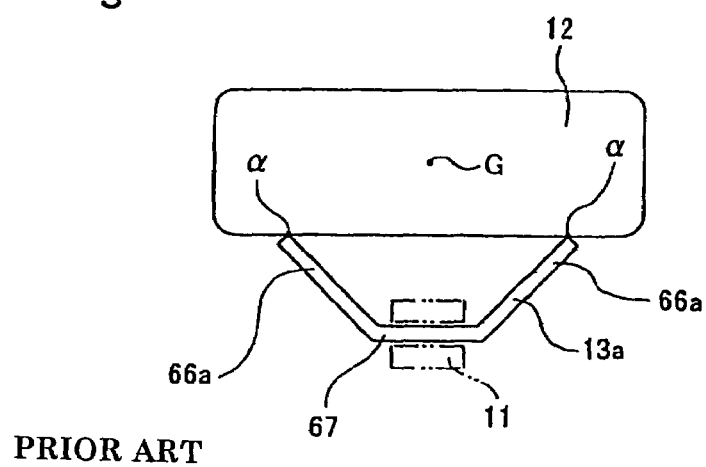
FIG. 42 is a cross sectional view, similar to FIG. 36(a), to show a second example of the conventional spring.
Figure 43:
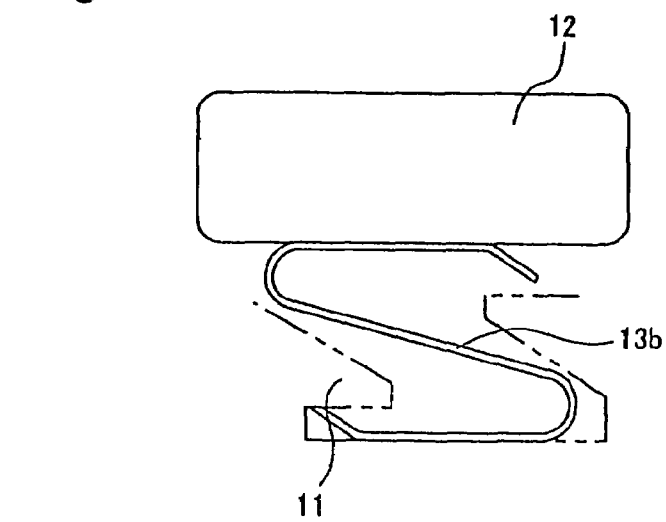
FIG. 43 is a cross sectional view, similar to FIG. 36(a), to show a third example of the conventional spring.

Also, in the case of the springs 13a bent into an angular channel shape as shown in FIG. 42, in the overrun state in which the rotation force is not transmitted, or in other words, the state in which the rollers 12 press the springs 13a, there is a possibility that large tensile stress will be applied at the connecting areas between the main part 67 of the springs 13a and the pressure sections 66a. When this kind of large tensile stress is applied to the connecting areas in this way, there is a possibility of plastic deformation of these connecting areas, and when plastic deformation occurs, the proper amount of pressure is not applied to the rollers 12. Also, due to the positional relationship between the points of contact α between the pressure sections 66a of the springs 13a and the rolling contact surfaces of the rollers 12 and the center of gravity G of the rollers 12, there is a possibility that a moment will be applied to the rollers 12, which makes it easy for the rollers 12 to become skewed. Therefore, there is a possibility that the problems described above may occur due to skew of the rollers 12 and lead to early life of the roller clutch.

Moreover, in the case of the springs 13b that are bent into an 'S' shape as shown in FIG. 43, there is normally linear contact between the springs 13b and the rollers 12, however, when these rollers 12 become even a little skewed, the contact between the springs 13b and rollers 12 becomes point contact. Also, together with that, it is difficult for the location of the contact between the springs 13b and the rollers 12 to be constant, and the locations of each of the contact points is always changing. As a result, the direction that pressure is applied by the springs 13b becomes shifted from the direction of the center of gravity of the rollers 12, and thus a moment is applied to the rollers 12 and there is a possibility that tilt angle of the rollers 12 will become large. Therefore, there is a possibility that problems described above may occur due to skew of the rollers 12 and lead to early life of the roller clutch.

The eighteenth to twenty-second examples of the embodiment of the invention shown in FIGS. 34 to 40 take the aforementioned problems into consideration, and by preventing skew of the rollers during the overrun state (state when the rollers press the springs), provide a rotation-transmission apparatus with built-in roller clutch for starting an engine having excellent durability (long life).

First, FIGS. 34 to 36 show an eighteenth example of the embodiment of the invention. The rotation-transmission apparatus with built-in roller clutch for starting an engine of this embodiment is pulley apparatus with built-in roller clutch, and the case of using it as the drive-pulley apparatus 6 for transmitting the rotation of the rotation-drive shaft 5 of the starter motor 4 to the endless belt 7 in the engine-starting apparatus for the idling-stop vehicle shown in FIG. 55 will be explained. The drive-pulley apparatus 6 assembled in this kind of engine-starting apparatus transmits the rotation of the rotation-drive shaft 5 to the endless belt 7 when electric power flows to the starter motor 4, however, after the engine 1 starts and the endless belt 7 is driven by the engine 1, it does not transmit power from the endless belt 7 to the rotation-drive shaft 5.

The pulley apparatus with built-in roller clutch that is used as this kind of drive-pulley apparatus comprises a pulley element 17 (see FIG. 25) around whose outer peripheral surface the endless belt 7 is placed, and a sleeve 60 (see FIG. 25) that is fitted and fixed onto the tip end of the rotation-drive shaft 5, that are located such that they are concentric with each other. Also, as in the first example in FIGS. 1 to 5, a pair of deep-groove type ball bearings 19 as support bearings, and a roller clutch 61c are located between the outer peripheral surface of the sleeve 60 and the inner peripheral surface of the pulley element 17. In order to install these ball bearings 19 and roller clutch 61c, the inner peripheral surface of the pulley element 17 and the outer peripheral surface of the sleeve 60 are simple cylindrical surfaces. However, in order to position the ball bearings 19 and roller clutch 61 in the axial direction, a stepped section in the radial direction may be formed around the inner peripheral surface of the pulley element 17 and/or outer peripheral surface of the sleeve 60. Also, the outer races 24 (see FIG. 1) of the ball bearings 19 are fitted and fixed around the inner peripheral surface near both ends of the pulley element 17 through interference fit, and the inner races 26 (see FIG. 1) are fitted and fixed around the outer peripheral surface near both ends of the sleeve 60 through interference fit. Differing from the case of the first example, the ball bearings 19 may be constructed without having a pair of seal rings 28a, 28b (see FIG. 1) on the ends in the axial direction.

Moreover, the roller clutch 61c transmits rotation force between the pulley element 17 and sleeve 60 only when there is a tendency for the pulley element 17 to rotate in a specified direction relative to the sleeve 60. To construct this kind of roller clutch 61c, the clutch inner ring 29 is tightly fitted and fastened around the middle section of the outer peripheral surface of the sleeve 60. This clutch inner ring 29 is made into a generally cylindrical shape by plastic working such as pressing of steel plate such as carburized steel, and the inner and outer peripheral surfaces are both simple cylindrical surfaces. The sleeve 60 and clutch inner ring 29 could also be integrated into one member.

On the other hand, the clutch outer ring 30 is tightly fitted and fastened around the inner peripheral surface in the middle of the pulley element 17, and the inner peripheral surface of the clutch outer ring 30 is a cam surface 31. In other words, the inner peripheral surface of this clutch outer ring 30 is made into a cam surface 31 by forming a plurality of concave section 14, called ramp sections, on the inner peripheral surface such that they are evenly spaced in the circumferential direction. This kind of clutch outer ring 30 is also formed into a generally cylindrical shape by plastic working such as pressing of steel plate such as carburized steel. The pulley element 17 and the clutch outer ring 30 could also be integrated into a single member.

The rollers 33, which together with the clutch inner ring 29 and clutch outer ring 30 make up the roller clutch 61c, are supported such that they can roll freely and move a little in the circumferential direction by a clutch retainer 34 that is fastened to the clutch outer ring 30 such it cannot rotate with respect to the clutch outer ring 30. This clutch retainer 34 is made of synthetic resin (for example, a synthetic resin or plastic such as polyamide 66, polyamide 46, polyphenylene sulfide that is mixed 20% with glass fibers) and formed into a cage-type cylindrical shape, and comprises a pair of circular-ring shaped rim sections 35, and a plurality of column sections 36a that connect the rim sections 35 to each other.

The sections surrounded on four sides by the inside surfaces of the rim sections 35 and the circumferential side surfaces of the column sections 36 form pockets 37 for holding the rollers 33 such that they can roll freely and move a little in the circumferential direction. Also, convex sections 38 that are formed at a plurality of locations on the outer peripheral surface of the rim sections 35 are engaged with the concave sections 14 that are formed on the inner peripheral surface of the clutch outer ring 30 as shown in FIG. 35, so that the clutch retainer 34 is mounted to the clutch outer ring 30 such that it does not rotate relative to the clutch outer ring 30. Also, by holding the clutch retainer 34 on both sides in the axial direction by inward facing collar sections 39a, 39b that are formed on both end sections in the axial direction of the clutch outer ring 30 (see FIG. 25), the clutch retainer 34 does not move in the axial direction with respect to the clutch outer ring 30.

Moreover, springs 68 are mounted as shown in FIGS. 34 to 36 on one side surface in the circumferential direction of the column sections 36 of the clutch retainer 34. The springs 68 located on the column sections 36 elastically press the rollers 33 that are held in the pockets 37 in the same circumferential direction (counterclockwise direction, or left direction in FIG. 35, upward in FIG. 36) of the clutch retainer 34 in cylindrical space between the inner peripheral surface of the cam surface 31 and the outer peripheral surface (cylindrical surface) of the clutch inner ring 29 toward the section where the width in the radial direction becomes narrow. In FIG. 34, in order to recognize easily the existence of the springs, the springs 68 are drawn as compression coils springs, however, actually, as shown in FIGS. 35 to 36, springs 68 assembled are made bending plate steel such as stainless steel plate. This example differs from the fourteenth example shown in FIGS. 25 to 27, in that there are no protruding eave sections 62 (see FIGS. 26 and 27) that protrude from one side in the circumferential direction on part of the column sections 36 of the clutch retainer 34.

Particularly, the springs 68 of this example comprise a main section 69 that comes in contact with the column section 36 of the clutch retainer 34, and a pair pressure sections 70 whose base ends are continued to both ends of the main section 69. Of these, the pressure sections 70 are curved from the base ends to the tip ends, and when they are in contact with the rolling contact surfaces of the rollers 33, they are independently expand and contract. Also, as shown in FIG. 36(a) and FIG. 36(b), the location in the axial direction of the center of gravity G of the rollers 33 is located between the points of contact α (furthest outside point) where the pressure sections 70 come in contact with the rolling contact surface of the roller 33. Also, as shown in FIG. 36(b), when the pressure sections 70 are pressed by the rollers 33, the length $L_1$ in the axial direction between the points of contact α (furthest outside point) where the pressure sections 70 come in contact with the rolling contact surface of the rollers 33 is half or greater than the length $L_2$ in the axial direction of the rollers 33 ($L_1 \geq (L_2/2)$).

In the roller clutch 61c constructed as described above, when there is a tendency for relative rotation in a specified direction of the pulley element 17 and sleeve 60, or in other words, when there is a tendency for the sleeve 60 to rotate relative to the pulley element 17 in the direction that springs 68 are pressing the rollers 33 respectively (the left direction or counterclockwise direction in FIG. 35), the rollers 33 are wedged into the section in the substantially cylindrical space between the outer peripheral surface of the clutch inner ring 29 and the inner peripheral surface of the clutch outer ring 30 where the width in the radial direction becomes narrow. Also, relative rotation between the sleeve 60 and the pulley element 17 becomes impossible (locked state). On the other hand, when there is a tendency for relative rotation of the pulley element 17 and the sleeve 60 in the direction opposite to the specified direction, or in other words when there is a tendency for relative rotation in the direction opposite to the direction the springs 68 are pressing the rollers 33 (right direction or clockwise direction in FIG. 35), the rollers 33 move back against the elastic force of the springs 68 into the section in the substantially cylindrical space where the width in the radial direction is wide, and the pulley 17 freely rotates relative to the sleeve 60 (overrun state).

With the rotation-transmission apparatus with built-in roller clutch for starting an engine of this example assembled with the roller clutch 61c constructed as described above, in the overrun state, or when the rollers 33 press the springs 68, it is possible to prevent the attitude of the rollers 33 from shifting in a direction such that the center axis tilts (becomes skewed). Therefore, it is possible to prevent uneven wear or abnormal heat due to the skew of the rollers 33, and thus it is possible to improve the durability (long life) of the roller clutch 61c and the rotation-transmission apparatus with built-in roller clutch for starting an engine that is assembled with this roller clutch 61c.

In other words, in this embodiment, the springs 68 that press the rollers 33 come in contact with the rollers at two points separated in the axial direction by the pair of pressure sections 70 of these springs 68 respectively. Therefore, even when the location of the contact between the pressure sections 70 and the rollers 33 changes a little, it is possible to prevent large changes in the force or moment applied to the rollers 33, and thus it is possible to keep the attitude of the rollers 33 in the proper position. In other words, in the case of the 'S' shaped spring 13b shown in FIG. 43, the springs 13b and the rollers 12 come in contact at one point (linear contact) respectively, however it is rare that the springs 13b and the rollers 12 will come in proper linear contact, and when the rollers 12 become even a little skewed, the contact state changes from linear contact to point contact. Therefore, the pressure force of the springs 13b is shift in the direction of the center of gravity of the rollers 12, and it becomes easy for a moment to be applied to the rollers 12, and it becomes easy for the inclination of the rollers 12 to increase. On the other hand, in the case of this example, as described above, the rollers 33 and the springs 68 come in contact with each other at two points separated in the axial direction by the pair of pressure sections 70 of the springs 68, so it is possible to keep the attitude of the rollers 33 at a proper position.

Also, since springs 68 and rollers 33 come in contact with each other at two points by the pair of pressure sections 70 of the springs 68, it is possible for these pressure sections 70 to independently expand and contract. Therefore, in the case that the rollers 33 become skewed, a large reaction force occurs in the pressure section 70 in which the amount of displacement (amount of expansion or contraction) is large. As a result, a moment is applied to the rollers 33 that returns the rollers 33 to the proper position, and thus it is possible to keep the position of the rollers 33 at the proper position. Also, since the location in the axial direction of the center of gravity G of the rollers 33 is located between the points of contact α (furthest outside) between the pressure sections 70 and the rollers 33 respectively, it is possible to prevent the relationship between the center of gravity G of the rollers and the direction of pressure of the pressure sections 70 from becoming improper. As a result, it is possible to prevent a moment from being applied to the rollers 33, and it is possible to prevent the rollers 33 from becoming skewed.

Moreover, when the pressure sections 70 are pressed by the rollers 33, the space $L_1$ in the axial direction between the points of contact α (furthest outside) between the pressure sections 70 and the rollers 33 is half or greater than the length $L_2$ in the axial direction of the rollers 33 ($L_1 \geq L_2/2$), so no matter how the attitude of the roller 33 changes, or no matter how the pressure sections 70 are pressed by the rollers 33, the center of gravity G of the rollers 33 is always located between the points of contact α. Therefore, since the rollers 33 come in contact with the springs 28 at two points, it is possible to maintain sufficient stabilizing action on the attitude of rollers 33, and thus it is possible to keep the attitude of the rollers 33 proper.

Furthermore, since the pressure sections 70 are curved from the base end to the tip end, in either the case where the pressure sections 70 face inward as in this example (the pair of pressure sections 70 are curved in a direction toward each other), or the case where the pressure sections 70a face outward as in the nineteenth example of the invention shown in FIG. 37 (the pair of pressure sections 70a are curved in a direction away from each other), it is possible to maintain sufficient pressure force of the pressure sections 70, 70a.

In other words, when the pressure sections 70 face inward as in this example, even when the pressure sections 70 are deformed by being pressed by the rollers 33, it is difficult for the space $L_1$ in the axial direction between the points of contact α between the pressure sections 70 and rollers 33 to become smaller. Also, when the pressure sections 70 elastically deform, the points of contact α between the pressure sections 70 and rollers 33 move toward the side of base end of the pressure sections 70, so the apparent length of the pressure sections 70 becomes shorter, and the spring constant becomes greater. Therefore, the pressure force of the pressure sections 70 becomes greater and thus the force for restoring the tilt of the rollers 33 is increased.

On the other hand, when the pressure sections 70a face outward as in the nineteenth example of the invention shown in FIG. 37, it is possible to reduce the tensile stress that is applied at the area where the pressure sections 70a connect with the main section 69, and thus it is possible to prevent a loss in pressure force due to plastic deformation at these connecting areas. In other words, when the pressure sections 70a are pressed by the rollers 33 there is a tendency for elastic deformation to occur in not only the connecting areas but in the curved sections of the pressure sections 70a as well. Therefore, as a result of being able to also apply a pressure force to the rollers 33 by the curved section of the pressure sections 70a, it is possible to reduce the accumulation of tensile stress at the connecting areas. Also, when the pressure sections 70a elastically deform, the locations of contact between the pressure sections 70a and the rollers 33 move toward the side of base end of the pressure sections 70a, so the apparent length of the pressure sections 70 becomes shorter, and thus the spring constant becomes larger. Therefore, as in the case when the pressure sections 70 face inward as shown in FIG. 36, the pressure force of the pressure sections 70a becomes larger, and thus the force for restoring the tilt of the rollers 33 is increased.

In the case where the rotation-transmission apparatus with built-in roller clutch for starting an engine of the eighteenth and nineteenth examples constructed as described above and assembled with the roller clutch 61c described above is used as the drive-pulley apparatus 6 of the engine-starting apparatus for the idling-stop vehicle shown in FIG. 55, when the roller clutch 61c is in the overrun state, the rollers 33 are pressed by the column sections 36 of the clutch retainer 34 and the springs 68 to rotate together with the clutch outer ring 30 fastened on the inside of the pulley element 17 (see FIG. 25). However, when the rpm of this clutch outer ring 30 is less than the rpm required for starting the engine 1 (see FIG. 55) (speed after the gear ratio of the belt transmission mechanism is multiplied to 400 rpm to 500 rpm, for example in the case of a gasoline engine), the centrifugal force that acts on the rollers 33 is not enough to compress the springs 68. Also, when starting the engine 1, a force is applied to the rollers 33 from the outer peripheral surface of the clutch inner ring 29 in the same direction as the elastic force of the springs 68. Therefore, when starting the engine 1, the rollers 33 move in the space between the outer peripheral surface of the clutch inner ring 29 and the inner peripheral surface of the clutch outer ring 30 toward the section where the width becomes narrow, and the roller clutch 61 is securely set into the locked state.

On the other hand, when the engine 1 starts and the rpm of the clutch outer ring 30 becomes greater than the rpm for idling of the engine 1 (speed after the gear ratio of the belt transmission mechanism is multiplied to 700 rpm to 800 rpm, for example in the case of a gasoline engine), not only is the connection of the roller clutch 61c broken (the overrun state is set), but the rolling contact surfaces of the rollers 33 of the roller clutch 61c become separated from the outer peripheral surface of the clutch inner ring 29.

In other words, when the engine 1 is rotating, a centrifugal force acts on the rollers 33, and the rollers 33 are pushed against the bottom surface of the concave sections 14. The bottom surface of the concave sections 14 is inclined, so the rollers 33 have a tendency to move in the direction to press the springs 68 (to compress the springs 68). Also, after the engine 1 has started, electric power stops flowing to the starter motor 4 and the clutch inner ring 29 stops, so that the force trying to move the rollers 33 in the counterclockwise direction of FIGS. 34 and 35 is just the elastic force of the springs 68.

In this state, the centrifugal force increases as the rotation force increases, and when the size of this component force becomes larger than the elastic force of the springs 68, the rollers 33 compress the springs 68 and move toward the deep section of the concave sections 32. As a result, as described above, the rolling contact surfaces of the rollers 33 separate from the outer peripheral surface of the clutch inner ring 29. As described above, when the springs 68 are compressed by the rollers 33, it is possible to prevent the rollers 33 from becoming skewed, so it is possible to prevent increase in friction loss, uneven wear and abnormal heat due to this kind of skewing, and thus it is possible to improve the durability (long life) of the rotation-transmission apparatus with built-in roller clutch for starting an engine. Particularly, in the overrun state described above, the force applied to the rollers 33 is the pressure force of the springs 68 and the centrifugal force that resists is pressure force, and furthermore, the friction force from the outer peripheral surface of the clutch inner ring 29 when rotating a low speed, however, in the eighteenth and nineteenth examples, the skew of the rollers 33 is prevented regardless of the uneven friction force received from the outer peripheral surface of the roller clutch inner ring 29 and the unavoidable dimension errors when manufacturing the springs 68, so it is possible to prevent problems due to the skew.

The other construction and function are substantially the same as in the fourteenth examples shown in FIGS. 25 to 27.

Next, FIG. 38 shows a twentieth example of the embodiment of the invention. In this example, the area where the main section 69 and pair of pressure sections 70 of the springs 68 connect is smooth. In this example, when the pressure sections 70 are pressed by the rollers 33 to be elastically deformed, both ends of the area of contact between the main section 69 and column section 36 of the clutch retainer 34 (see FIGS. 34 and 35) move toward the tip end side of the pressure sections 70. Therefore, the location of the points of contact between the pressure sections 70 and the rollers 33 move toward the based end side of the pressure sections 70 and the apparent length of the pressure sections 70 becomes short, and thus it is possible to increase the force for restoring the tilt of the rollers 33. The other construction and function are substantially the same as in the eighteenth example shown in FIGS. 34 to 36.

Next, FIG. 39 shows a twenty-first example of the embodiment of the invention. In this example, the pair of pressure sections 70$b$ of the springs 68 are curved such that the radius of curvature of the curve from the base end section to the tip end section of the pressure sections 70$b$ gradually decreases (the radius of curvature gradually becomes smaller). In other words, the pressure sections 70 are such that the amount of curvature becomes large toward the tip end side. In this example, it is possible to reduce the stress applied to the base end side of the pressure sections 70$b$, and to maintain the necessary pressure force without having to increase the size of the springs 68$b$. In other words, the stress applied to the pressure sections 70$b$ increases near the base end side and becomes larger the smaller the radius of curvature (larger amount of curvature). On the other hand, in this example, by making the radius of curvature at the base end side of the pressure sections 70$b$ large (small amount of curvature), the stress applied at the base end side is small. Also, by making the radius of curvature at the tip end side of the pressure sections 70$b$ small (large amount of curvature), the pressure force of these pressure sections 70$b$ is maintained. The other construction and function are the same as in the eighteenth example shown in FIGS. 34 to 36.

Next, FIG. 40 shows a twenty-second example of the embodiment of the invention. In this example, the main section 69 and pair of pressure sections 70$b$ of the springs 68$c$ are connected by a smooth curve, and the radius of curvature of the curve from the base end to the tip end of the pressure sections 70$b$ gradually decreases (amount of curvature gradually increases). In this example, by regulating the space $L_{33}$ in the axial direction between the locations of contact between the pressure sections 70$b$ and the rollers 33 and the space $L_{36}$ of the area of contact between the main section 69 and the column section 36 of the clutch retainer 34 (see FIGS. 34 and 35), it is possible to easily obtain the desired spring characteristics. The other construction and function are substantially the same as in the twentieth example shown in FIG. 38 and the twenty-first example shown in FIG. 39.

In the eighteenth to twenty-second examples shown in FIGS. 34 to 40 and described above, the case in which the rotation-transmission apparatus with built-in roller clutch was assembled and used in the engine-starting apparatus for an idling-stop vehicle was explained. However, the use of the rotation-transmission apparatus with built-in roller clutch of the eighteenth to twenty-second examples is not limited to the engine-starting apparatus. Using the rotation-transmission apparatus with built-in roller clutch of the eighteenth to twenty-second examples is effective in applications where the rpm of the rotating member during the overrun state is greater than the rpm of the rotating member in the locked state, and where the operating time in the overrun time is a long time. As an example of this kind of use is the auxiliary-drive apparatus such as a compressor assembled in an idling-stop vehicle. Also, the operating time in the overrun state is not long, however, use as the drive-pulley apparatus, and the one-way clutch of this drive-pulley apparatus, assembled in the drive apparatuses of auxiliary devices such as an alternator or water pump is possible.

Each of the roller clutches described in the eighteenth to twenty-second example above have two concentric members and were used in the case where one of the member rotates in either direction and where rotation is transmitted to the other member only in one direction. Also, the pulley apparatus with built-in roller clutch of the eighteenth to twenty-second examples assembled with the roller clutch described above, can also be used for transmitting the rotation of the engine crankshaft in an auxiliary devices such as an alternator for various kind of engines. The construction of the roller clutch and pulley apparatus with built-in roller clutch of the eighteenth to twenty-second example is summarized as follows.

First, the roller clutch of the eighteenth to twenty-second examples comprises: a outer ring-like member, inner ring-like member, cam surface, cylindrical surface, a plurality of rollers, retainer and springs.

Of these, the inner ring-like member is located on the inside of the outer ring-like member such that it is concentric with the outer ring-like member.

The cam surface is uneven around in the circumferential direction and is formed on either the inner peripheral surface of the outer ring-like member or the outer peripheral surface of the inner ring-like member.

The cylindrical surface is formed on the other surface; the inner peripheral surface of the outer ring-like member or outer peripheral surface of the inner ring-like member.

The rollers are located in the cylindrical space between the cylindrical surface and the cam surface.

The retainer is supported inside the cylindrical space such that it cannot rotate with respect to the member on which the cam surface is formed, and it holds the plurality of rollers.

The springs are made of metal, are located between the retainer and the rollers, and press the rollers in the same circumferential direction.

Particularly, in the roller clutch of the eighteenth to twenty-second examples above, the springs comprise a main section that comes in contact with part of the retainer, and a pair of pressure sections whose base ends are connected to both ends of the main section. Of these, the pressure sections are curved from the base end to the tip end, and when they come in contact with the rolling contact surfaces of the rollers, they expand and compress independently. Also, the location in the axial direction of the center of gravity of the rollers is located between the points of contact between the pressure sections and the rolling contact surface of the roller. Also, together with this, when the pressure sections are pressed by the rollers, the space in the axial direction between the points of contact between the pressure sections and the rolling contact surface of the roller is half or greater than the length in axial direction of the rollers.

Also, the pulley apparatus with built-in roller clutch of the eighteenth to twenty-second examples above comprises a sleeve, pulley, radial rolling bearings, and roller clutch.

Of these, the sleeve is fitted and fastened onto the rotating shaft.

Also, the pulley has a cylindrical shaped inner peripheral surface, and it is located around the sleeve such that it is concentric with the sleeve.

The radial rolling bearings are located between the outer peripheral surface of the sleeve and the inner peripheral surface of the pulley, and they support radial loads that are applied to the pulley, and allow the sleeve to rotate freely with respect to the pulley.

Furthermore, the roller clutch is for the sixth roller clutch mentioned above, and it is located between the outer peripheral surface of the sleeve and the inner peripheral surface of the pulley in the section separated in the axial directed from the radial rolling bearings.

With the roller clutch and pulley apparatus with built-in roller clutch of the eighteenth to twenty-second examples constructed as described above, in the overrun state, or in other words, when the springs are pressed by the rollers, it is possible to prevent the attitude of the rollers from shifting (skewing) in the direction that the center axis is tilted from the proper position. Therefore, it is possible to prevent uneven wear and abnormal heat due to the skewing of the rollers, and thus it is possible to improve the durability (long life) of the roller clutch and pulley-apparatus with built-in roller clutch. Therefore, it is possible to improve the performance of various mechanical apparatuses, such as improving the reliability and durability of the engine-starting apparatus for an idling-stop vehicle.

Figure 44:
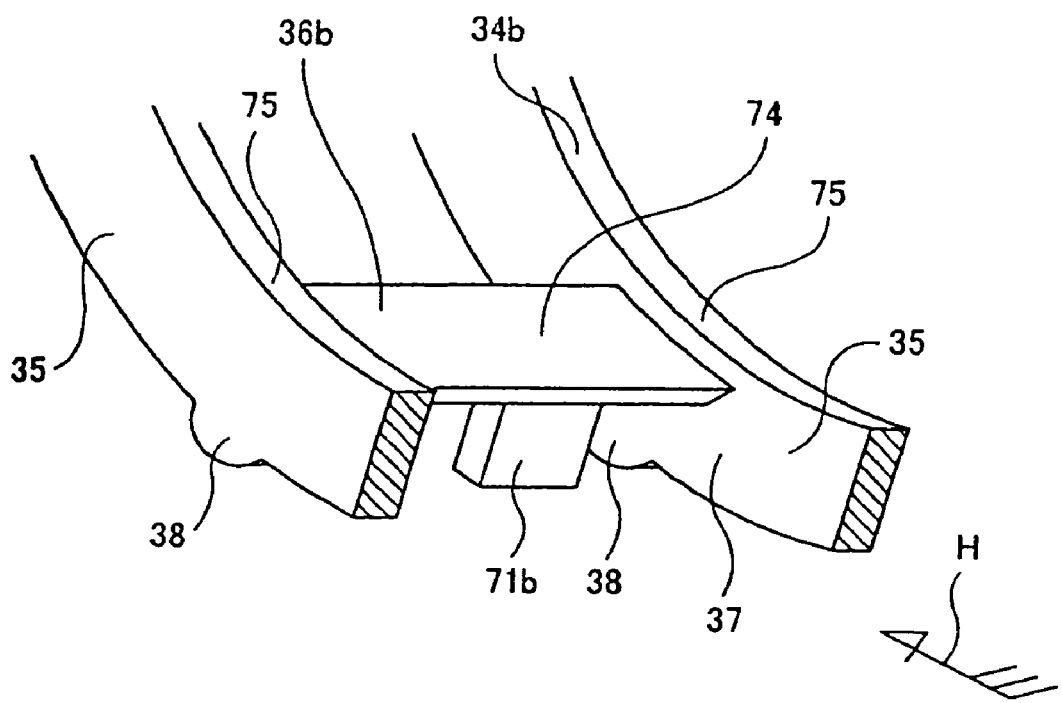
FIG. 44 is a partly cut-away, perspective view of the retainer to be installed in the roller clutch in a twenty-third example of embodiment of the present invention.
Figure 45:
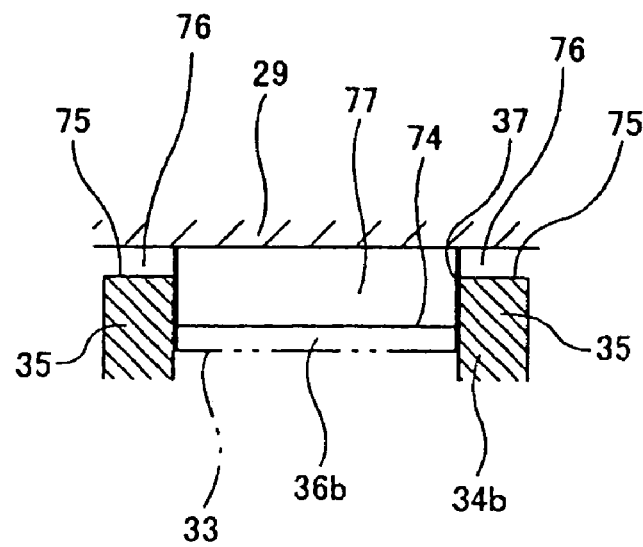
FIG. 45 is a view in the direction of Arrow H in FIG. 44.
Figure 46:
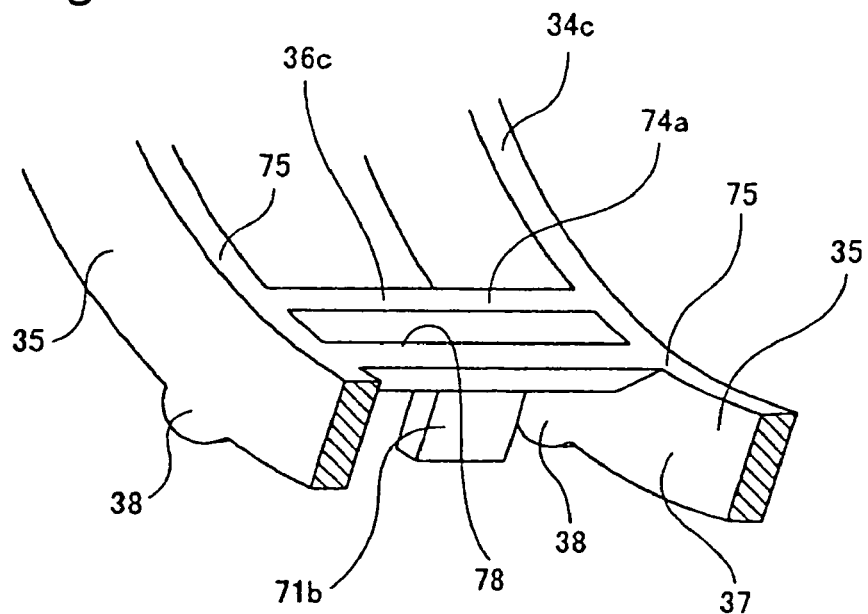
FIG. 46 is a cross sectional view, similar to FIG. 44, to show a twenty-third example of embodiment of the present invention.
Figure 47:
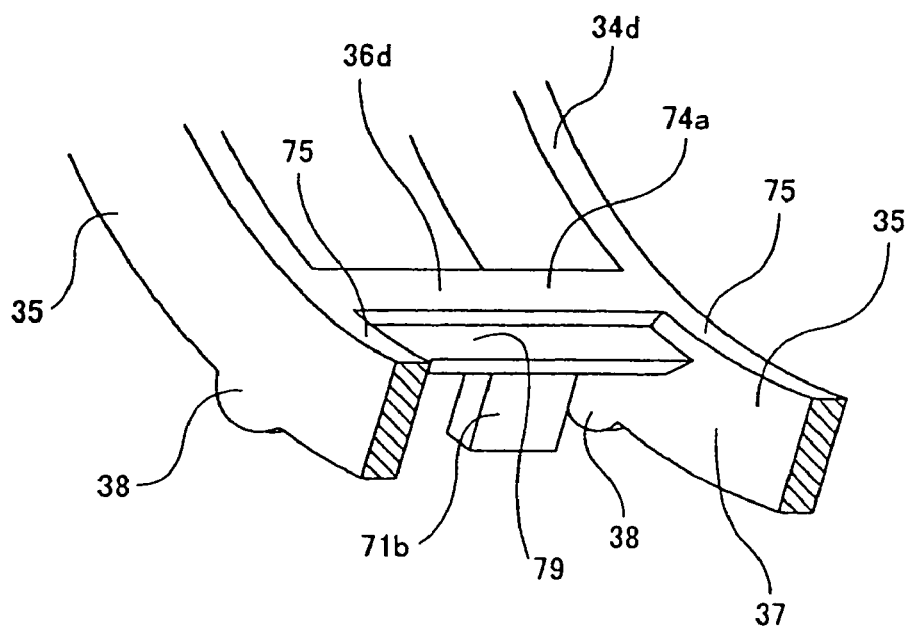
FIG. 47 is a cross sectional view, similar to FIG. 44, to show a twenty-fourth example of embodiment of the present invention.
Figure 48:
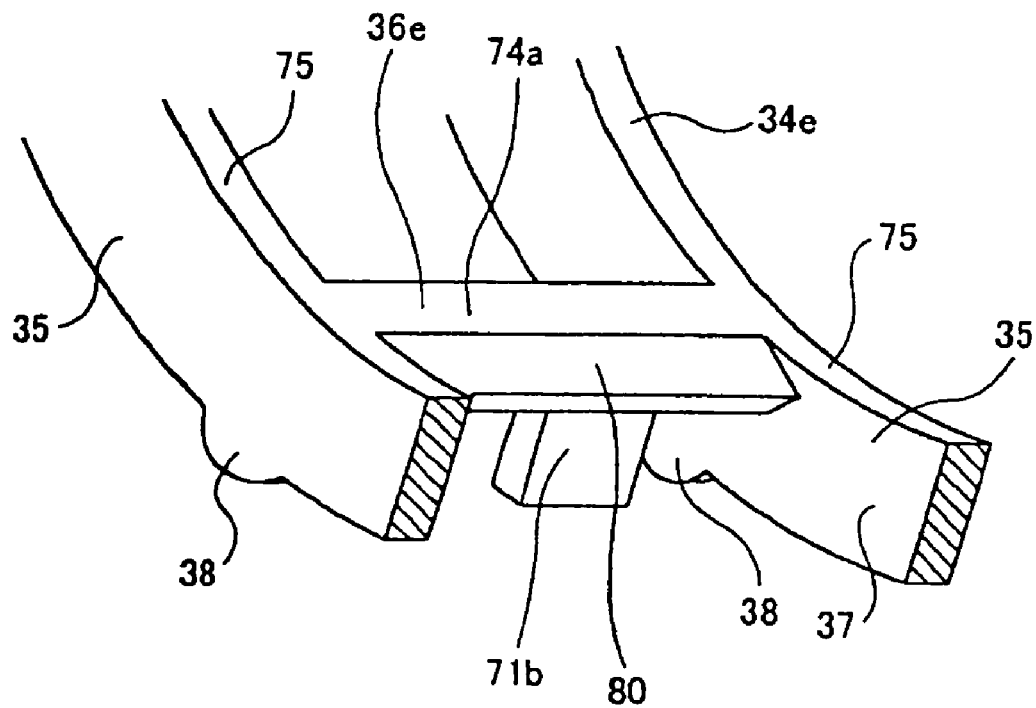
FIG. 48 is a cross sectional view, similar to FIG. 44, to show a twenty-fifth example of embodiment of the present invention.

Next, FIGS. 44 and 45 show a twenty-third example of the embodiment of the invention, FIG. 46 shows a twenty-fourth example, FIG. 47 shows a twenty-fifth example and FIG. 48 shows a twenty-sixth example. The examples as well were invented in order to sufficiently maintain the durability of a rotation-transmission apparatus with built-in roller clutch for starting an engine, and specifically with the object of solving the following problems.

In other words, in recent years, idling-stop vehicles as described above are actually being used. In order to give the engine-starting apparatus for this kind of idling-stop vehicle certain function, using an apparatus with a built-in one-way clutch in which the roller clutch 8 shown in FIG. 56 and described above is assembled as the drive-pulley apparatus (see FIG. 55) that is located on the end of the rotation-drive shaft of the starter motor 4 is considered. However, as described above, in the case of the roller clutch 8 shown in FIG. 56, rubbing at the points of contact between the rolling contact surfaces of the rollers 12 and the inner peripheral surface of the outer ring 10 is unavoidable even when rotation force is not being transmitted between the inner ring 9 and outer ring 10. Therefore, when the overrun state continues for a long time, the amount of friction heat that is generated at these points of contact cannot be ignored and it causes the temperature inside the roller clutch 8 to rise, and thus it becomes easy for the grease filled inside the roller clutch 8 to become degraded. Furthermore, the temperature in the support bearings next to the roller clutch 8 rises, and this makes it easy for the rubber or synthetic resin seal plates assembled in these support bearings to degrade. In the case of a pulley apparatus with a built-in one-way clutch for an alternator, operation is basically in the locked position, as will be described below, and since operation in the overrun state is for a short time, the friction heat and rise in temperature described above does not easily become a problem.

Figure 56:
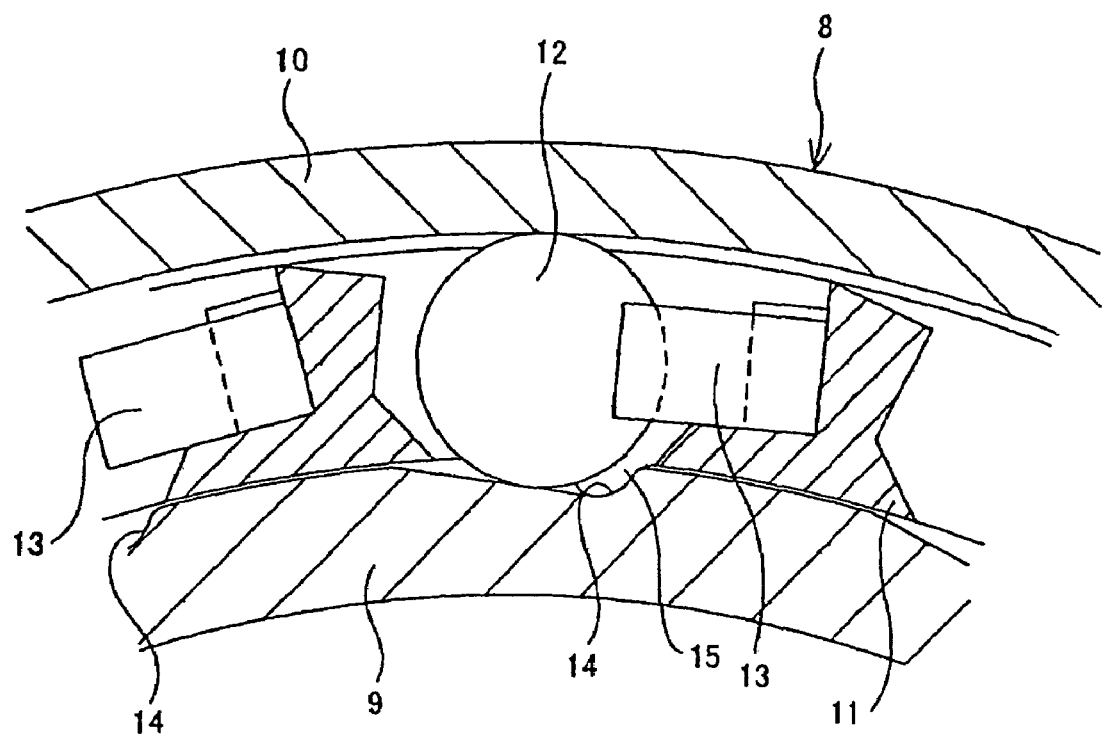
FIG. 56 is a partial cross sectional view to show a first example of the typical roller clutch in a conventional structure.

However, in the case of the one-way clutch that is assembled in the drive-pulley apparatus 6 for the idling-stop vehicle shown in FIG. 55 and described above, the locked state occurs only for a short time when starting the engine, and after the engine starts, operation is in the overrun state as long as the engine is operating. Therefore, it is difficult to maintain sufficient durability even when the roller clutch 8 as shown in FIG. 56 is assembled in the engine-starting apparatus for an idling-stop vehicle.

Figure 49:
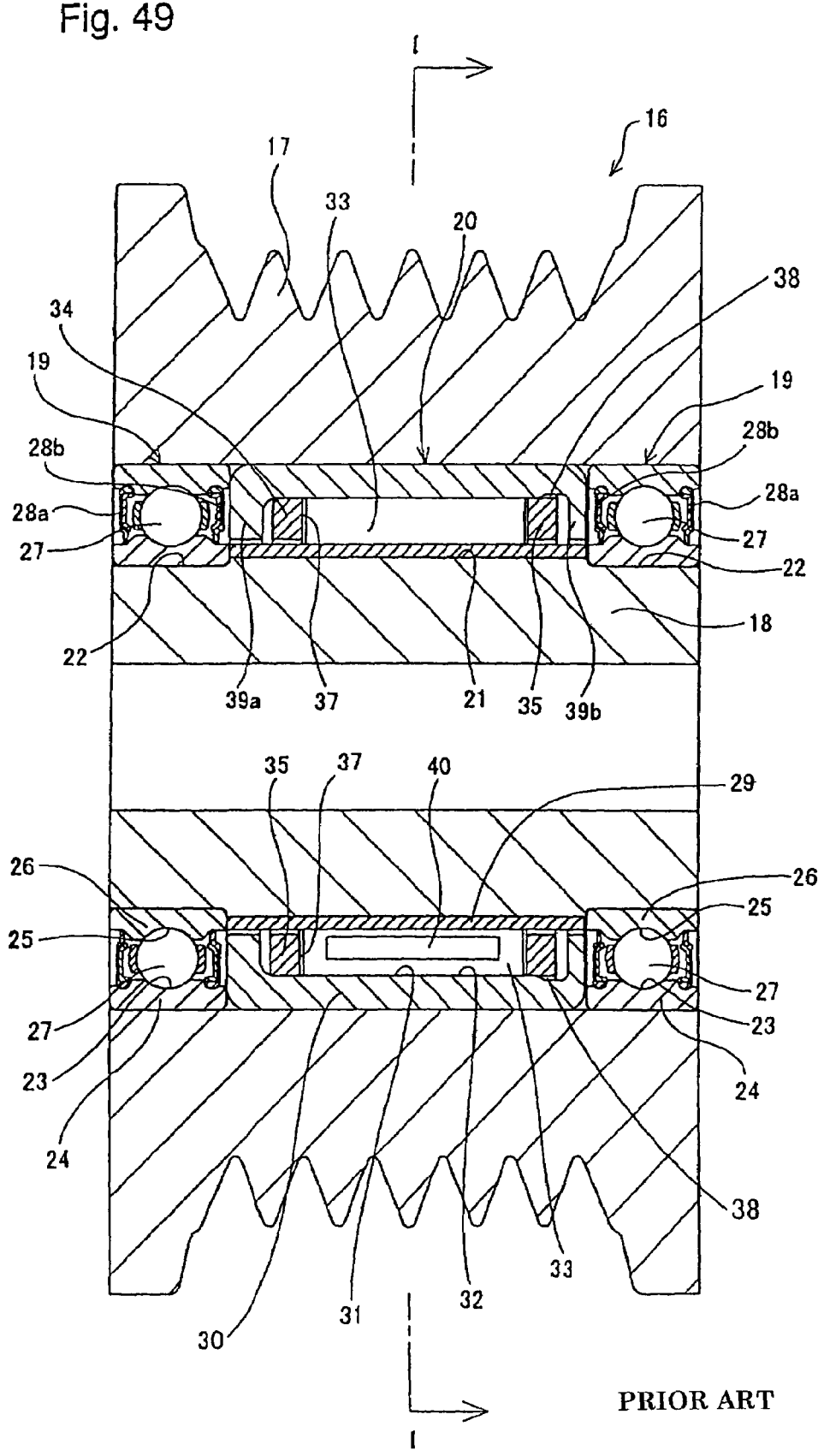
FIG. 49 is a cross sectional view to show the whole construction of the pulley apparatus with built-in roller clutch according to a prior invention.
Figure 50:
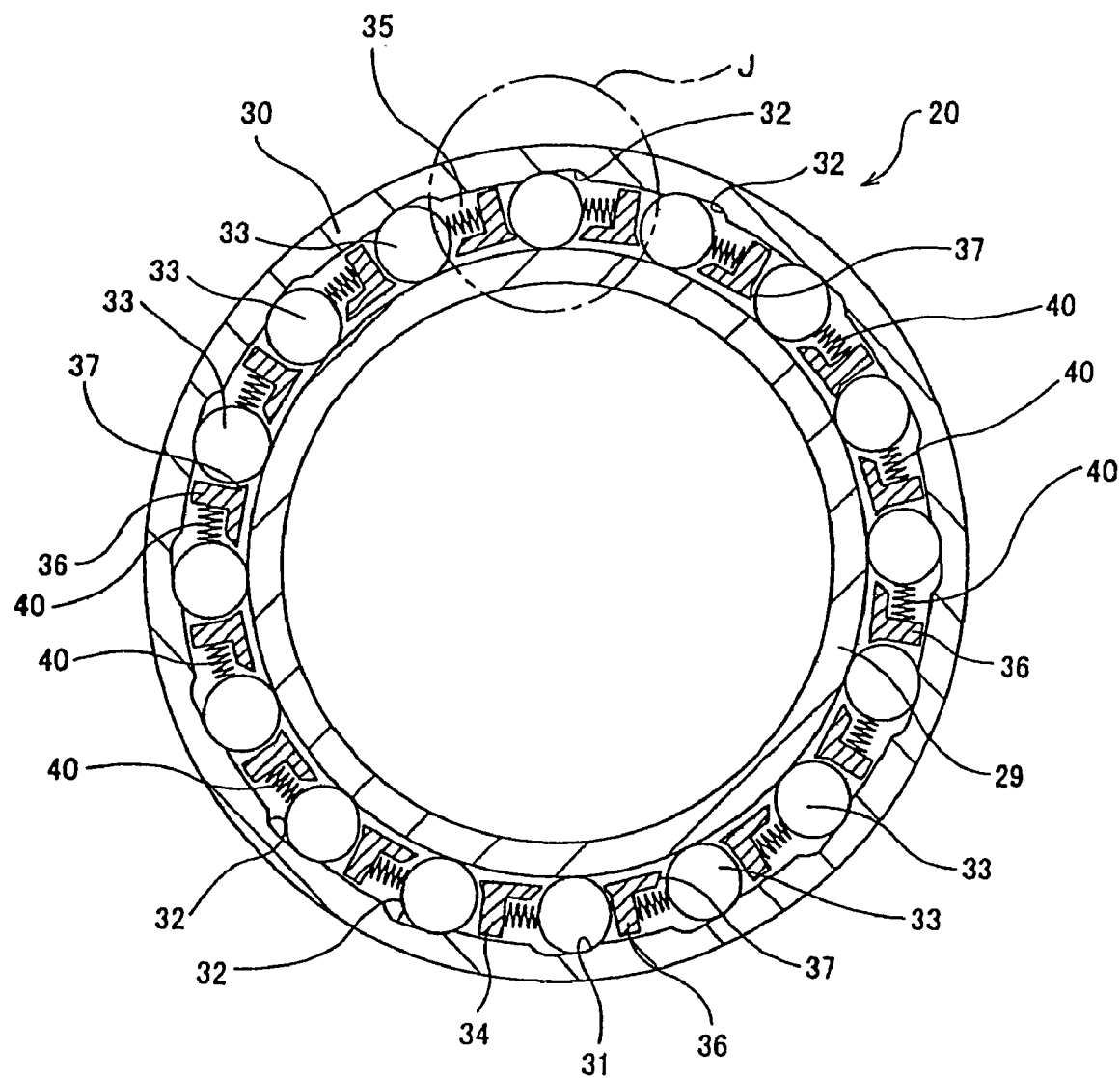
FIG. 50 is a cross sectional view taken along the line I-I of FIG. 49 to show the roller clutch.
Figure 51:
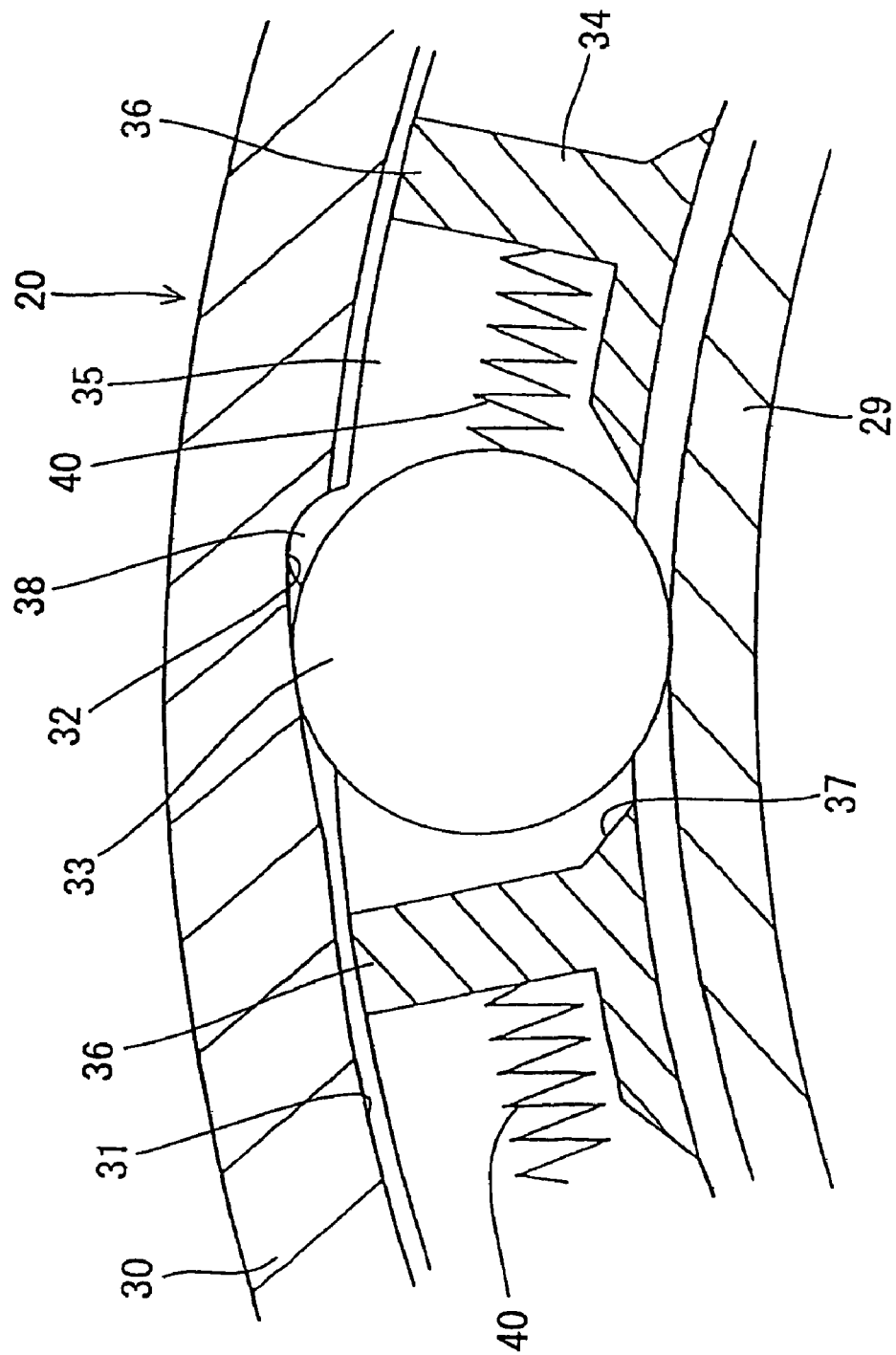
FIG. 51 is an enlarged view of Portion J in FIG. 50.

Taking this problem into consideration, the inventors invented a pulley apparatus with built-in roller clutch as shown in FIGS. 49 to 51 (Japanese Patent Application No. 2002-33835). The pulley apparatus 16 with built-in roller clutch of this prior invention comprises a pulley element 17 around whose outer peripheral surface an endless belt 7 (see FIG. 55) runs, and a sleeve 18 fitted and fastened onto the tip end of the rotation-drive shaft 5 (see FIG. 55), which are arranged such that they are concentric with each other. Also, a pair of deep-groove ball bearings 19 as support bearings and a roller clutch 20 are located between the outer peripheral surface of the sleeve 18 and the inner peripheral surface of the pulley element 17. In order to install the ball bearings 19 and the roller clutch 20, the inner peripheral surface of the pulley element 17 is a simple cylindrical surface, and the outer peripheral surface of the sleeve 18 is a stepped cylindrical surface having a large-diameter section 21 in the middle section in the axial direction and small-diameter sections 22 on both ends that are connected at the step sections.

The roller clutch 20 is located in the circular space that exists between the outer peripheral surface of the sleeve 18 and the inner peripheral surface of the pulley element 17, and similarly, the ball bearings 19 are located in this circular space near both ends in the axial direction such that they are on both side in the axial direction of the roller clutch 20. Of these, the ball bearings 19 are placed such that they are concentric with pulley element 17 and sleeve 18, and they serve the role of allowing both of these members 17, 18 to freely rotate relative to each other. In the example shown in the figures, by placing the ball bearings 19 on both sides of the roller clutch 20, the span for application of the radial loading is lengthened, so that it is possible to increase the rigidity as well as maintain durability. Also, by applying contact angles that face away from each other (preferably a back-to-back combination type), they freely support axial loads that are applied to the pulley element 17 in both directions.

The ball bearings 19 comprise: an outer race 24 having an outer race track 23 of the deep-groove type formed around the inner peripheral surface thereof; an inner race 26 having an inner race track 25 of the deep-groove type formed around the outer peripheral surface thereof, and a plurality of balls 27 that are located between the outer race track 23 and inner race track 25 such that they can roll freely. The outer races 24 are tightly fitted and fastened around the inner peripheral surface near both ends of the pulley element 17, and the inner race 26 are tightly fitted and fastened around the outer peripheral surface of the small-diameter sections 22 on both ends of the sleeve 18 through interference fit, respectively. Moreover, in this state, one surface in the axial direction of the respective inner races 26 comes in contact with the surface of the step sections where the large-diameter section 21 connects with the small-diameter sections 22.

Also, by placing seal rings 28a, 28b between the inner peripheral surface on both ends of the outer races 24 and the outer peripheral surface on both ends of the inner races 26, the openings on both ends to the spaces where the balls 27 are located are covered. Moreover, lubricant such as grease is filled inside this space, to lubricate the points of contact between the outer race track 23 and the inner race track 25 and the rolling contact surfaces of the balls 27.

Furthermore, only when there is a tendency for the pulley element 17 to rotate relative to the sleeve 18 in a specified direction, the roller clutch 20 transmits rotation force between the pulley element 17 and the sleeve 18. In order to construct this roller clutch 20, the clutch inner ring 29 is tightly fitted and fastened around the large-diameter section 21 of the sleeve 18 through interference fit. This clutch inner ring 29 is formed generally into a cylindrical shape by plastic working such as pressing of steel plate such as carburized steel, such that the inner peripheral surface and outer peripheral surface are both simple cylindrical surfaces.

On the other hand, the inner peripheral surface of the clutch outer ring 30 that is tightly fitted and fastened around the inner peripheral surface of the middle section of the pulley element 17 is a cam surface 31. In other words, as shown in FIGS. 50 and 51, a plurality of concave sections 32, called ramp sections are formed, around the inner peripheral surface of the clutch outer ring 30 such that they are evenly spaced around in the circumferential direction whereby the cam surface 31 is formed. This clutch outer ring 30 is also formed generally into a cylindrical shape by plastic working such as pressing of steel plate such as carburized steel.

Also, the plurality of rollers 33 that together with the clutch inner ring 29 and clutch outer ring 30 make up the roller clutch 20, are held such that they can freely roll and move a little in the circumferential direction by a clutch retainer 34 that is fastened to the clutch outer ring 30 such that it cannot rotate with respect to the clutch outer ring 30. This clutch outer ring 34 is formed into a generally cage-type cylindrical shape from a synthetic resin (for example, a synthetic resin or plastic like polyamide 66, polyamide 46 or polyphenylene sulfide that is mixed with about 20% glass fiber), and comprises a pair of circular ring shaped rim sections 35, and a plurality of a column sections 36 that connect these rim sections 35 together.

Also, the sections surrounded on four sides by the inside surfaces of the rim sections 35, 35 and the side surfaces in the circumferential direction of the columns sections 36, form pockets 37 for holding the rollers 33 such that they can rotate freely as well as move freely a little in the circumferential direction. Moreover, as shown in FIG. 51, convex section 38 are formed at a plurality of locations around the outer peripheral surface of the rim sections 35 such that they fit with the concave section 32 formed on the inner peripheral surface of the clutch outer ring 30, such that the clutch retainer 34 is mounted to the clutch outer ring 30 such that it cannot rotate relative to the clutch outer ring 30. Also, by holding the clutch retainer 34 on both sides in the axial direction by collar sections 39a, 39b that are formed on both end sections in the axial direction of the clutch outer ring 30, this clutch retainer 34 is not able to move in the axial direction with respect to the clutch outer ring 30.

Furthermore, springs 40 are mounted as shown in FIGS. 50 and 51 on one of the side surfaces in the circumferential direction of the column sections 36 of the clutch retainer 34. These springs 40 that are located on each column section 36 elastically press the rollers 33 that held in the pockets 37 in the same direction (counterclockwise direction in FIGS. 50 and 51) in the circumferential direction of the clutch retainer 34 in cylindrical space formed between the inner peripheral surface of the cam surface 31 and the outer peripheral surface (cylindrical surface) of the clutch inner ring 29 toward the section where the width in the radial direction becomes narrow.

Figure 52:
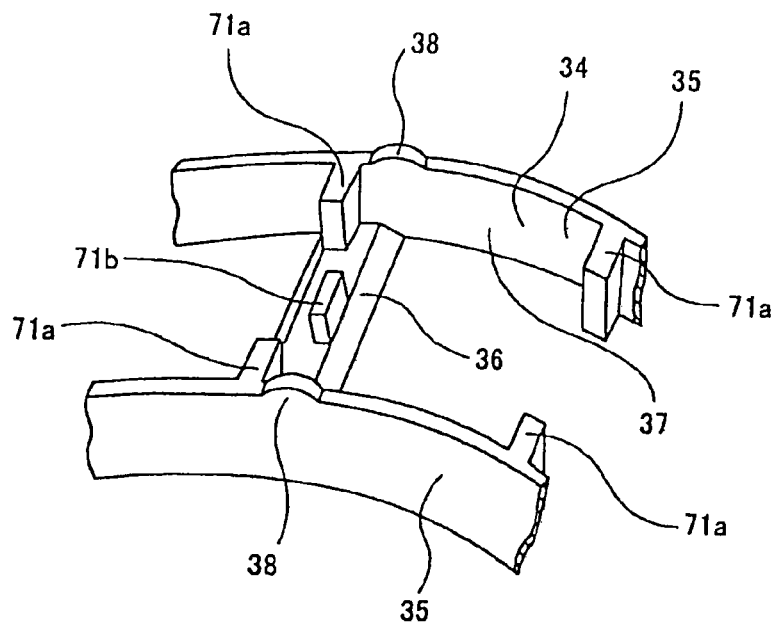
FIG. 52 is a perspective view to show part of the clutch retainer in a conventional structure taken from the outer diameter side.
Figure 53:
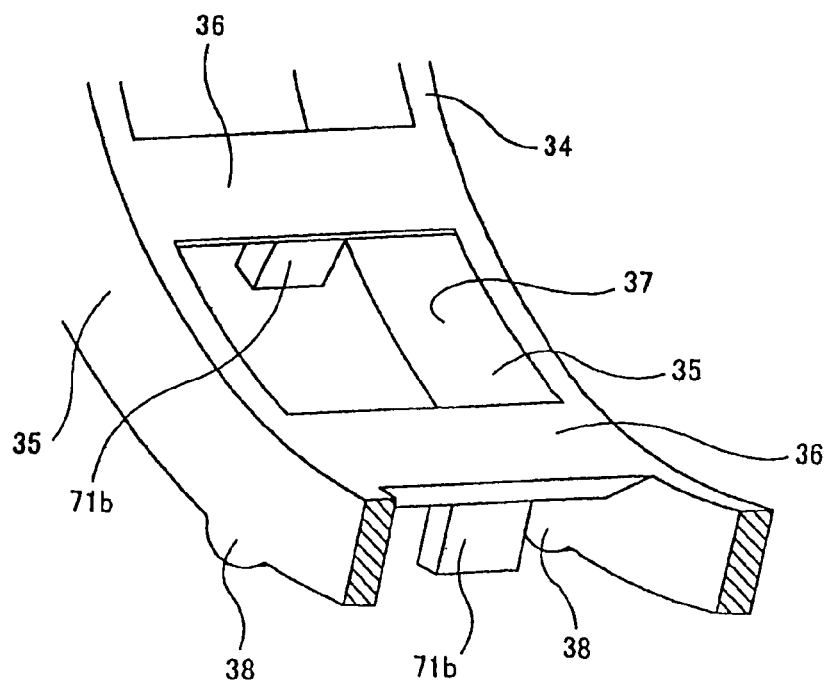
FIG. 53 is a perspective view to show part of the clutch retainer in a conventional structure taken from the inner diameter side.
Figure 54:
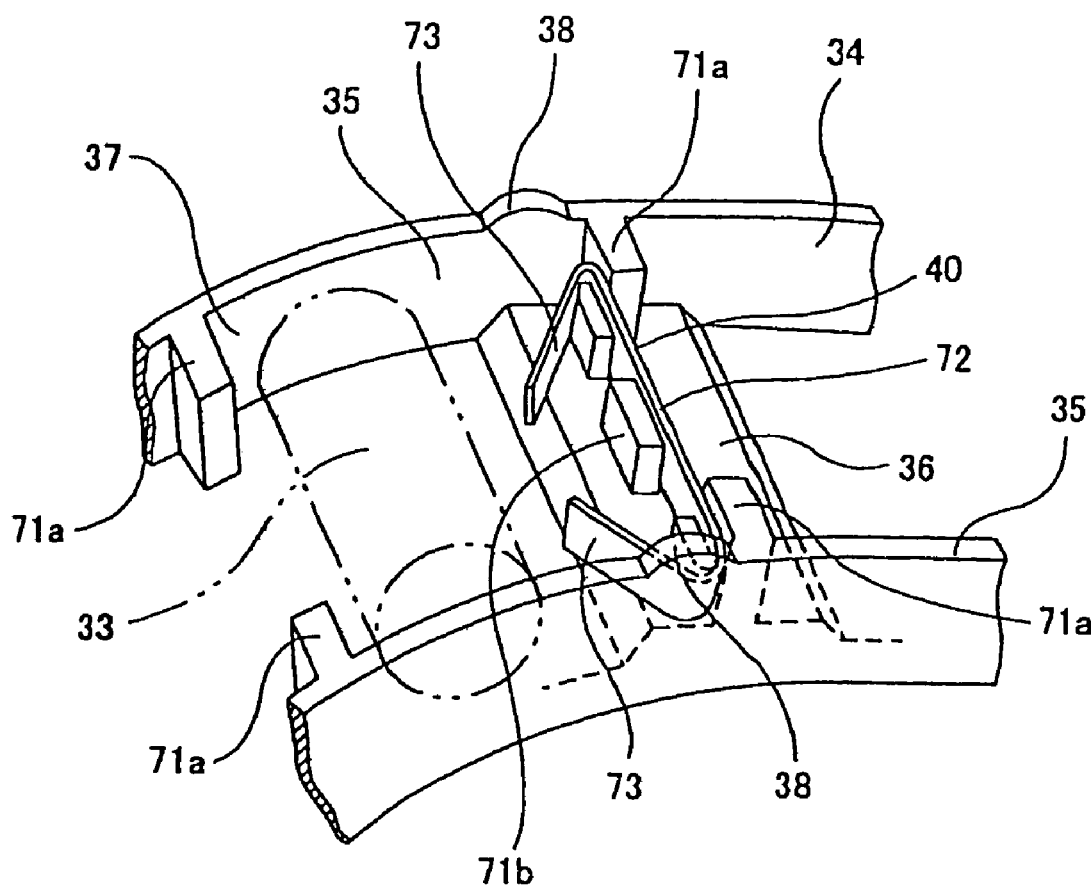
FIG. 54 a view similar to FIG. 52 to show a clutch retainer with springs installed in it.

In FIGS. 50 and 51, the springs 40 are drawn as compression coil springs, however, actually plate springs that are made by bending spring steel into a triangular-shaped hook are often used for these springs 40. In other words, as shown in FIGS. 52 to 54, the base section 72 of the spring 40 is supported by protruding supports 71a, 71b that are formed on the outer peripheral surface of the column sections 36, 36 of the clutch retainer 34, and the pair of elastic members 73, 73 formed in each spring 40 press the rollers 33 in the same circumferential direction. Furthermore, it is also possible to use synthetic resin springs that are made in one piece with the clutch retainer 34. This kind of roller clutch 20 is lubricated by grease that is filled inside it.

In the roller clutch 20 constructed as described above, when there is a tendency for relative rotation of the pulley element 17 and sleeve 18 in a specified direction, or in other words, when there is a tendency for the sleeve 18 to rotate relative to the pulley element 17 in the direction that the springs 40 press the rollers 33 (counterclockwise direction in FIGS. 50 and 51), the rollers 33 are wedged into the section of the cylindrical space where the width in the radial direction is narrow. In this state the relative rotation of the sleeve 18 and pulley element 17 is not possible (locked state). On the other hand, when there is a tendency for relative rotation of the pulley element 17 and sleeve 18 in the direction opposite to the specified direction, or in other words, in the direction opposite to the direction that the springs 40 press the rollers 33 (clockwise direction in FIGS. 50 and 51), the rollers 33 move against the elastic force of the springs back into the section in the cylindrical space where the width in the radial direction is wide, and the pulley element 17 rotates freely relative to the sleeve 18 (overrun state).

The function when the pulley-apparatus 16 with built-in roller clutch of this invention constructed as described above is used as the drive-pulley apparatus 6 for the engine-starting apparatus for the idling-stop vehicle shown in FIG. 55, is as described below. First, when starting the engine, electric power flows to the starter motor 4, which rotates the sleeve 18 that is fastened to the end of the rotation-drive shaft 5 and the clutch inner ring 29 that is fastened to this sleeve 18 in the counterclockwise direction of FIGS. 50 and 51. Therefore, the rollers 33 move in the counterclockwise direction of FIGS. 50 and 51 in the substantially cylindrical space between the outer peripheral surface of the clutch inner ring 29 and the inner peripheral surface of the clutch outer ring 30 toward the section where the width in the radial direction becomes narrow. As a result, the rollers 33 become wedged between the outer peripheral surface of the clutch inner ring 29 and the inner peripheral surface of the clutch outer ring 30, and the clutch roller 20 is in the locked state and transmits power from the clutch inner ring 29 to the clutch outer ring 30. In this state, the crankshaft 2 of the engine 1 (see FIG. 55) is rotated and driven by way of the pulley element 17, endless belt 7 and follower pulley 3, and the engine 1 starts.

After the engine 1 has started, electric power stops flowing to the starter motor 4 and the rotation-drive shaft 5 stops. In this state, the pulley element 17 is rotated and driven by the crankshaft 2 of the engine 1 by way of the follower pulley 3 and endless belt 7, and the clutch outer ring 30 continues to rotate in the counterclockwise direction of FIGS. 50 and 51. As a result, the roller clutch 20 is in the overrun state and does not transmit the rotation of the pulley element 17 to the sleeve 18. Therefore, when the engine 1 is operating, the starter motor 4 does not become a load against the rotation of the engine 1.

When the roller clutch 20 is in the overrun state like this, the rollers 33 are pressed by the column sections 36 of the clutch retainer 34 and the springs 40, to rotate together with the clutch outer ring 30 that is fitted and fastened inside the pulley element 17. However, when the rpm of this clutch outer ring 30 is less than the rpm required to start the engine 1 (for example, in the case of a gasoline engine, speed after multiplying the transmission ratio of the belt transmission to 400 rpm to 500 rpm), the centrifugal force acting on the rollers 33 is not a value that will compress the springs 40. Also, when starting the engine 1, a force in the same direction as the elastic force of the springs 40 is applied to the rollers 33 from the outer peripheral surface of the clutch inner ring 29. Therefore, when starting the engine, the rollers 33 definitely move in the space between the outer peripheral surface of the clutch inner ring 29 and the inner peripheral surface of the clutch outer ring 30 toward the section where the width becomes narrow, and the roller clutch 20 becomes securely locked.

On the other hand, when the engine 1 starts and the rpm of the clutch outer ring 30 is greater than the rpm corresponding to idling of the engine 1 (for example, in the case of a gasoline engine, speed after multiplying the transmission ratio of the belt transmission to 700 rpm to 800 rpm), the rollers 33 press the springs 40 and move to the deep side of the concave sections 32 due to the centrifugal force. As a result, not only is the connection of the roller clutch 20 broken (the overrun state is set), but the rolling contact surfaces of the rollers 33 of the roller clutch 20 separate from the outer peripheral surface of the clutch inner ring 29.

In other words, when the engine is operating, centrifugal force acts on the rollers 33 and these rollers 33 are pressed against the bottom surface of the concave sections 32. Since the bottom surfaces of the concave sections 32 are inclined, the rollers 33 tend to move in the direction that will press the springs 40 (compress the springs 40). Also, after the engine 1 starts and electric power stops flowing to the starter motor 4, the clutch inner ring 29 stops, so the force moving the rollers 33 in the counterclockwise direction of the FIGS. 50 and 51 is just the elastic force of the springs 40.

In this state, the centrifugal force increases due to the rise in rotation force, and when the size of this component force becomes greater than the elastic force of the springs 40, the rollers 33 compress the springs 40 and moves toward the deep section of the concave sections 32. As a result, as described above, the rolling contact surfaces of the rollers 33 separate from the outer peripheral surface of the clutch inner ring 29. In this state, regardless of the high rpm of the engine 1, it is possible to keep the friction heat that is generated inside the roller clutch 20 to a minimum, and as described above, it is possible to improve the durability of the roller clutch 20 and the adjacent ball bearings 19. Of course, it is also possible to prevent damage, such as uneven wear and seizure, to the roller clutch 20 itself.

However, when using the pulley apparatus with built-in roller clutch of the prior invention described above, after the engine starts, before the rollers 33 press the springs 40 and move into the deep side of the concave sections 32 due to the centrifugal force, there is rubbing between the rolling contact surfaces of the rollers 33 and the outer peripheral surface of the clutch inner ring 29. Therefore, in this state, providing a sufficient amount of grease at the points of sliding contact between the rolling contact surfaces of the rollers 33 and the outer peripheral surface of the clutch inner ring 29 makes it possible to prevent friction at these surfaces, and is very essential from the aspect of maintaining the durability of the pulley apparatus with built-in roller clutch.

On the other hand, in the case of the clutch retainer 34 of the prior invention, since the inner peripheral edge of the rim sections 35 and the inner peripheral surface of the column sections 36 exist on one cylindrical surface, it is difficult to supply a sufficient amount of grease at the points of sliding contact. In other words, in the case of the clutch retainer 34, the column sections scrape away the grease at the areas of contact on the outer peripheral surface of the clutch inner ring 29 and the rolling contact surfaces of the rollers 33, so there is hardly any function of maintaining grease for supplying to this area. Therefore, prevention of wear at these surfaces becomes insufficient, and there is a possibility that durability of the pulley apparatus with built-in roller clutch will not be sufficient.

The twenty-third to twenty-sixth example of the embodiments of the invention shown in FIGS. 44 to 48 were invented with this problem taken into consideration.

First, FIGS. 44 and 45 show a twenty-third example of the invention. The feature of this example is that by changing the construction of the clutch retainer 34b a sufficient amount of grease is supplied to the points of contact (see FIGS. 49 to 51) between the outer peripheral surface of the clutch inner ring 29 and the rolling contact surfaces of the rollers 33. The construction and function of the other parts, for example the overall construction of the pulley apparatus with built-in roller clutch is substantially the same as in the previous invention shown in FIGS. 49 to 51 and described above, so any drawings and explanations of identical parts are omitted and this explanation centers on the features of this embodiment.

In the case of this example, the entire inner peripheral surface 74 of the column sections 36b of the clutch retainer 34b is more recessed in the outward radial direction than the inner peripheral edge 75 of the rim sections 35. Also, the inner diameter of the rim sections 35 is slightly greater than the outer diameter of the clutch inner ring 29. Therefore, when the clutch retainer 34b is assembled into the pulley apparatus with built-in roller clutch, the inner peripheral edges 75 come close to and face both ends of the outer peripheral surface of the clutch inner ring 29. In other words, a labyrinth space 76 exists between the inner peripheral edges 75 and both ends of the outer peripheral surface of the clutch inner ring 29 that is too small for grease to flow freely through. On the other hand, there is a plenty large space 77 between the inner peripheral surface 74 of the column sections 36b and the middle section of the outer peripheral surface of the clutch inner ring 29.

When the rotation-transmission apparatus with built-in roller clutch for starting an engine in which the clutch retainer 34b described above is assembled is operating, grease enters the space 77. That is, the grease that is filled inside the roller clutch 20 (see FIGS. 49 to 51) and adheres to the rolling contact surfaces of the rollers 33, or the grease that is pushed in the circumferential direction of the roller clutch 20 by the rollers 33, enters the space 77. This space 77 has sufficient volume and is partitioned on the outside in the radial direction by the inner peripheral surfaces 74 of the column sections 36b, and on both sides in the axial direction by the rim sections 35. Therefore, it is difficult for the grease that enters into this space 77 to flow out in the radial direction even when a centrifugal force is applied when the clutch retainer 34b rotates together with the pulley element 17 and clutch outer ring 30. Also, due to the existence of the labyrinth space 76, 76 it is difficult for the grease to leak to the outside in the axial direction.

Therefore, the grease that is taken into the space 77 is efficiently supplied to the points of contact between the outer peripheral surface of the clutch inner ring 29 and the rolling contact surfaces of the rollers 33, and prevents wear of these surfaces. As a result, even when there is rubbing between both of these surfaces, wear of these surfaces is suppressed, and it is possible to improve the durability of the rotation-transmission apparatus with built-in roller clutch for starting an engine.

Next, FIG. 46 shows a twenty-fourth example of the embodiment of the invention. In this example, the inner peripheral surface 74a of the column sections 36c and the inner peripheral edge 75 of the rim sections 35 are located on a single cylindrical surface. However, in this example, a concave holes 78 are formed in the center sections in the circumferential direction of the inner peripheral surface 74a of the column sections 36c, and these concave holes 78 are formed to function as grease pockets. Also, the concave holes 78 have a crescent cross-sectional shape such that the depth becomes shallower toward both ends in the circumferential direction, so the grease that is taken into the concave hole 78 is efficiently supplied to the outer peripheral surface of the clutch inner ring 29 when there is relative rotation between the clutch retainer 34c and the clutch inner ring 29.

The other construction and function is the same as in the twenty-third example shown in FIGS. 44 and 45 described above.

Next, FIG. 47 shows a twenty-fifth example of the embodiment of the invention. In this example, the inner peripheral surface 74a of the column sections 36d and the inner peripheral edges 75 of the rim sections 35 are location on one cylindrical surface. However, in this example, half in the circumferential direction of the inner peripheral surface 74a of the column sections 36d is a stepped concave section 79 that is recessed outward in the radial direction, and this stepped concave section 79 functions as a grease pocket. Also, these stepped concave sections 79 directly face the rollers 33 that are held in the pockets 37 (see FIGS. 49 to 51), such that the grease taken into these stepped concave sections 79 is efficiently supplied to the outer peripheral surface of the clutch inner ring 29 when there is relative rotation of the clutch retainer 34d and the clutch inner ring 29 (see FIGS. 49 to 51).

The other construction and functions are the substantially same as in the twenty-third and twenty-fourth examples shown in FIGS. 44 to 46 and described above.

Next, FIG. 48 shows a twenty-sixth example of the embodiment of the invention. In this example, half in the circumferential direction of the inner peripheral surface 74a of the column sections 36e is an inclined concave section 80 that is recessed outward in the radial direction toward the edge in the circumferential direction, to function as a grease pocket. In this example as well, these inclined concave sections 80 directly face the rollers 33 that are held in the pockets 37 (see FIGS. 49 to 51), such that the grease taken into these inclined concave sections 80 is efficiently supplied to the outer peripheral surface of the clutch inner ring 29 when there is relative rotation of the clutch retainer 34e and the clutch inner ring 29 (see FIGS. 49 to 51). The other construction and functions are substantially the same as in the twenty-third and twenty-fifth examples shown in FIGS. 44 to 47 and described above.

The twenty-third to twenty-sixth examples shown in FIGS. 44 to 48 and described above were applied for the case in which the rotation-transmission apparatus with built-in roller clutch was assembled in the engine-starting apparatus for an idling-stop vehicle. However, the rotation-transmission apparatus with built-in roller clutch is not limited to this kind of application, and can also be used assembled in various rotation-transmission mechanisms when the engine in an idling-stop vehicle is stopped, such as in a mechanism that drives an auxiliary device such as a compressor. A summary of the construction of the pulley apparatus with built-in roller clutch of the twenty-third to twenty-sixth examples described above is given below.

In other words, similar to the prior known pulley apparatus with built-in roller, this pulley apparatus with built-in roller clutch comprises: a circular-shaped pulley that has an endless belt that runs around its outer peripheral surface and rotates only in a specified direction during use; a rotating shaft that is inserted though the center of this pulley and rotates in only a specified direction during use; and a roller clutch that is located in the circular-ring shaped space between the inner peripheral surface of the pulley and the outer peripheral surface of the rotating shaft. Also, this roller clutch becomes engaged when the rotating shaft rotates in the specified direction to transmit power from this rotating shaft to the pulley, however, when the pulley rotates faster than this rotating shaft, the roller clutch becomes disengaged and it does not transmit power from this pulley to the rotating shaft.

Particularly, in the pulley apparatus with built-in roller clutch of the twenty-third to twenty-sixth examples described above, the cam surface that allows the plurality of rollers of the roller clutch to move in the radial direction of the pulley is located on the inner peripheral surface of the pulley or on the inner peripheral surface of the clutch outer ring that is fitted and fastened inside this pulley.

Also, the outer peripheral surface of the rotating shaft or the outer peripheral surface of the clutch inner ring that is fastened around this rotating shaft is a cylindrical surface, and a clutch retainer that holds the rollers such that they can freely move in the circumferential direction of the circular-ring shaped space and also holds the springs for pressing these rollers in the same circumferential direction in this circular-ring shaped space rotates with the pulley with respect to the rotating shaft.

Furthermore, in the case of the pulley apparatus with built-in roller clutch of the twenty-third to twenty-sixth examples described above, the grease pockets are formed on the inner peripheral surface of the retainer for holding grease.

In the case of the pulley apparatus with built-in roller clutch of the twenty-third to the twenty sixth examples described above grease is supplied from the grease pockets formed in the inner peripheral surface of the retainer to the points of contact between the rolling contact surfaces of the rollers and the outer peripheral surface of the rotating shaft or outer peripheral surface of the clutch inner ring that is fastened around the outside of this rotating shaft. Therefore, even when there is rubbing between these surfaces, it is possible to suppress friction between these surfaces, and thus it is possible to improve the durability of the pulley apparatus with built-in roller clutch. Therefore, even when there is high-speed relative rotation of the clutch outer ring and clutch inner ring, it is possible to maintain the durability of the roller clutch. As a result, it is possible to improve the performance of various mechanical apparatuses, such as improving the reliability and durability of the engine-starting apparatus for an idling-stop vehicle.

In each of the examples described above, the case is explained in which the rotating member described in the claims is a pulley element 17 (see FIG. 1, etc.) around whose outer peripheral surface an endless belt runs. However, the rotation-transmission apparatus with built-in roller clutch for starting an engine of this invention is not limited to this construction, for example, construction in which an element having a gear unit formed around its outer peripheral surface can be used as the rotating member. In the case of using this kind of element, a different gear unit that rotates with the engine crankshaft meshes with the gear unit that is formed on this element.

Also, the features of the invention disclosed in the claims, can be applied separately, or part or all of the features of the invention disclosed in the claims can be combined. Moreover, it is possible to suitably exclude part of the totally combined features of the invention.

Industrial Applicability

The rotation-transmission apparatus with built-in roller clutch for starting an engine of this invention is constructed and functions as described above, so it is possible to improve reliability and durability of the engine-starting apparatus for an idling-stop vehicle.

The invention claimed is:

1. A rotation-transmission unit with built-in roller clutch for starting an engine for transmitting power in a specified direction between a rotating member which rotates together with a crankshaft of an engine during use and the rotating shaft of the motor for starting the engine which is inserted into the center of the rotating member to rotate in the specified direction during use, the rotation-transmission unit comprising a pair of support bearings provided in a circular space between the inner peripheral surface of the rotating member and the outer peripheral surface of the rotating shaft and spaced apart from each other in the axial direction, a roller clutch provided between the support bearings in the circular space, the roller clutch becoming engaged when the rotating shaft rotates in the specified direction to transmit power from the rotating shaft to the rotating member, and becoming idling when the rotating member rotates faster than the rotating shaft in the specified direction so as not to transmit power from the rotating member to the rotating shaft, and seal rings being provided on the opposite ends of the support bearings, such that the seal ring on the outer side opposite to the roller clutch is of the contact type while the seal ring on the inner side near the roller clutch is of the non-contact type.

* * * * *